(12) United States Patent
Nagatoshi et al.

(10) Patent No.: US 8,693,105 B2
(45) Date of Patent: Apr. 8, 2014

(54) VARIABLE MAGNIFICATION OPTICAL SYSTEM FOR PROJECTION AND PROJECTION-TYPE DISPLAY APPARATUS

(75) Inventors: Yukiko Nagatoshi, Saitama (JP); Akiko Nagahara, Saitama (JP)

(73) Assignee: Fujifilm Corporation, Tokyo (JP)

( * ) Notice: Subject to any disclaimer, the term of this patent is extended or adjusted under 35 U.S.C. 154(b) by 259 days.

(21) Appl. No.: 13/084,972

(22) Filed: Apr. 12, 2011

(65) Prior Publication Data

US 2011/0249344 A1  Oct. 13, 2011

(30) Foreign Application Priority Data

Apr. 12, 2010 (JP) .................. 2010-091607
Feb. 21, 2011 (JP) .................. 2011-034171
Apr. 11, 2011 (JP) .................. 2011-087342

(51) Int. Cl.
*G02B 15/14* (2006.01)
*G02B 13/22* (2006.01)

(52) U.S. Cl.
USPC ............................ 359/680; 359/686; 359/663

(58) Field of Classification Search
USPC .......................... 359/680, 682, 684, 686, 663
See application file for complete search history.

(56) References Cited

U.S. PATENT DOCUMENTS

| 6,204,976 B1 | 3/2001 | Nagahara |
| 6,741,398 B2 | 5/2004 | Yasui |
| 6,989,939 B2 | 1/2006 | Yamasaki et al. |
| 7,911,705 B2 | 3/2011 | Masui |

FOREIGN PATENT DOCUMENTS

| JP | 10-123419 | 5/1998 |
| JP | 2001-141999 | 5/2001 |
| JP | 2001-215410 | 8/2001 |
| JP | 2006-039034 | 2/2006 |
| JP | 2007-156268 | 6/2007 |

*Primary Examiner* — Alicia M Harrington
(74) *Attorney, Agent, or Firm* — Young & Thompson

(57) ABSTRACT

A variable magnification optical system for projection includes a first-lens-group having negative refractive power, and which is fixed when magnification of the system is changed, a second-lens-group having negative refractive power, and which is movable when magnification of the system is changed, a third-lens-group having positive refractive power, and which is movable when magnification of the system is changed, and a fourth-lens-group having positive refractive power, and which is fixed when magnification of the system is changed, which are arranged from the magnification side of the system in the order mentioned. The reduction side of the variable magnification optical system is telecentric, and formula $1.5<Bf/fw$ is satisfied, where Bf: back focus in air of entire system at wide angle end, and fw: focal length of entire system at wide angle end.

37 Claims, 46 Drawing Sheets

EXAMPLE 1 (WIDE ANGLE END)

FIG.3 EXAMPLE 2 (WIDE ANGLE END)

FIG.5 EXAMPLE 3 (WIDE ANGLE END)

FIG.7 EXAMPLE 4 (WIDE ANGLE END)

FIG.9 EXAMPLE 5 (WIDE ANGLE END)

FIG.11 EXAMPLE 6 (WIDE ANGLE END)

FIG.23 EXAMPLE 12 (WIDE ANGLE END)

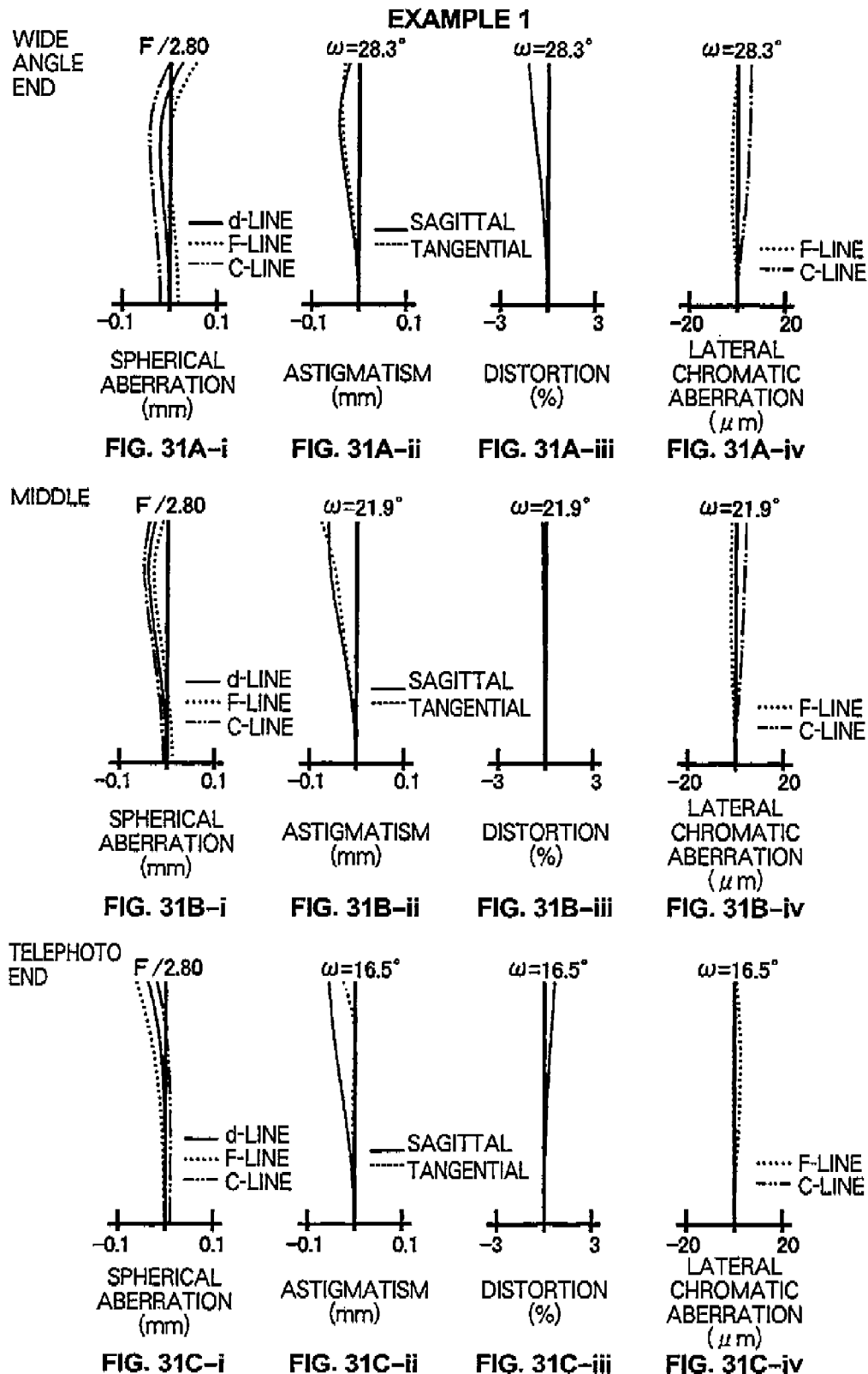

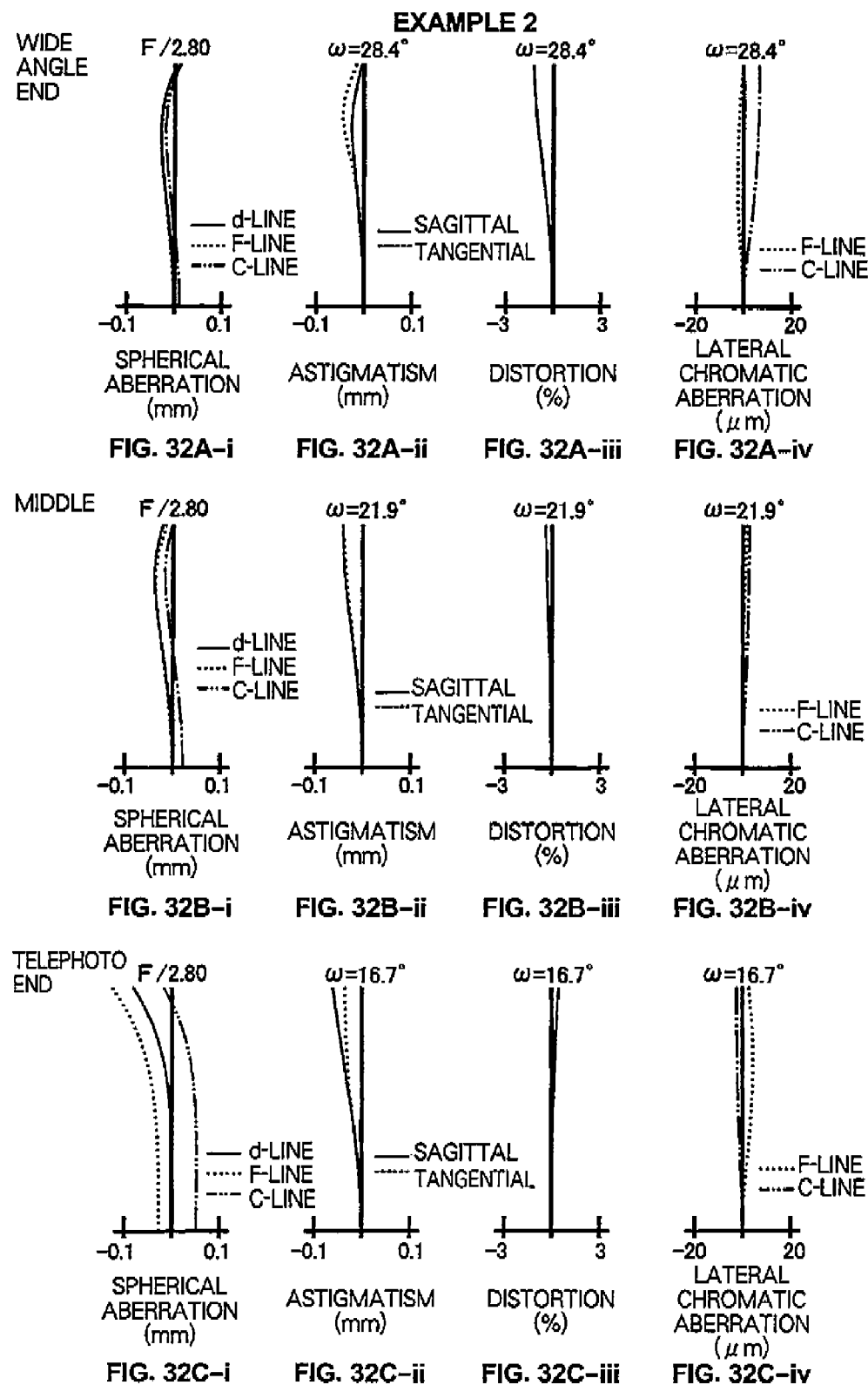

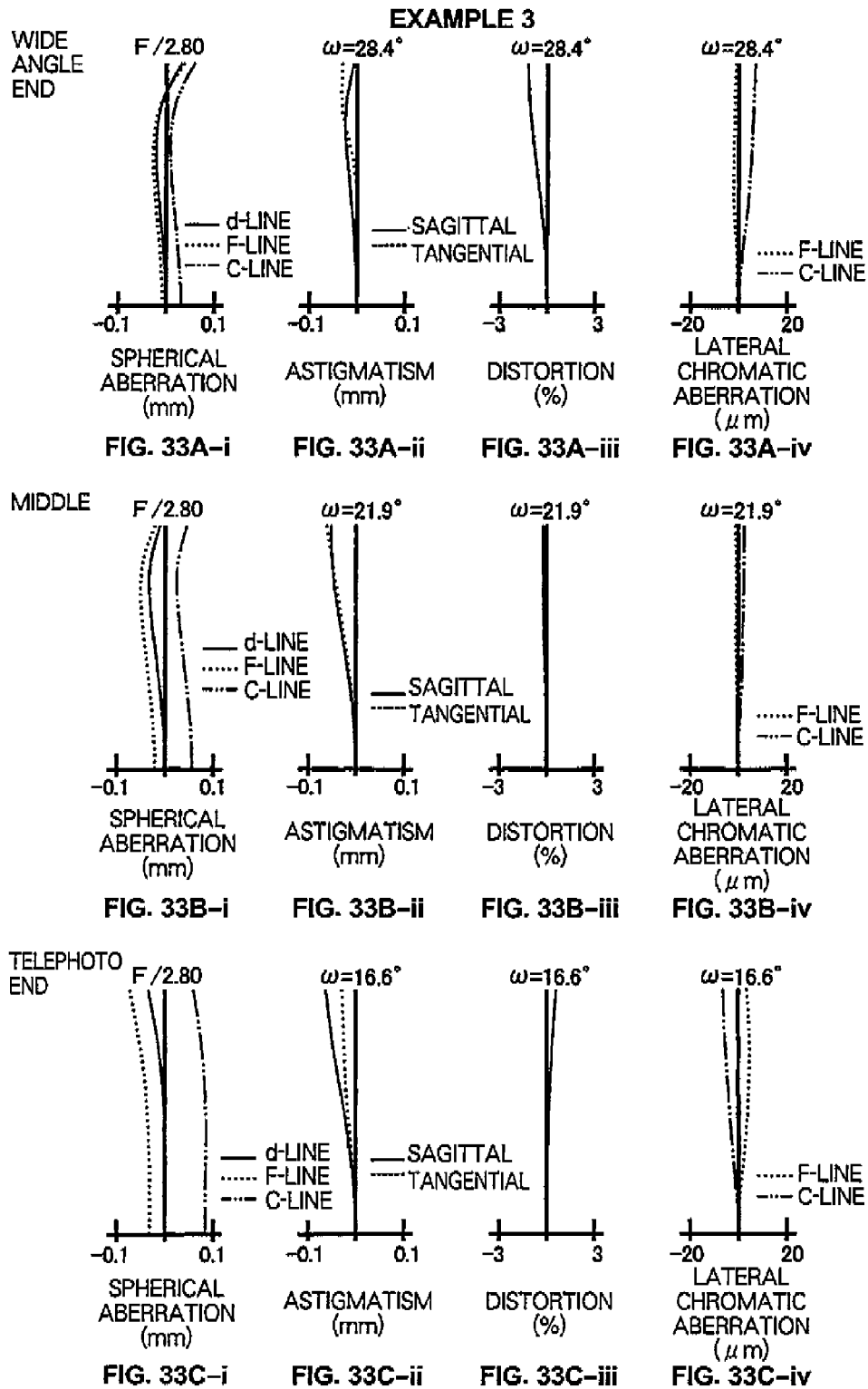

EXAMPLE 4
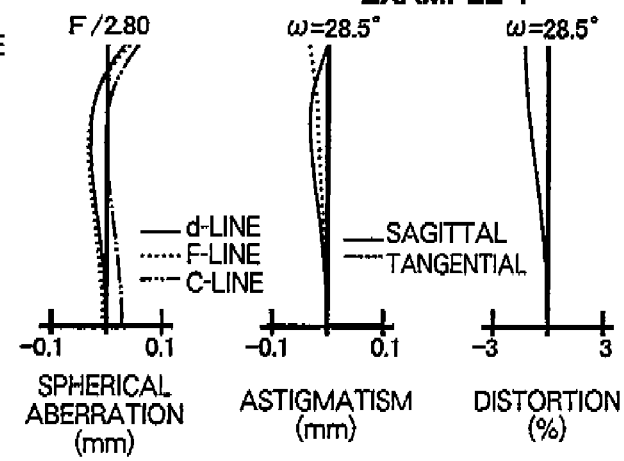
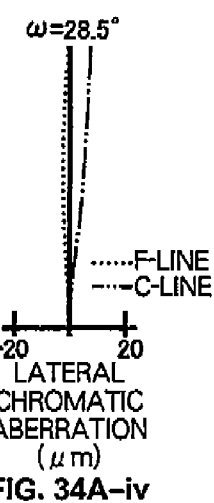
WIDE ANGLE END
FIG. 34A-i  FIG. 34A-ii  FIG. 34A-iii  FIG. 34A-iv
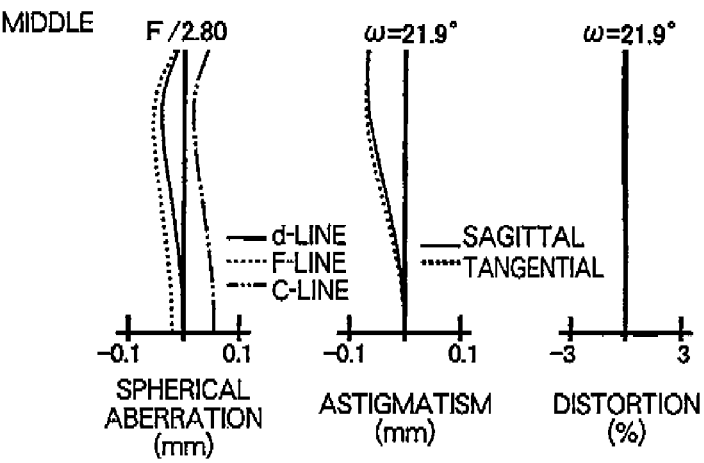
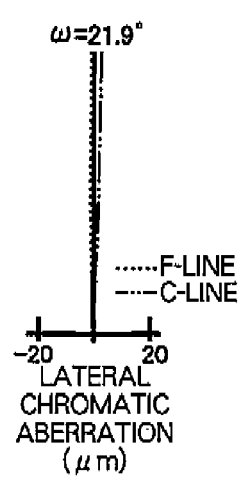
MIDDLE
FIG. 34B-i  FIG. 34B-ii  FIG. 34B-iii  FIG. 34B-iv
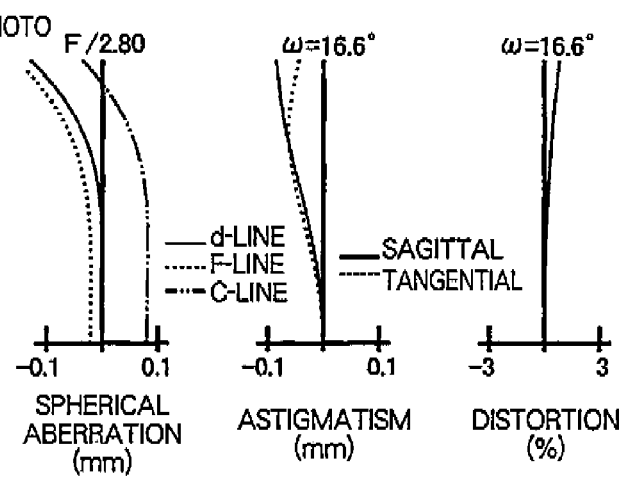
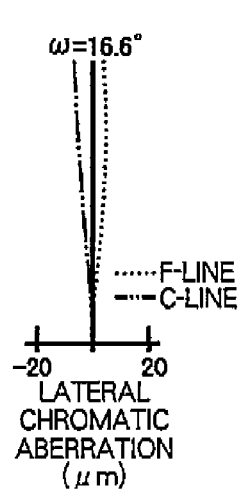
TELEPHOTO END
FIG. 34C-i  FIG. 34C-ii  FIG. 34C-iii  FIG. 34C-iv

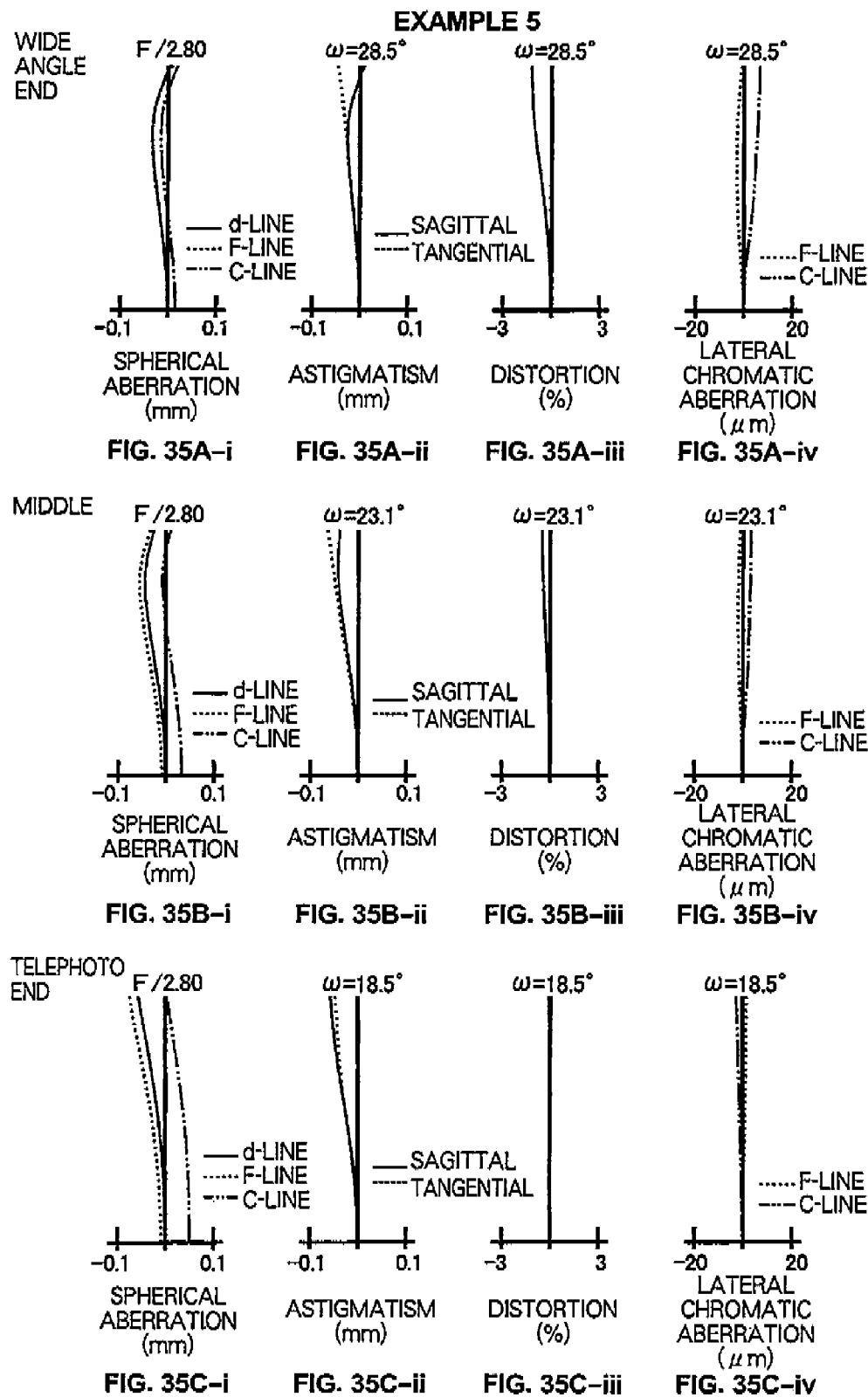

EXAMPLE 6
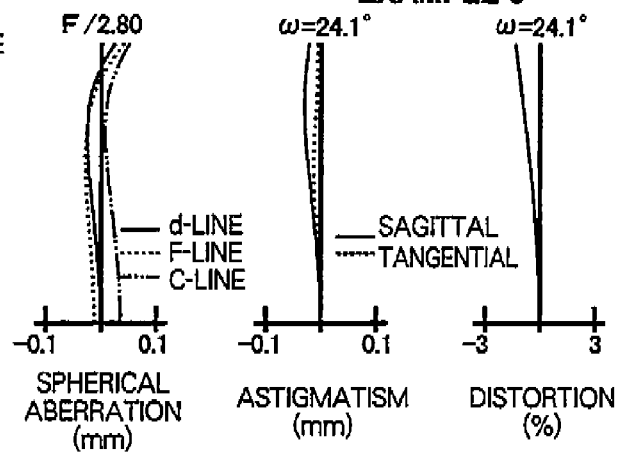
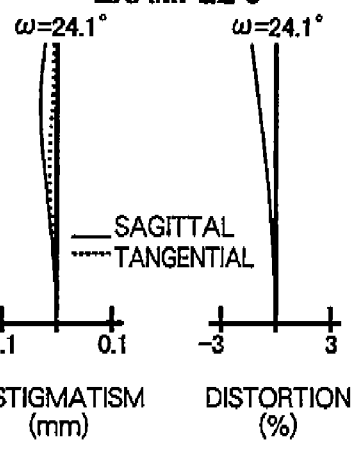
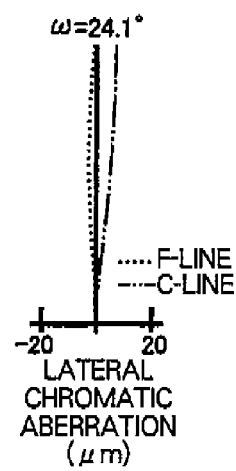
WIDE ANGLE END
FIG. 36A-i  FIG. 36A-ii  FIG. 36A-iii  FIG. 36A-iv
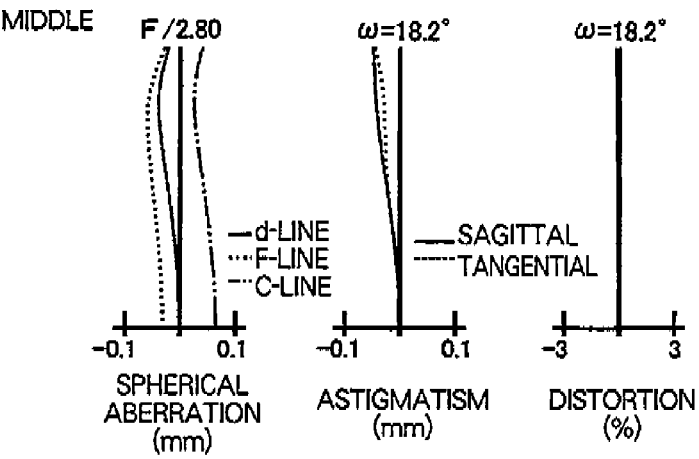
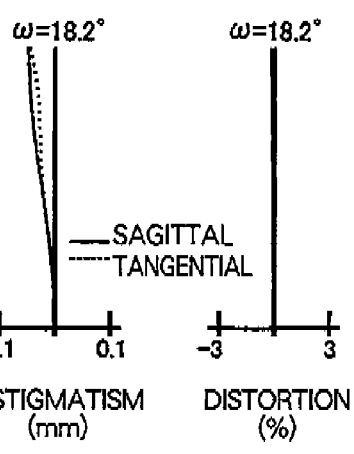
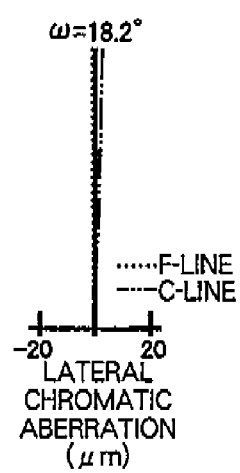
MIDDLE
FIG. 36B-i  FIG. 36B-ii  FIG. 36B-iii  FIG. 36B-iv
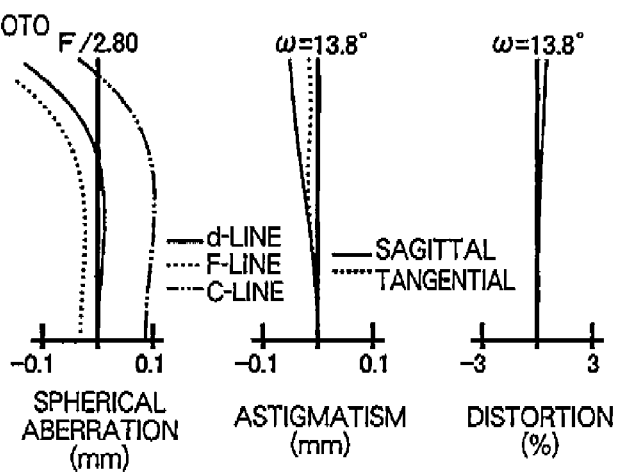
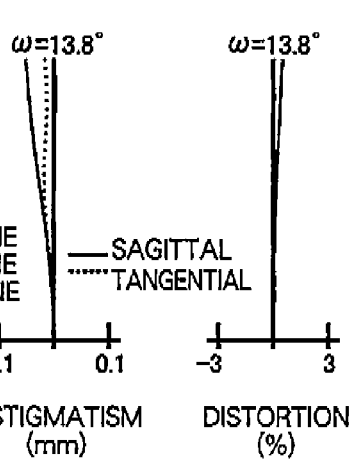
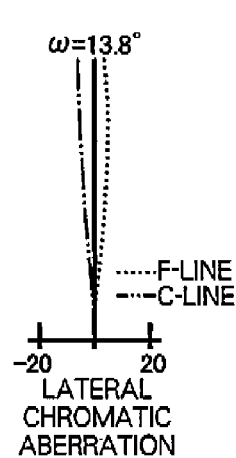
TELEPHOTO END
FIG. 36C-i  FIG. 36C-ii  FIG. 36C-iii  FIG. 36C-iv

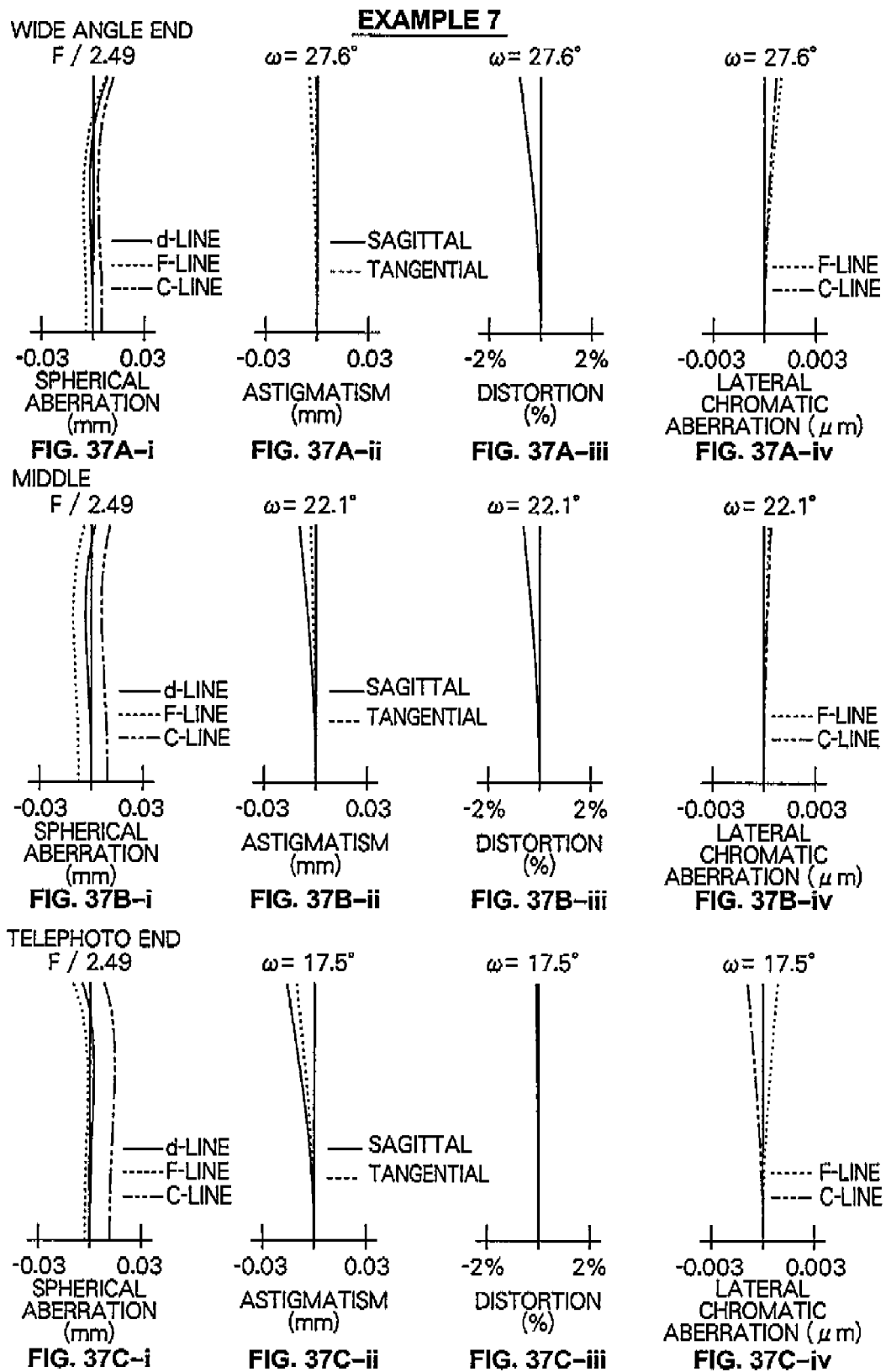

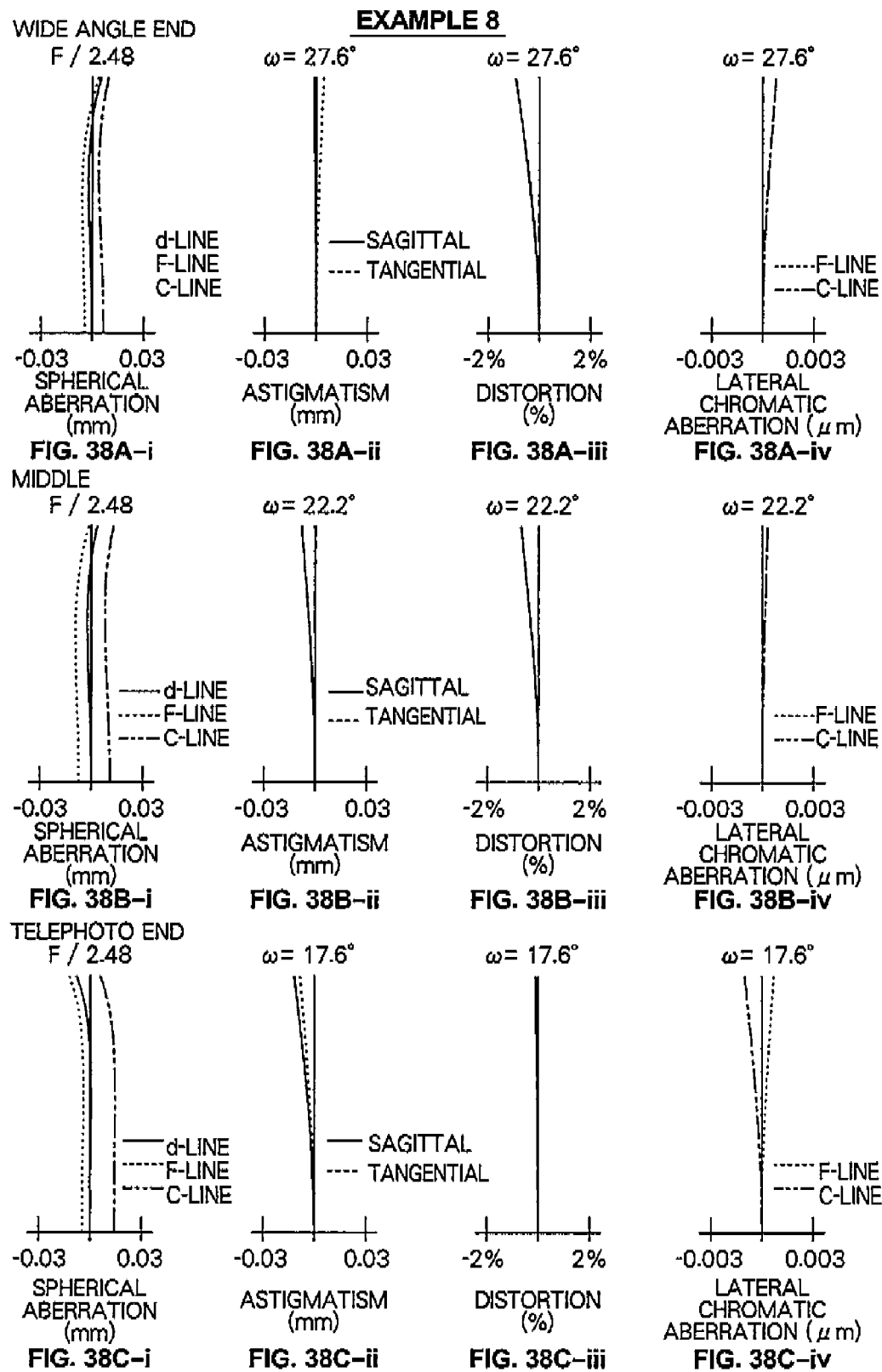

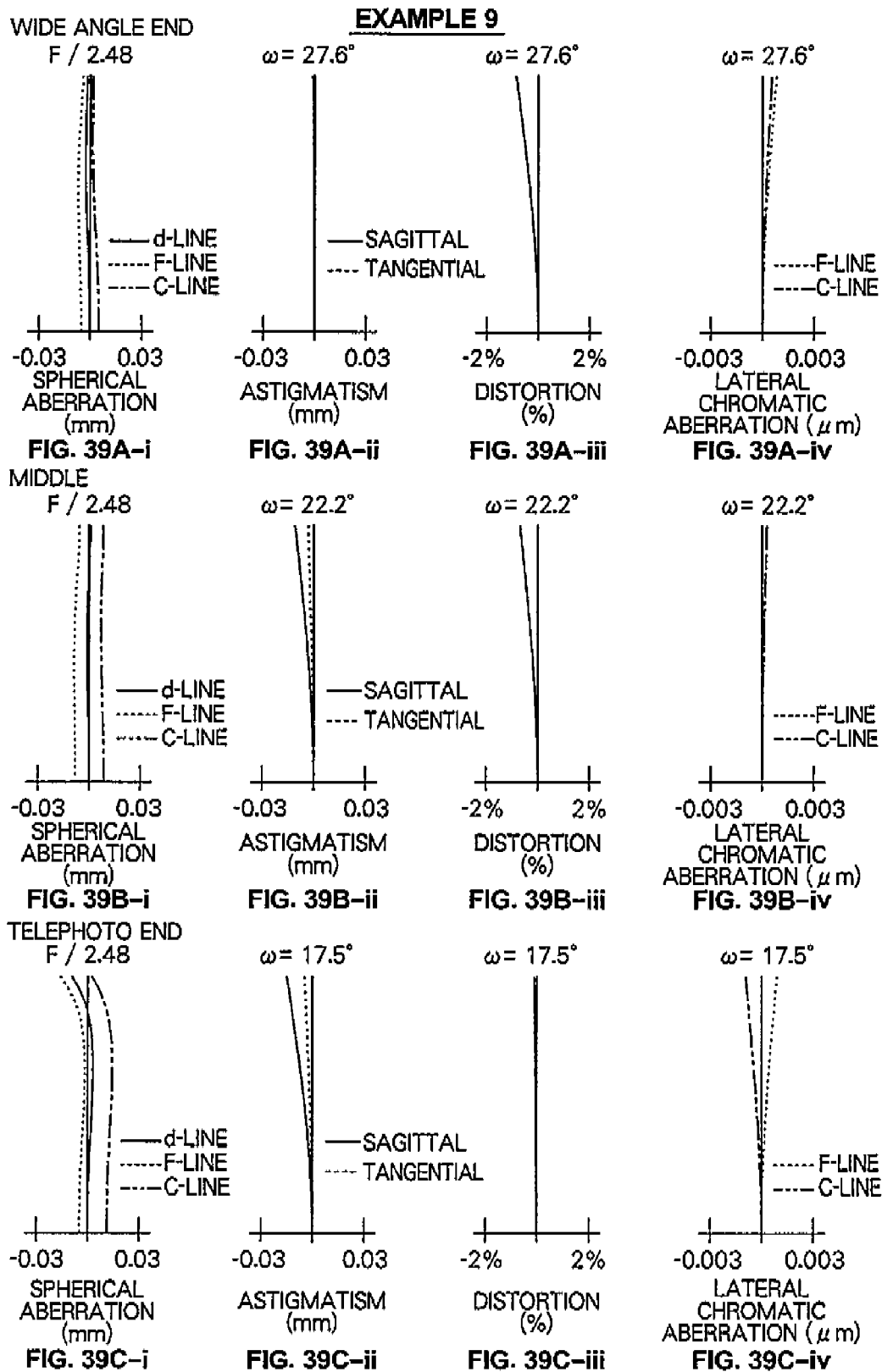

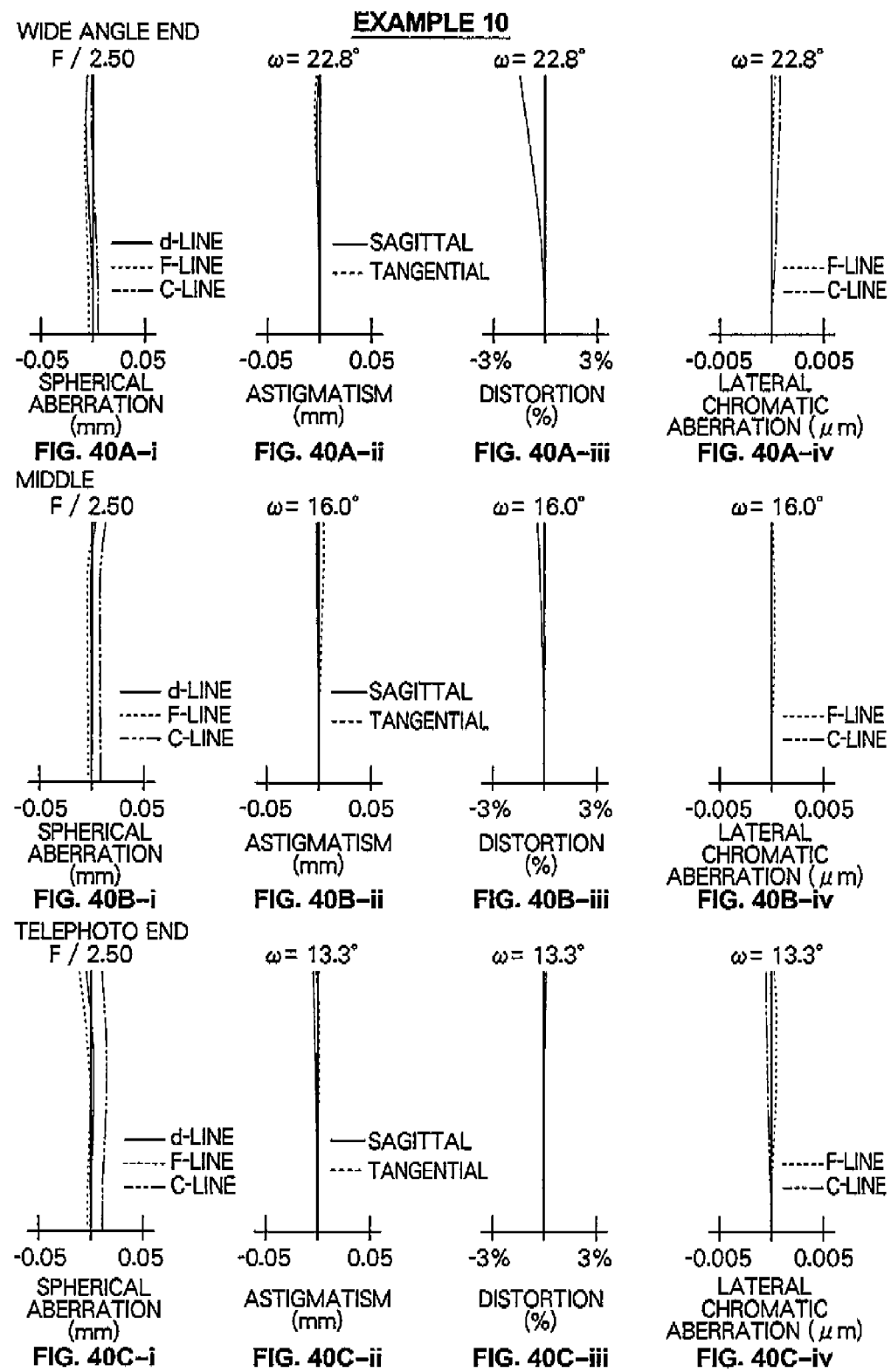

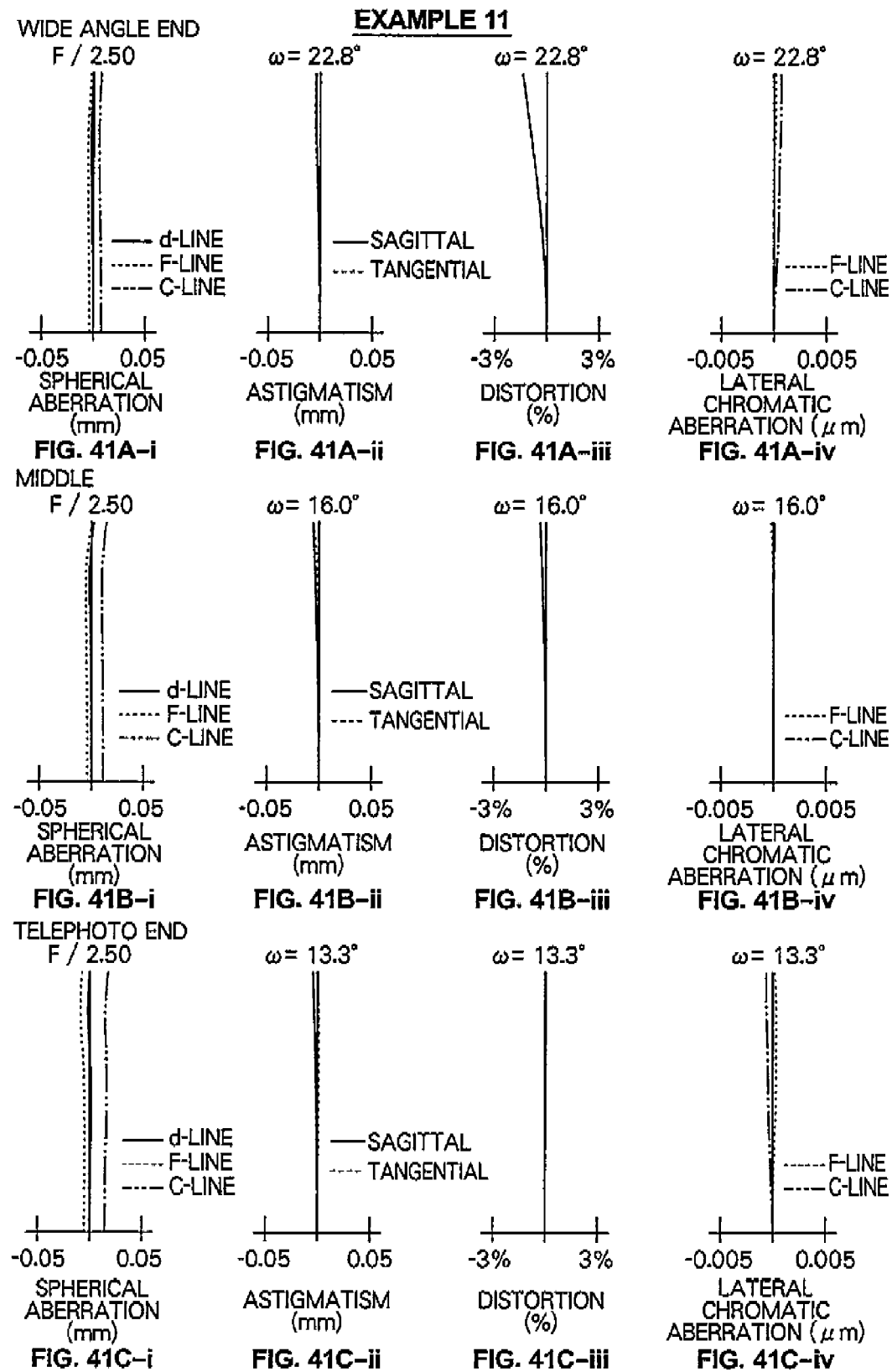

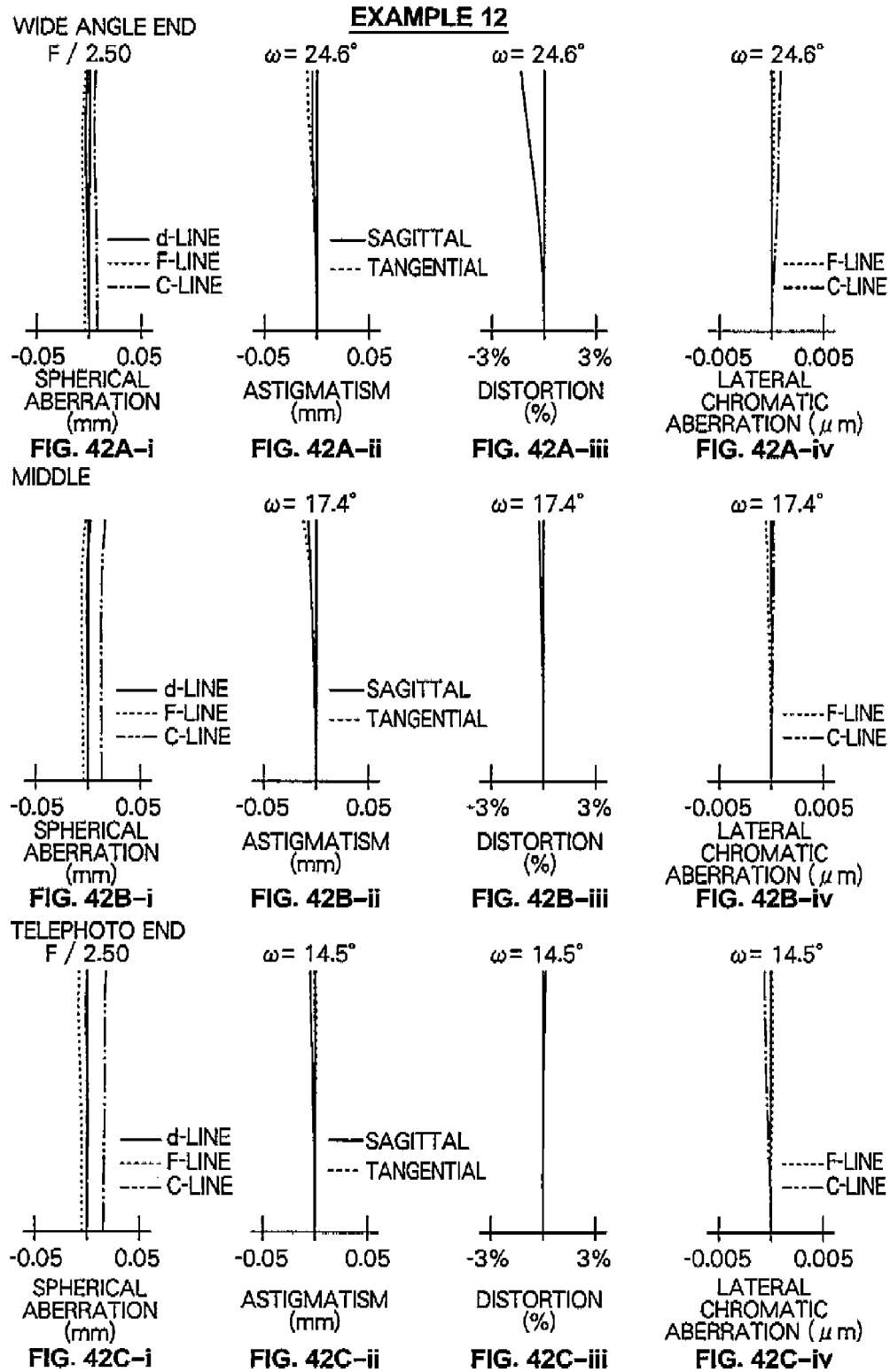

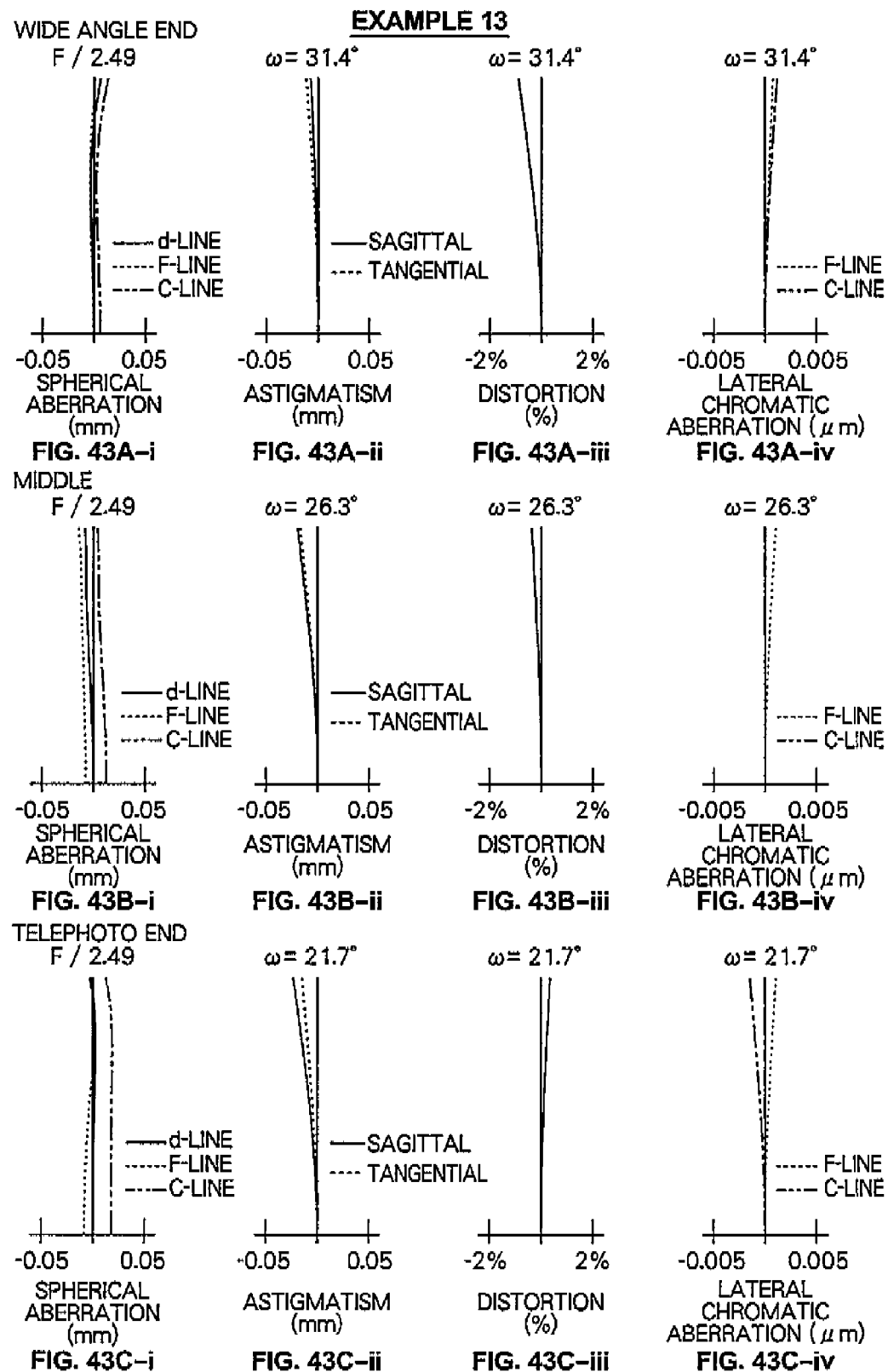

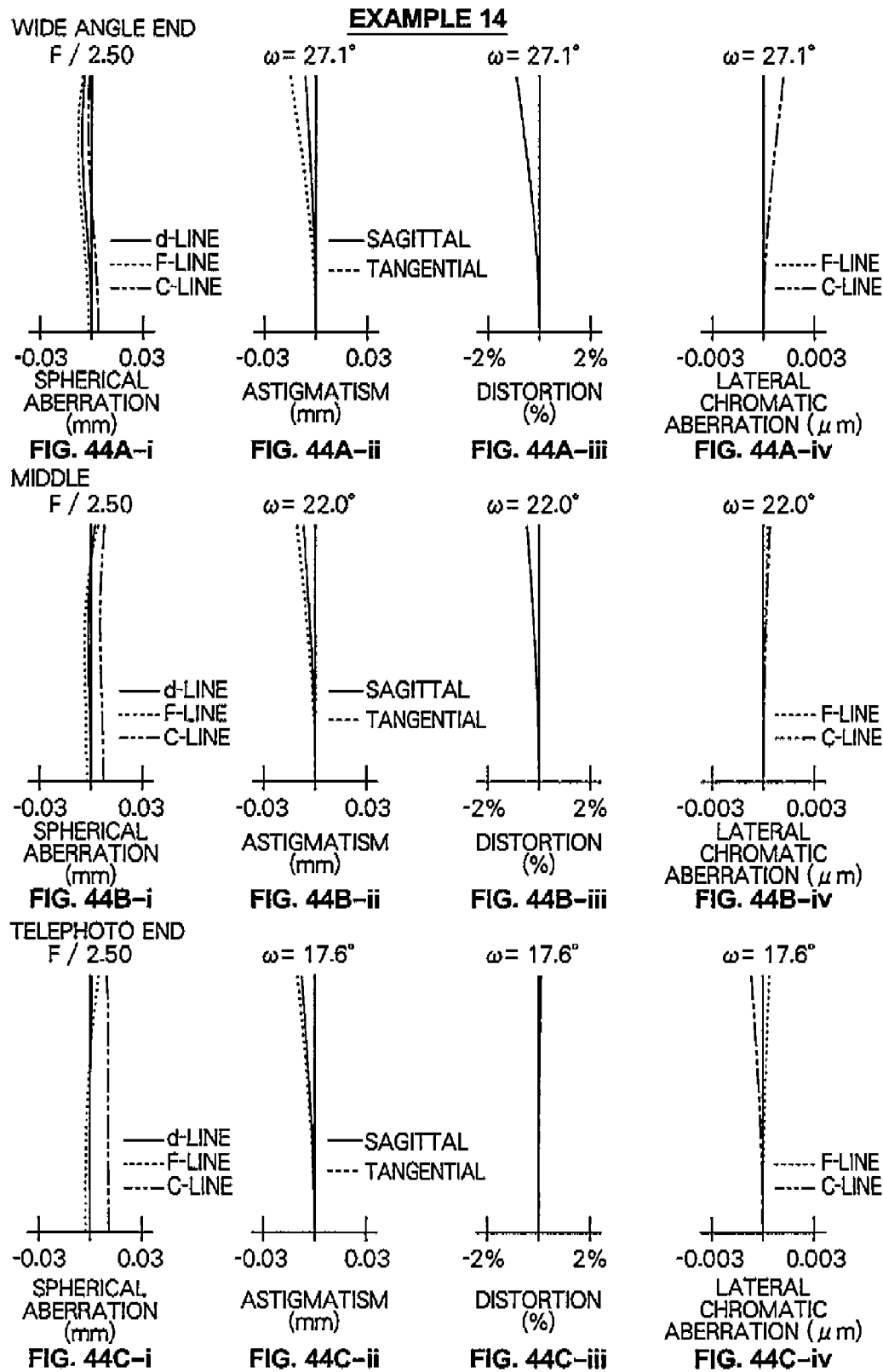

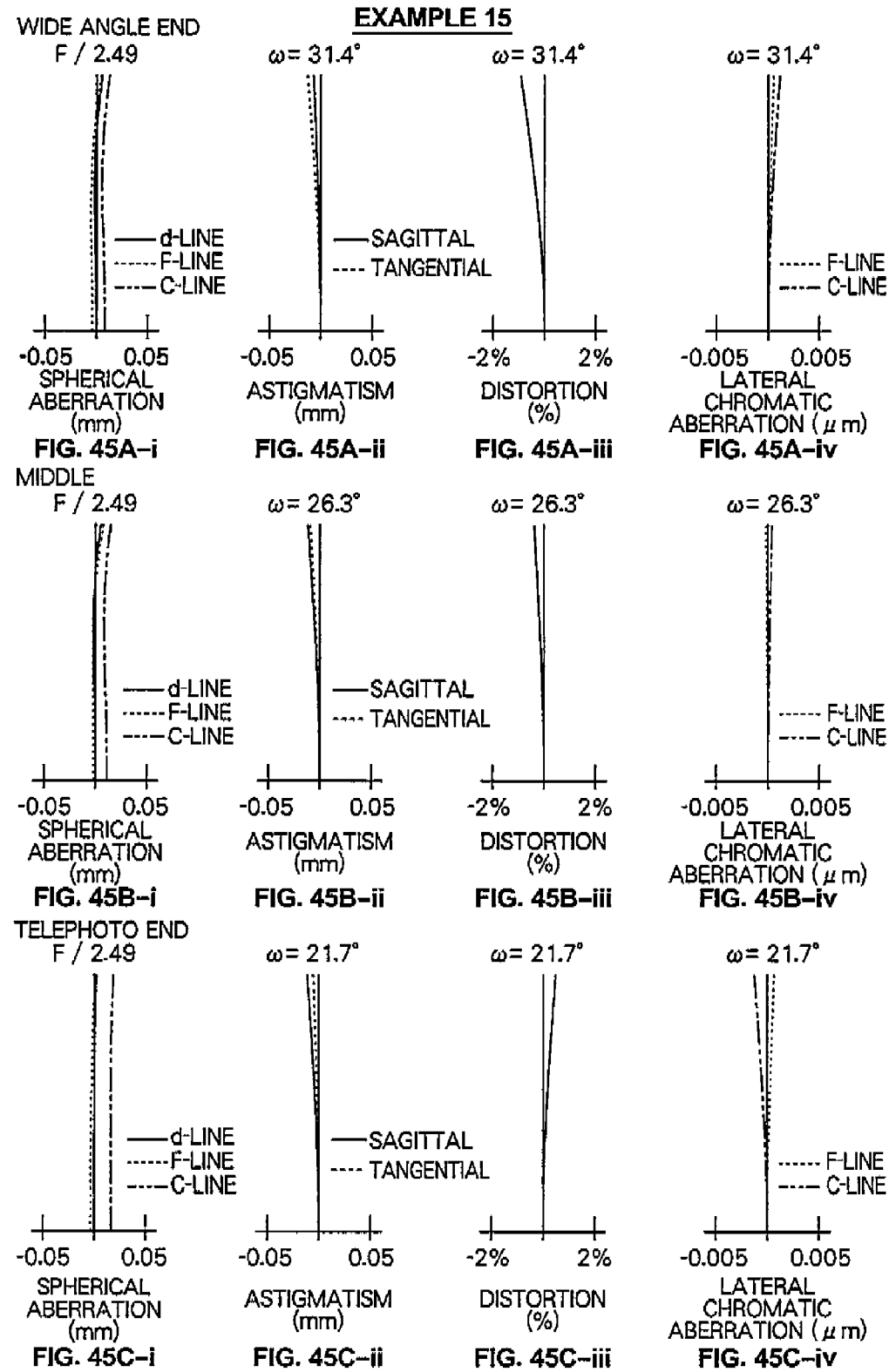

VARIABLE MAGNIFICATION OPTICAL SYSTEM FOR PROJECTION AND PROJECTION-TYPE DISPLAY APPARATUS

BACKGROUND OF THE INVENTION

1. Field of the Invention

The present invention relates to a variable magnification optical system for projection and a zoom lens for projection that are mountable on projection-type display apparatuses or the like, and the projection-type display apparatuses. Particularly, the present invention relates to a variable magnification optical system for projection and a zoom lens for projection, and projection-type display apparatuses suitable to project images onto large screens at movie theaters or the like.

2. Description of the Related Art

Conventionally, projector apparatuses (projection-type display apparatuses) using light valves, such as a liquid crystal display device and a DMD display device, and which have relatively long back focus, were widely used.

In recent years, movie theaters or the like started using projector apparatuses that can project precise images appropriate for large screens.

Such projector apparatuses that can project high-definition images adopt a three panel method using a reflective liquid crystal display device, a DMD or the like. In such projector apparatuses, longer back focus, and excellent telecentricity similar to ordinary projector apparatuses are requested.

Generally, a value obtained by dividing a projection distance by the width of a screen is called as a throw ratio. The size of a screen and a distance from the screen to a projection booth may be different at every movie theater. Therefore, lenses corresponding to the throw ratios of respective movie theaters should be used to project images in appropriate sizes. However, when the cost of a lens is considered, it is not desirable to prepare a lens for each movie theater. Such a problem may be solvable by using a variable magnification optical system, which can be used at movie theaters with a certain range of throw ratios.

Conventionally, various kinds of zoom lens for projection that are mountable on projector apparatuses and that include two movable lens groups were known. As a lens that can project images in an excellent manner, a zoom lens composed of four lens groups, two lens groups of which are movable, is known.

A zoom lens for projection disclosed in Japanese Unexamined Patent Publication No. 10 (1988)-123419 (Patent Document 1) is composed of a positive first lens group, a negative second lens group, a positive third lens group, and a positive fourth lens group, which are arranged from the magnification side of the zoom lens in the order mentioned above. In the zoom lens, the second lens group and the third lens group are moved along the optical axis of the zoom lens when magnification is changed.

Meanwhile, a zoom lens for projection disclosed in U.S. Pat. No. 6,204,976 (Patent Document 2) is composed of a negative first lens group, a positive second lens group, a positive third lens group, and a positive fourth lens group, which are arranged from the magnification side of the zoom lens in the order mentioned above.

In the zoom lens, the second lens group and the third lens group are moved along the optical axis of the zoom lens when the magnification is changed.

As other zoom lenses for projection, zoom lenses for projection disclosed, for example, in Japanese Unexamined Patent Publication No. 2006-039034 (Patent Document 3), U.S. Pat. No. 6,741,398 (Patent Document 4), Japanese Unexamined Patent Publication No. 2007-156268 (Patent Document 5), U.S. Pat. No. 6,989,939 (Patent Document 6), Japanese Unexamined Patent Publication No. 2001-215410 (Patent Document 7), Japanese Unexamined Patent Publication No. 2001-141999 (Patent Document 8), and U.S. Pat. No. 7,911,705 (Patent Document 9) are known. The zoom lens for projection disclosed in Patent Document 3 is composed of a negative first lens group, a negative second lens group, a positive third lens group, a positive fourth lens group, and a positive fifth lens group, which are arranged from the magnification of the zoom lens in the order mentioned above. In the zoom lens, the second lens group, the third lens group and the fourth lens group are moved along the optical axis of the zoom lens when the magnification is changed.

Patent Document 4 discloses zoom lenses for projection including at least one diffraction optical element. The zoom lens for projection in Patent Document 4 is composed of a negative first lens group, a negative second lens group, a positive third lens group, a negative fourth lens group, and a positive fifth lens group, which are arranged from the magnification side of the zoom lens in the order mentioned above. Further, Patent Document 4 discloses a zoom lens for projection composed of a negative first lens group, a negative second lens group, a positive third lens group, a negative fourth lens group, a positive fifth lens group and a positive sixth lens group, which are arranged from the magnification side of the zoom lens in the order mentioned above.

Further, Patent Document 5 discloses a zoom lens for projection composed of a negative first lens group, a negative second lens group, a positive third lens group, a positive fourth lens group, and a positive fifth lens group, which are arranged from the magnification side of the zoom lens in the order mentioned above. Further, Patent Document 5 discloses a zoom lens for projection composed of a negative first lens group, a negative second lens group, a positive third lens group, a positive fourth lens group, a negative fifth lens group and a positive sixth lens group, which are arranged from the magnification side of the zoom lens in the order mentioned above.

In the zoom lens for projection disclosed in Patent Document 1, the first lens group on the magnification side has positive refractive power. Therefore, a high zoom ratio is achievable in a telephoto type lens system. However, when the projection angle of the zoom lens for projection is increased without lowering the zoom ratio of the zoom lens, it is impossible to obtain sufficient back focus, or the outer diameter of at least one lens in the first lens group on the magnification side of the zoom lens becomes too large, and it becomes difficult to provide a compact lens system.

In the zoom lens for projection disclosed in Patent Document 2, the power of the lens groups arranged from the magnification side of the zoom lens is negative, positive, positive, and positive.

Further, the power of the lens groups that move when the magnification of the zoom lens is changed is positive and positive. Therefore, when the magnification ratio becomes large, the fluctuation of aberration becomes too large. Hence, it is difficult to substantially increase the magnification ratio.

The zoom lens for projection disclosed in Patent Document 3 has short back focus, and a small magnification ratio. Further, the zoom lens for projection disclosed in Patent Document 4 has a small magnification ratio. The zoom lens for projection disclosed in Patent Document 5 has short back focus. Further, in the zoom lenses for projection disclosed in Patent Documents 3 through 5, the fluctuation of numerical aperture when magnification of the variable magnification optical system is changed is not considered. Therefore, when the magnification of the variable magnification optical system is changed, the numerical aperture fluctuates, and such zoom lenses for projection are not appropriate for movie theaters.

SUMMARY OF THE INVENTION

In view of the foregoing circumstances, it is an object of the present invention to provide a variable magnification optical system for projection and a zoom lens for projection having appropriate back focus, and the reduction side of which is telecentric, and in which the outer diameter of at least one magnification-side lens does not become too large even when a projection angle is increased, and which has a large magnification ratio, and which can suppress the fluctuation of aberration when magnification of the variable magnification optical system is changed. Further, it is another object of the present invention to provide projection-type display apparatuses.

To achieve the aforementioned objects of the present invention, a variable magnification optical system for projection according to an aspect of the present invention is a variable magnification optical system for projection comprising:

a first lens group having negative refractive power, and which is fixed when magnification of the variable magnification optical system is changed;

a second lens group having negative refractive power, and which moves when magnification of the variable magnification optical system is changed;

a third lens group having positive refractive power, and which moves when magnification of the variable magnification optical system is changed; and a fourth lens group having positive refractive power, and which is fixed when magnification of the variable magnification optical system is changed, the first lens group, the second lens group, the third lens group and the fourth lens group being arranged from the magnification side of the variable magnification optical system in the order mentioned above, wherein the reduction side of the variable magnification optical system is telecentric, and wherein the following formula (11) is satisfied:

$$1.5 < Bf/fw \quad (11),$$

where

Bf: back focus in air of entire system at wide angle end, and fw: focal length of entire system at wide angle end.

A variable magnification optical system for projection according to another aspect of the present invention is a variable magnification optical system for projection comprising:

a first lens group having negative refractive power, and which is fixed when magnification of the variable magnification optical system is changed;

a second lens group having negative refractive power, and which moves when magnification of the variable magnification optical system is changed;

a third lens group having positive refractive power, and which moves when magnification of the variable magnification optical system is changed; and a fourth lens group having positive refractive power, and which is fixed when magnification of the variable magnification optical system is changed, the first lens group, the second lens group, the third lens group and the fourth lens group being arranged from the magnification side of the variable magnification optical system in the order mentioned above, wherein the reduction side of the variable magnification optical system is telecentric, and wherein the following formula (12) is satisfied:

$$-10.0 < f_1/fw < 0.0 \quad (12),$$

where $f_1$: focal length of the first lens group, and fw: focal length of entire system at wide angle end.

In the variable magnification optical systems for projection, it is desirable that the following formula (16) is satisfied:

$$1.8 < Bf/Im\phi \quad (16),$$

where

Bf: back focus in air of entire system at wide angle end, and

Im$\phi$: diameter of a maximum effective image circle on the reduction side of the variable magnification optical system.

Further, it is desirable that the following formula (13) is satisfied:

$$f_{MK}/fw < -3.5 \quad (13),$$

where $f_{MK}$: focal length of a most-magnification-side lens group among a plurality of lens groups that move when magnification of the variable magnification optical system is changed, and fw: focal length of entire system at wide angle end.

Further, it is desirable that the following formula (14) is satisfied:

$$1.5 < f_{MS}/fw < 10.0 \quad (14),$$

where $f_{MS}$: focal length of a most-reduction-side lens group among a plurality of lens groups that move when magnification of the variable magnification optical system is changed, and fw: focal length of entire system at wide angle end.

Further, it is desirable that the following formula (15) is satisfied:

$$1.0 < f_E/fw < 5.0 \quad (15),$$

where $f_E$: focal length of the lens group having positive refractive power that is arranged on the most reduction side in the entire system of the variable magnification optical system, and which is fixed when magnification of the variable magnification optical system is changed, and fw: focal length of entire system at wide angle end.

The variable magnification optical system may be a zoom lens.

In a variable magnification optical system for projection, an inner focus method, in which at least one reduction-side lens in the first lens group is moved in the direction of an optical axis, may be used in focusing when a projection distance has changed.

Further, a variable magnification optical system for projection according to another aspect of the present invention is a variable magnification optical system for projection comprising:

a first lens group having negative refractive power, and which is arranged on the most magnification side of the variable magnification optical system, and which is fixed when magnification of the variable magnification optical system is changed;

a final lens group having positive refractive power, and which is arranged on the most reduction side of the variable magnification optical system, and which is fixed when magnification of the variable magnification optical system is changed; and a plurality of lens groups that are arranged between the first lens group and the final lens group, and which move when magnification of the variable magnification optical system is changed, wherein a most-magnification-side lens group among the plurality of lens groups that move when magnification of the variable magnification optical system is changed has negative refractive power, and wherein a most-reduction-side lens group among the plurality of lens groups that move when magnification of the variable magnification optical system is changed has positive refractive power, and wherein the reduction side of the variable magnification optical system is telecentric, and wherein the following formulas (11) and (12') are satisfied:

$$1.5 < Bf/fw \qquad (11);$$

and $$-10.0 < f_1/fw < -2.0 \qquad (12'),$$

where Bf: back focus in air of entire system at wide angle end, fw: focal length of entire system at wide angle end, and $f_1$: focal length of first lens group.

A variable magnification optical system for projection according to another aspect of the present invention is a variable magnification optical system for projection comprising:

a first lens group having negative refractive power, and which is arranged on the most magnification side of the variable magnification optical system, and which is fixed when magnification of the variable magnification optical system is changed;

a final lens group having positive refractive power, and which is arranged on the most reduction side of the variable magnification optical system, and which is fixed when magnification of the variable magnification optical system is changed; and a plurality of lens groups that are arranged between the first lens group and the final lens group, and which move when magnification of the variable magnification optical system is changed, wherein a most-magnification-side lens group among the plurality of lens groups that move when magnification of the variable magnification optical system is changed has negative refractive power, and wherein a most-reduction-side lens group among the plurality of lens groups that move when magnification of the variable magnification optical system is changed has positive refractive power, and wherein the reduction side of the variable magnification optical system is telecentric, and wherein a stop is arranged in the final lens group, thereby setting the numerical aperture of the variable magnification optical system constant through the entire range of variable magnification.

In the variable magnification optical systems for projection, it is desirable that the following formula (16) is satisfied:

$$1.8 < Bf/Im\phi \qquad (16),$$

where

Bf: back focus in air of entire system at wide angle end, and

Imφ: diameter of a maximum effective image circle on the reduction side of the variable magnification optical system.

Further, it is desirable that the following formula (13) is satisfied:

$$f_{MK}/fw < -3.5 \qquad (13),$$

where $f_{MK}$: focal length of a most-magnification-side lens group among a plurality of lens groups that move when magnification of the variable magnification optical system is changed, and fw: focal length of entire system at wide angle end.

Further, it is desirable that the following formula (14) is satisfied:

$$1.5 < f_{MS}/fw < 10.0 \qquad (14),$$

where $f_{MS}$: focal length of a most-reduction-side lens group among a plurality of lens groups that move when magnification of the variable magnification optical system is changed, and fw: focal length of entire system at wide angle end.

Further, it is desirable that the following formula (15) is satisfied:

$$1.0 < f_E/fw < 5.0 \qquad (15),$$

where $f_E$: focal length of the lens group having positive refractive power that is arranged on the most reduction side in the entire system of the variable magnification optical system, and which is fixed when magnification of the variable magnification optical system is changed, and fw: focal length of entire system at wide angle end.

It is desirable that the plurality of lens groups that move when magnification of the variable magnification optical system is changed are three lens groups, and that a second lens group from the magnification side among the three lens groups has positive refractive power. Further, it is desirable that the following formula (17) is satisfied:

$$5.0 < f_{Mm}/fw \qquad (17),$$

where $f_{Mm}$: focal length of the second lens group from the magnification side among the three lens groups, and fw: focal length of entire system at wide angle end.

Further, the variable magnification optical system may be structured to function as a zoom lens by changing only at least one distance between lens groups.

A variable magnification optical system for projection according to another aspect of the present invention is a variable magnification optical system for projection comprising:

a first lens group having negative refractive power, and which is arranged on the most magnification side of the variable magnification optical system, and which is fixed when magnification of the variable magnification optical system is changed;

a final lens group having positive refractive power, and which is arranged on the most reduction side of the variable magnification optical system, and which is fixed when magnification of the variable magnification optical system is changed; and a plurality of lens groups that are arranged between the first lens group and the final lens group, and which move when magnification of the variable magnification optical system is changed, and the number of the plurality of lens groups being less than or equal to three, wherein the reduction side of the variable magnification optical system is telecentric, and wherein a stop is arranged in the final lens group, thereby setting the numerical aperture of the variable magnification optical system constant through the entire range of variable magnification, and wherein the following formulas (18) and (19) are satisfied:

$$5.0 < Bf \times Zr^2/Im\phi \quad (18),$$

and $$L/Im\phi < 12.5 \quad (19),$$

where

Bf: back focus in air of entire system at wide angle end,

Zr: ratio of magnification at telephoto end to magnification at wide angle end,

Imφ: diameter of a maximum effective image circle on the reduction side of the variable magnification optical system, and L: total lens thickness when projection distance is infinity.

In the variable magnification optical system for projection, it is desirable that a most-magnification-side lens group among the plurality of lens groups that move when magnification of the variable magnification optical system is changed, the number of the plurality of lens groups being less than or equal to three, has negative refractive power.

Further, it is desirable that the following formula (11) is satisfied:

$$1.5 < Bf/fw \quad (11),$$

where

Bf: back focus in air of entire system at wide angle end, and fw: focal length of entire system at wide angle end.

Further, the variable magnification optical system may be structured so as to function as a zoom lens by changing only at least one distance between lens groups.

Further, it is desirable that the following formula (20) is satisfied:

$$1.4 < Zr \quad (20),$$

where

Zr: ratio of magnification at telephoto end to magnification at wide angle end.

A projection-type display apparatus according to the present invention is a projection-type display apparatus comprising:

a light source;

a light valve; and a variable magnification optical system for projection according to the present invention, wherein an optical image formed by light modulated by the light valve is projected onto a screen by the variable magnification optical system for projection.

The term "magnification side" means a projected side (screen side). Even in reduction projection, the screen side is referred to as "magnification side" for convenience. Further, the term "reduction side" means an original image display area side (light valve side). Even in reduction projection, the light valve side is referred to as "reduction side" for convenience.

Further, the "stop" may be an aperture stop, in which the diameter of an aperture is fixed. Alternatively, the "stop" may be a variable stop (adjustable stop), in which the diameter of the aperture is variable.

The term "back focus Bf" refers to back focus on the reduction side. The term "Bf: back focus in air" refers to in-air-equivalent back focus. Further, the term "total lens thickness L when projection distance is infinity" refers to a length on an optical axis from the most-magnification-side lens surface (a surface closest to the magnification side) to the most-reduction-side lens surface (a surface closest to the reduction side) when the projection distance is infinity.

The variable magnification optical system of the present invention may be a zoom lens. Alternatively, the variable magnification optical system of the present invention may be a varifocal lens.

Further, the expression "the reduction side is telecentric" means that a bisector dividing the angle between an upper outermost ray and a lower outermost ray on a cross-section of rays condensing at an arbitrary point on the reduction-side image plane is substantially parallel to the optical axis. The expression refers not only to a state in which the reduction side is completely telecentric, in other words, the bisector is completely parallel to the optical axis, but to a state including some error or difference. Here, the state including some error or difference means a state in which the angle of the bisector with respect to the optical axis is within the range of ±3 degrees.

A variable magnification optical system for projection according to a first aspect of the present invention is composed of a first lens group having negative refractive power, a second lens group having negative refractive power, a third lens group having positive refractive power, and a fourth lens group having positive refractive power, which are arranged from the magnification side of the variable magnification optical system in the order mentioned above. Therefore, the outer diameter of at least one magnification-side lens does not become too large even when the projection angle of the variable magnification optical system is increased. Further, it is possible to suppress the fluctuation of aberrations when magnification of the variable magnification optical system is changed, while a large magnification ratio is maintained.

Further, when the variable magnification optical system for projection according to the first aspect of the present invention satisfies the formula (11), appropriate back focus is obtained.

A variable magnification optical system for projection according to a second aspect of the present invention can achieve advantageous effects similar to those of the variable magnification optical system for projection according to the first aspect of the present invention. In this variable magnification optical system for projection, the formula (12) is satisfied instead of the formula (11). Therefore, it is possible prevent the outer diameter of at least one magnification-side lens from becoming large. Hence, it is possible to increase the projection angle of the variable magnification optical system.

As described above, in the variable magnification optical systems for projection according to the first and second aspects of the present invention, two of four lens groups are movable, and the number of the movable lens groups is small. Further, the variable magnification optical systems for projection have appropriate back focus, and the outer diameter of at least one magnification-side lens does not become too large even when a projection angle is increased. Therefore, it is possible to easily increase the projection angle. Further, it is possible to suppress the fluctuation of aberrations when magnification of the variable magnification optical system is changed, while a large magnification ratio is maintained.

The variable magnification optical systems for projection according to the first and second aspects of the present invention may be zoom lenses for projection. A zoom lens for projection according to an aspect of the present invention is composed of a first lens group having negative refractive power, a second lens group having negative refractive power, a third lens group having positive refractive power, and a fourth lens group having positive refractive power, which are arranged from the magnification side of the zoom lens in the order mentioned above. Therefore, the outer diameter of at least one magnification-side lens is not too large even when the projection angle of the zoom lens is increased. Further, it is possible to suppress the fluctuation of aberrations when magnification of the variable magnification optical system is changed, while a large magnification ratio is maintained.

When the zoom lens for projection satisfies the formula (11), appropriate back focus is obtained.

A zoom lens for projection according to another aspect of the present invention can achieve advantageous effects similar to those of the aforementioned zoom lens for projection. In this zoom lens for projection, the formula (12) is satisfied instead of the formula (11). Therefore, it is possible prevent the outer diameter of at least one magnification-side lens from becoming large. Hence, it is possible to increase the projection angle of the variable magnification optical system.

As described above, in the zoom lenses for projection according to the present invention, two of four lens groups are movable, and the number of the movable lens groups is small. Further, the zoom lenses for projection have appropriate back focus, and the outer diameter of at least one magnification-side lens does not become too large even when a projection angle is increased. Therefore, it is possible to easily increase the projection angle. Further, it is possible to suppress the fluctuation of aberrations when magnification of the variable magnification optical system is changed, while a large magnification ratio is maintained.

A variable magnification optical system for projection according to a third aspect of the present invention is composed of a first lens group having negative refractive power, and which is fixed when magnification of the variable magnification optical system is changed, plural lens groups that move when magnification of the variable magnification optical system is changed, and a final lens group having positive refractive power, and which is fixed when magnification of the variable magnification optical system is changed. The first lens group, the plural lens groups and the final lens group are arranged from the magnification side in the order mentioned above. Further, a most-magnification-side lens group of the plural lens groups has negative refractive power, and a most-reduction-side lens group of the plural lens groups has positive refractive power. Therefore, the outer diameter of at least one magnification-side lens is not too large even when the projection angle of the variable magnification optical system is increased. Further, it is possible to suppress the fluctuation of aberrations when magnification of the variable magnification optical system is changed, while a large magnification ratio is maintained.

When the variable magnification optical system for projection according to the third aspect of the present invention satisfies the formulas (11) and (12'), it is possible to obtain appropriate back focus. Further, it is possible to prevent the outer diameter of at least one magnification-side lens from becoming large. Hence, it is possible to increase a projection angle. Further, it is possible to obtain high quality images in which curvature of field and distortion are suppressed.

A variable magnification optical system for projection according to a fourth aspect of the present invention can achieve advantageous effects similar to those achieved by the variable magnification optical system for projection according to the third aspect of the present invention. Specifically, the outer diameter of at least one magnification-side lens is not too large even when the projection angle of the variable magnification optical system is increased. Further, it is possible to suppress the fluctuation of aberrations when magnification of the variable magnification optical system is changed, while a large magnification ratio is maintained. The variable magnification optical system for projection according to the third aspect of the present invention satisfies the formulas (11) and (12'). However, in the variable magnification optical system for projection according to the fourth aspect of the present invention, a stop is arranged in the final lens group, thereby setting the numerical aperture of the variable magnification optical system constant through the entire range of variable magnification. Therefore, if the magnification ratio of projection is the same, the luminance of a projection screen is constant, regardless of the projection distance. Therefore, the variable magnification optical system for projection according to the fourth aspect of the present invention is appropriate for use at movie theaters.

Further, a variable magnification optical system for projection according to a fifth aspect of the present invention is composed of a first lens group having negative refractive power, and which is fixed when magnification of the variable magnification optical system is changed, plural lens groups that move when magnification of the variable magnification optical system is changed, the number of the plural lens groups being less than or equal to three, and a final lens group having positive refractive power, and which is fixed when magnification of the variable magnification optical system is changed. The first lens group, the plural lens groups and the final lens group are arranged from the magnification side in the order mentioned above. In the variable magnification optical system for projection according to the fifth aspect of the present invention, a stop is arranged in the final lens group, thereby setting the numerical aperture of the variable magnification optical system constant through the entire range of variable magnification. Therefore, if the magnification ratio of projection is the same, the luminance of a projection screen is constant, regardless of the projection distance. Therefore, the variable magnification optical system for projection is appropriate for use at movie theaters.

When the variable magnification optical system according to the fifth aspect of the present invention satisfies the formulas (18) and (19), it is possible to obtain an appropriate magnification ratio and an image circle in an appropriate size for movie theaters, while preventing the size of the lens system from becoming large.

Further, a projection-type display apparatus according to an aspect of the present invention includes a variable magnification optical system for projection according to the present invention. Therefore, it is possible to project excellent images, while structuring the apparatus in a compact size.

Further, a projection-type display apparatus according to another aspect of the present invention includes a zoom lens for projection according to the present invention. Therefore, it is possible to project excellent images, while structuring the apparatus in a compact size.

BRIEF DESCRIPTION OF THE DRAWINGS

FIG. 31A-$i$ is a diagram illustrating spherical aberration of the zoom lens for projection in Example 1 at wide angle end;

FIG. 31A-$ii$ is a diagram illustrating astigmatism of the zoom lens for projection in Example 1 at wide angle end;

FIG. 31A-$iii$ is a diagram illustrating distortion of the zoom lens for projection in Example 1 at wide angle end;

FIG. 31A-$iv$ is a diagram illustrating lateral chromatic aberration of the zoom lens for projection in Example 1 at wide angle end;

FIG. 31B-$i$ is a diagram illustrating spherical aberration of the zoom lens for projection in Example 1 at middle position;

FIG. 31B-$ii$ is a diagram illustrating astigmatism of the zoom lens for projection in Example 1 at middle position;

FIG. 31B-$iii$ is a diagram illustrating distortion of the zoom lens for projection in Example 1 at middle position;

FIG. 31B-$iv$ is a diagram illustrating lateral chromatic aberration of the zoom lens for projection in Example 1 at middle position;

FIG. 31C-$i$ is a diagram illustrating spherical aberration of the zoom lens for projection in Example 1 at telephoto end;

FIG. 31C-$ii$ is a diagram illustrating astigmatism of the zoom lens for projection in Example 1 at telephoto end;

FIG. 31C-$iii$ is a diagram illustrating distortion of the zoom lens for projection in Example 1 at telephoto end;

FIG. 31C-$iv$ is a diagram illustrating lateral chromatic aberration of the zoom lens for projection in Example 1 at telephoto end;

FIG. 32A-$i$ is a diagram illustrating spherical aberration of the zoom lens for projection in Example 2 at wide angle end;

FIG. 32A-$ii$ is a diagram illustrating astigmatism of the zoom lens for projection in Example 2 at wide angle end;

FIG. 32A-$iii$ is a diagram illustrating distortion of the zoom lens for projection in Example 2 at wide angle end;

FIG. 32A-$iv$ is a diagram illustrating lateral chromatic aberration of the zoom lens for projection in Example 2 at wide angle end;

FIG. 32B-$i$ is a diagram illustrating spherical aberration of the zoom lens for projection in Example 2 at middle position;

FIG. 32B-$ii$ is a diagram illustrating astigmatism of the zoom lens for projection in Example 2 at middle position;

FIG. 32B-$iii$ is a diagram illustrating distortion of the zoom lens for projection in Example 2 at middle position;

FIG. 32B-$iv$ is a diagram illustrating lateral chromatic aberration of the zoom lens for projection in Example 2 at middle position;

FIG. 32C-$i$ is a diagram illustrating spherical aberration of the zoom lens for projection in Example 2 at telephoto end;

FIG. 32C-$ii$ is a diagram illustrating astigmatism of the zoom lens for projection in Example 2 at telephoto end;

FIG. 32C-$iii$ is a diagram illustrating distortion of the zoom lens for projection in Example 2 at telephoto end;

FIG. 32C-$iv$ is a diagram illustrating lateral chromatic aberration of the zoom lens for projection in Example 2 at telephoto end;

FIG. 33A-$i$ is a diagram illustrating spherical aberration of the zoom lens for projection in Example 3 at wide angle end;

FIG. 33A-*ii* is a diagram illustrating astigmatism of the zoom lens for projection in Example 3 at wide angle end;

FIG. 33A-*iii* is a diagram illustrating distortion of the zoom lens for projection in Example 3 at wide angle end;

FIG. 33A-*iv* is a diagram illustrating lateral chromatic aberration of the zoom lens for projection in Example 3 at wide angle end;

FIG. 33B-*i* is a diagram illustrating spherical aberration of the zoom lens for projection in Example 3 at middle position;

FIG. 33B-*ii* is a diagram illustrating astigmatism of the zoom lens for projection in Example 3 at middle position;

FIG. 33B-*iii* is a diagram illustrating distortion of the zoom lens for projection in Example 3 at middle position;

FIG. 33B-*iv* is a diagram illustrating lateral chromatic aberration of the zoom lens for projection in Example 3 at middle position;

FIG. 33C-*i* is a diagram illustrating spherical aberration of the zoom lens for projection in Example 3 at telephoto end;

FIG. 33C-*ii* is a diagram illustrating astigmatism of the zoom lens for projection in Example 3 at telephoto end;

FIG. 33C-*iii* is a diagram illustrating distortion of the zoom lens for projection in Example 3 at telephoto end;

FIG. 33C-*iv* is a diagram illustrating lateral chromatic aberration of the zoom lens for projection in Example 3 at telephoto end;

FIG. 34A-*i* is a diagram illustrating spherical aberration of the zoom lens for projection in Example 4 at wide angle end;

FIG. 34A-*ii* is a diagram illustrating astigmatism of the zoom lens for projection in Example 4 at wide angle end;

FIG. 34A-*iii* is a diagram illustrating distortion of the zoom lens for projection in Example 4 at wide angle end;

FIG. 34A-*iv* is a diagram illustrating lateral chromatic aberration of the zoom lens for projection in Example 4 at wide angle end;

FIG. 34B-*i* is a diagram illustrating spherical aberration of the zoom lens for projection in Example 4 at middle position;

FIG. 34B-*ii* is a diagram illustrating astigmatism of the zoom lens for projection in Example 4 at middle position;

FIG. 34B-*iii* is a diagram illustrating distortion of the zoom lens for projection in Example 4 at middle position;

FIG. 34B-*iv* is a diagram illustrating lateral chromatic aberration of the zoom lens for projection in Example 4 at middle position;

FIG. 34C-*i* is a diagram illustrating spherical aberration of the zoom lens for projection in Example 4 at telephoto end;

FIG. 34C-*ii* is a diagram illustrating astigmatism of the zoom lens for projection in Example 4 at telephoto end;

FIG. 34C-*iii* is a diagram illustrating distortion of the zoom lens for projection in Example 4 at telephoto end;

FIG. 34C-*iv* is a diagram illustrating lateral chromatic aberration of the zoom lens for projection in Example 4 at telephoto end;

FIG. 35A-*i* is a diagram illustrating spherical aberration of the zoom lens for projection in Example 5 at wide angle end;

FIG. 35A-*ii* is a diagram illustrating astigmatism of the zoom lens for projection in Example 5 at wide angle end;

FIG. 35A-*iii* is a diagram illustrating distortion of the zoom lens for projection in Example 5 at wide angle end;

FIG. 35A-*iv* is a diagram illustrating lateral chromatic aberration of the zoom lens for projection in Example 5 at wide angle end;

FIG. 35B-*i* is a diagram illustrating spherical aberration of the zoom lens for projection in Example 5 at middle position;

FIG. 35B-*ii* is a diagram illustrating astigmatism of the zoom lens for projection in Example 5 at middle position;

FIG. 35B-*iii* is a diagram illustrating distortion of the zoom lens for projection in Example 5 at middle position;

FIG. 35B-*iv* is a diagram illustrating lateral chromatic aberration of the zoom lens for projection in Example 5 at middle position;

FIG. 35C-*i* is a diagram illustrating spherical aberration of the zoom lens for projection in Example 5 at telephoto end;

FIG. 35C-*ii* is a diagram illustrating astigmatism of the zoom lens for projection in Example 5 at telephoto end;

FIG. 35C-*iii* is a diagram illustrating distortion of the zoom lens for projection in Example 5 at telephoto end;

FIG. 35C-*iv* is a diagram illustrating lateral chromatic aberration of the zoom lens for projection in Example 5 at telephoto end;

FIG. 36A-*i* is a diagram illustrating spherical aberration of the zoom lens for projection in Example 6 at wide angle end;

FIG. 36A-*ii* is a diagram illustrating astigmatism of the zoom lens for projection in Example 6 at wide angle end;

FIG. 36A-*iii* is a diagram illustrating distortion of the zoom lens for projection in Example 6 at wide angle end;

FIG. 36A-*iv* is a diagram illustrating lateral chromatic aberration of the zoom lens for projection in Example 6 at wide angle end;

FIG. 36B-*i* is a diagram illustrating spherical aberration of the zoom lens for projection in Example 6 at middle position;

FIG. 36B-*ii* is a diagram illustrating astigmatism of the zoom lens for projection in Example 6 at middle position;

FIG. 36B-*iii* is a diagram illustrating distortion of the zoom lens for projection in Example 6 at middle position;

FIG. 36B-*iv* is a diagram illustrating lateral chromatic aberration of the zoom lens for projection in Example 6 at middle position;

FIG. 36C-*i* is a diagram illustrating spherical aberration of the zoom lens for projection in Example 6 at telephoto end;

FIG. 36C-*ii* is a diagram illustrating astigmatism of the zoom lens for projection in Example 6 at telephoto end;

FIG. 36C-*iii* is a diagram illustrating distortion of the zoom lens for projection in Example 6 at telephoto end;

FIG. 36C-*iv* is a diagram illustrating lateral chromatic aberration of the zoom lens for projection in Example 6 at telephoto end;

FIG. 37A-*i* is a diagram illustrating spherical aberration of the zoom lens for projection in Example 7 at wide angle end;

FIG. 37A-*ii* is a diagram illustrating astigmatism of the zoom lens for projection in Example 7 at wide angle end;

FIG. 37A-*iii* is a diagram illustrating distortion of the zoom lens for projection in Example 7 at wide angle end;

FIG. 37A-*iv* is a diagram illustrating lateral chromatic aberration of the zoom lens for projection in Example 7 at wide angle end;

FIG. 37B-*i* is a diagram illustrating spherical aberration of the zoom lens for projection in Example 7 at middle position;

FIG. 37B-*ii* is a diagram illustrating astigmatism of the zoom lens for projection in Example 7 at middle position;

FIG. 37B-*iii* is a diagram illustrating distortion of the zoom lens for projection in Example 7 at middle position;

FIG. 37B-*iv* is a diagram illustrating lateral chromatic aberration of the zoom lens for projection in Example 7 at middle position;

FIG. 37C-*i* is a diagram illustrating spherical aberration of the zoom lens for projection in Example 7 at telephoto end;

FIG. 37C-*ii* is a diagram illustrating astigmatism of the zoom lens for projection in Example 7 at telephoto end;

FIG. 37C-*iii* is a diagram illustrating distortion of the zoom lens for projection in Example 7 at telephoto end;

FIG. 37C-*iv* is a diagram illustrating lateral chromatic aberration of the zoom lens for projection in Example 7 at telephoto end;

FIG. 38A-*i* is a diagram illustrating spherical aberration of the zoom lens for projection in Example 8 at wide angle end;

FIG. 38A-*ii* is a diagram illustrating astigmatism of the zoom lens for projection in Example 8 at wide angle end;

FIG. 38A-*iii* is a diagram illustrating distortion of the zoom lens for projection in Example 8 at wide angle end;

FIG. 38A-*iv* is a diagram illustrating lateral chromatic aberration of the zoom lens for projection in Example 8 at wide angle end;

FIG. 38B-*i* is a diagram illustrating spherical aberration of the zoom lens for projection in Example 8 at middle position;

Figure 1:
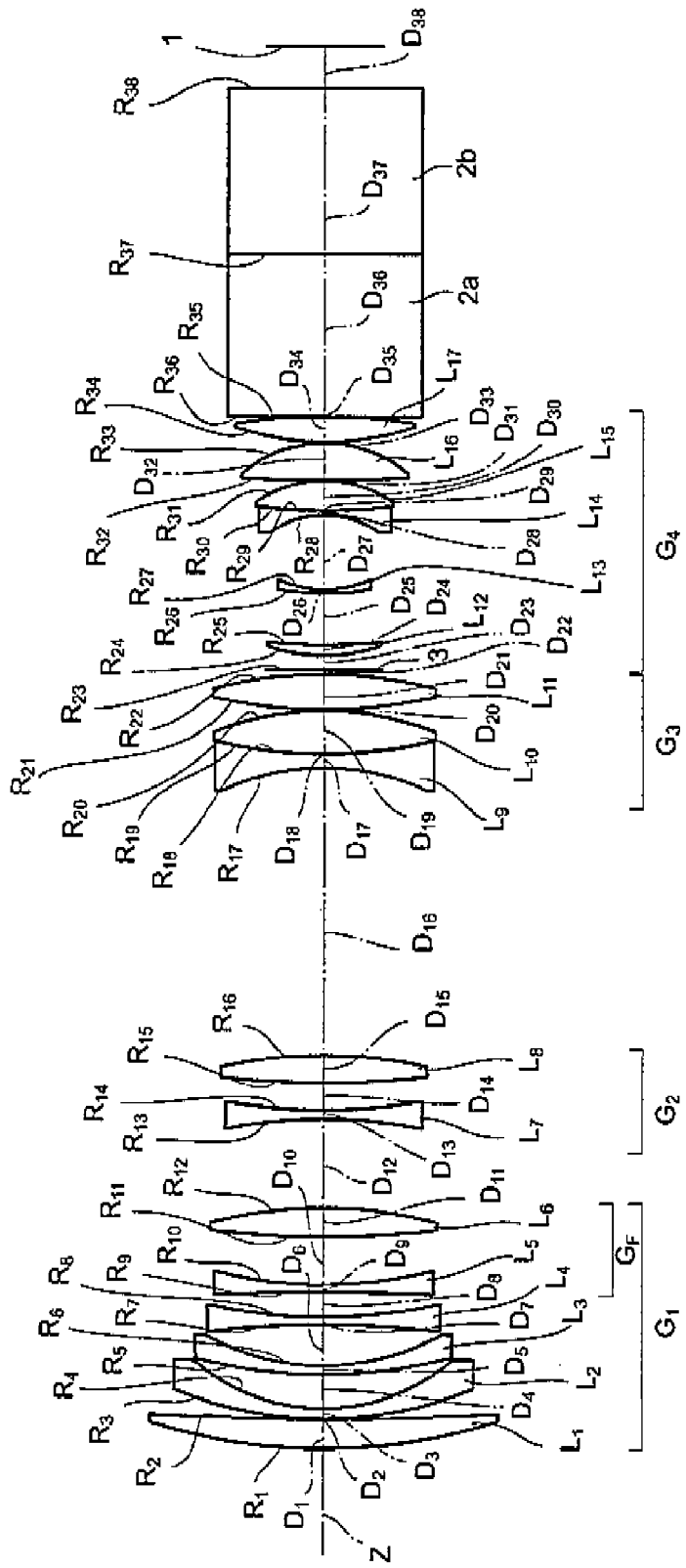
FIG. 1 is a detailed diagram illustrating the structure of a zoom lens for projection in Example 1.
Figure 46:
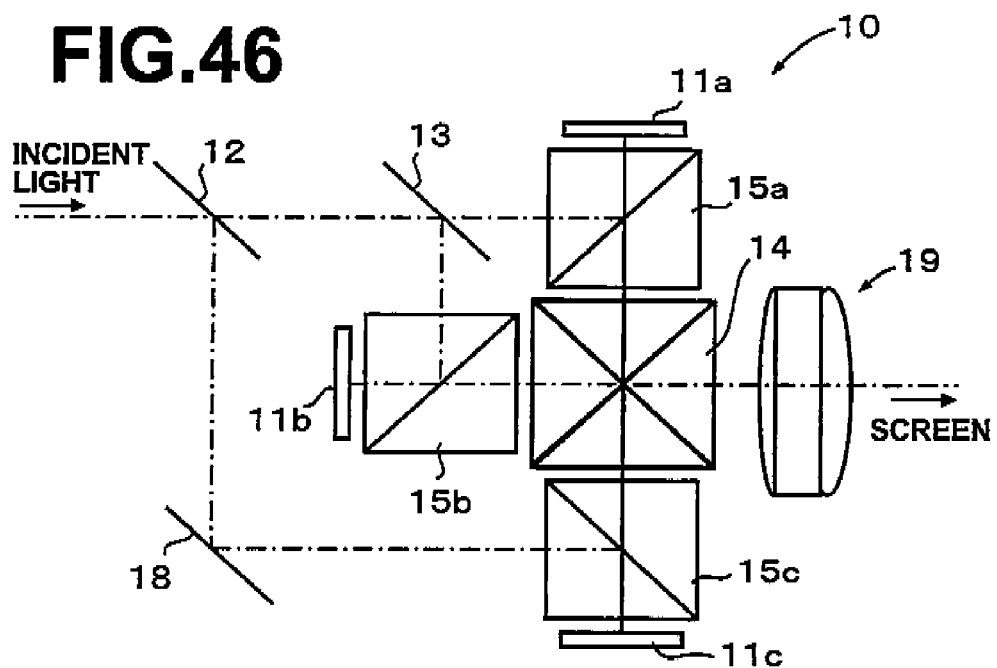
Figure 47:
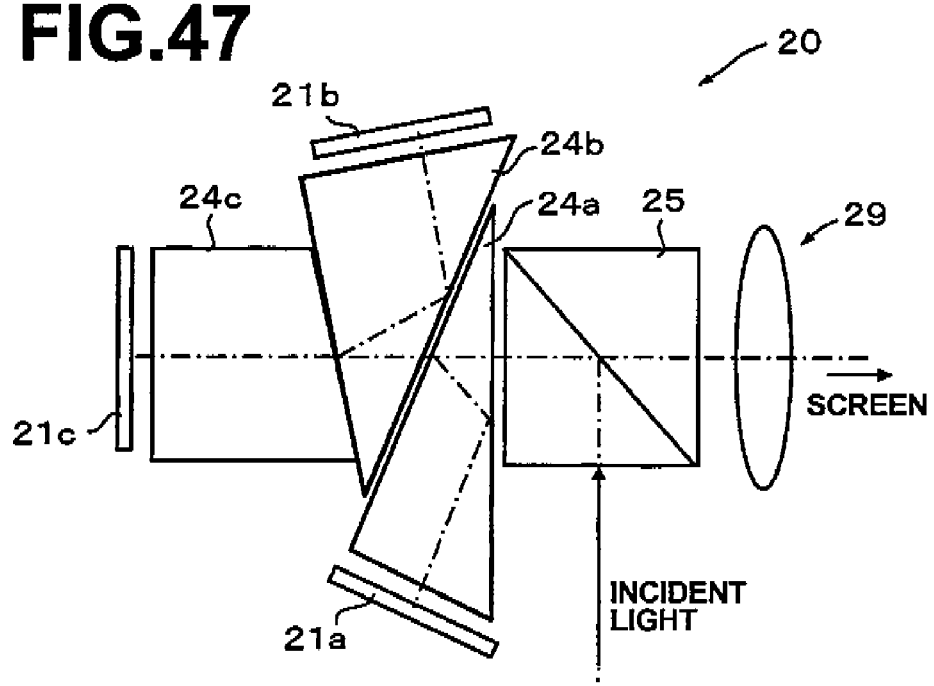

FIG. 38B-*ii* is a diagram illustrating astigmatism of the zoom lens for projection in Example 8 at middle position;

FIG. 38B-*iii* is a diagram illustrating distortion of the zoom lens for projection in Example 8 at middle position;

FIG. 38B-*iv* is a diagram illustrating lateral chromatic aberration of the zoom lens for projection in Example 8 at middle position;

FIG. 38C-*i* is a diagram illustrating spherical aberration of the zoom lens for projection in Example 8 at telephoto end;

FIG. 38C-*ii* is a diagram illustrating astigmatism of the zoom lens for projection in Example 8 at telephoto end;

FIG. 38C-*iii* is a diagram illustrating distortion of the zoom lens for projection in Example 8 at telephoto end;

FIG. 38C-*iv* is a diagram illustrating lateral chromatic aberration of the zoom lens for projection in Example 8 at telephoto end;

FIG. 39A-*i* is a diagram illustrating spherical aberration of the zoom lens for projection in Example 9 at wide angle end;

FIG. 39A-*ii* is a diagram illustrating astigmatism of the zoom lens for projection in Example 9 at wide angle end;

FIG. 39A-*iii* is a diagram illustrating distortion of the zoom lens for projection in Example 9 at wide angle end;

FIG. 39A-*iv* is a diagram illustrating lateral chromatic aberration of the zoom lens for projection in Example 9 at wide angle end;

FIG. 39B-*i* is a diagram illustrating spherical aberration of the zoom lens for projection in Example 9 at middle position;

FIG. 39B-*ii* is a diagram illustrating astigmatism of the zoom lens for projection in Example 9 at middle position;

FIG. 39B-*iii* is a diagram illustrating distortion of the zoom lens for projection in Example 9 at middle position;

FIG. 39B-*iv* is a diagram illustrating lateral chromatic aberration of the zoom lens for projection in Example 9 at middle position;

FIG. 39C-*i* is a diagram illustrating spherical aberration of the zoom lens for projection in Example 9 at telephoto end;

FIG. 39C-*ii* is a diagram illustrating astigmatism of the zoom lens for projection in Example 9 at telephoto end;

FIG. 39C-*iii* is a diagram illustrating distortion of the zoom lens for projection in Example 9 at telephoto end;

FIG. 39C-*iv* is a diagram illustrating lateral chromatic aberration of the zoom lens for projection in Example 9 at telephoto end;

FIG. 40A-*i* is a diagram illustrating spherical aberration of the zoom lens for projection in Example 10 at wide angle end;

FIG. 40A-*ii* is a diagram illustrating astigmatism of the zoom lens for projection in Example 10 at wide angle end;

FIG. 40A-*iii* is a diagram illustrating distortion of the zoom lens for projection in Example 10 at wide angle end;

FIG. 40A-*iv* is a diagram illustrating lateral chromatic aberration of the zoom lens for projection in Example 10 at wide angle end;

FIG. 40B-*i* is a diagram illustrating spherical aberration of the zoom lens for projection in Example 10 at middle position;

FIG. 40B-*ii* is a diagram illustrating astigmatism of the zoom lens for projection in Example 10 at middle position;

FIG. 40B-*iii* is a diagram illustrating distortion of the zoom lens for projection in Example 10 at middle position;

FIG. 40B-*iv* is a diagram illustrating lateral chromatic aberration of the zoom lens for projection in Example 10 at middle position;

FIG. 40C-*i* is a diagram illustrating spherical aberration of the zoom lens for projection in Example 10 at telephoto end;

FIG. 40C-*ii* is a diagram illustrating astigmatism of the zoom lens for projection in Example 10 at telephoto end;

FIG. 40C-*iii* is a diagram illustrating distortion of the zoom lens for projection in Example 10 at telephoto end;

FIG. 40C-*iv* is a diagram illustrating lateral chromatic aberration of the zoom lens for projection in Example 10 at telephoto end;

FIG. 41A-*i* is a diagram illustrating spherical aberration of the zoom lens for projection in Example 11 at wide angle end;

FIG. 41A-*ii* is a diagram illustrating astigmatism of the zoom lens for projection in Example 11 at wide angle end;

FIG. 41A-*iii* is a diagram illustrating distortion of the zoom lens for projection in Example 11 at wide angle end;

FIG. 41A-*iv* is a diagram illustrating lateral chromatic aberration of the zoom lens for projection in Example 11 at wide angle end;

FIG. 41B-*i* is a diagram illustrating spherical aberration of the zoom lens for projection in Example 11 at middle position;

FIG. 41B-*ii* is a diagram illustrating astigmatism of the zoom lens for projection in Example 11 at middle position;

FIG. 41B-*iii* is a diagram illustrating distortion of the zoom lens for projection in Example 11 at middle position;

FIG. 41B-*iv* is a diagram illustrating lateral chromatic aberration of the zoom lens for projection in Example 11 at middle position;

FIG. 41C-*i* is a diagram illustrating spherical aberration of the zoom lens for projection in Example 11 at telephoto end;

FIG. 41C-*ii* is a diagram illustrating astigmatism of the zoom lens for projection in Example 11 at telephoto end;

FIG. 41C-*iii* is a diagram illustrating distortion of the zoom lens for projection in Example 11 at telephoto end;

FIG. 41C-*iv* is a diagram illustrating lateral chromatic aberration of the zoom lens for projection in Example 11 at telephoto end;

FIG. 42A-*i* is a diagram illustrating spherical aberration of the zoom lens for projection in Example 12 at wide angle end;

FIG. 42A-*ii* is a diagram illustrating astigmatism of the zoom lens for projection in Example 12 at wide angle end;

FIG. 42A-*iii* is a diagram illustrating distortion of the zoom lens for projection in Example 12 at wide angle end;

FIG. 42A-*iv* is a diagram illustrating lateral chromatic aberration of the zoom lens for projection in Example 12 at wide angle end;

FIG. 42B-*i* is a diagram illustrating spherical aberration of the zoom lens for projection in Example 12 at middle position;

FIG. 42B-*ii* is a diagram illustrating astigmatism of the zoom lens for projection in Example 12 at middle position;

FIG. 42B-*iii* is a diagram illustrating distortion of the zoom lens for projection in Example 12 at middle position;

FIG. 42B-*iv* is a diagram illustrating lateral chromatic aberration of the zoom lens for projection in Example 12 at middle position;

FIG. 42C-*i* is a diagram illustrating spherical aberration of the zoom lens for projection in Example 12 at telephoto end;

FIG. 42C-*ii* is a diagram illustrating astigmatism of the zoom lens for projection in Example 12 at telephoto end;

FIG. 42C-*iii* is a diagram illustrating distortion of the zoom lens for projection in Example 12 at telephoto end;

FIG. 42C-*iv* is a diagram illustrating lateral chromatic aberration of the zoom lens for projection in Example 12 at telephoto end;

FIG. 43A-*i* is a diagram illustrating spherical aberration of the zoom lens for projection in Example 13 at wide angle end;

FIG. 43A-*ii* is a diagram illustrating astigmatism of the zoom lens for projection in Example 13 at wide angle end;

FIG. 43A-*iii* is a diagram illustrating distortion of the zoom lens for projection in Example 13 at wide angle end;

FIG. 43A-*iv* is a diagram illustrating lateral chromatic aberration of the zoom lens for projection in Example 13 at wide angle end;

FIG. 43B-*i* is a diagram illustrating spherical aberration of the zoom lens for projection in Example 13 at middle position;

FIG. 43B-*ii* is a diagram illustrating astigmatism of the zoom lens for projection in Example 13 at middle position;

FIG. 43B-*iii* is a diagram illustrating distortion of the zoom lens for projection in Example 13 at middle position;

FIG. 43B-*iv* is a diagram illustrating lateral chromatic aberration of the zoom lens for projection in Example 13 at middle position;

FIG. 43C-*i* is a diagram illustrating spherical aberration of the zoom lens for projection in Example 13 at telephoto end;

FIG. 43C-*ii* is a diagram illustrating astigmatism of the zoom lens for projection in Example 13 at telephoto end;

FIG. 43C-*iii* is a diagram illustrating distortion of the zoom lens for projection in Example 13 at telephoto end;

FIG. 43C-*iv* is a diagram illustrating lateral chromatic aberration of the zoom lens for projection in Example 13 at telephoto end;

FIG. 44A-*i* is a diagram illustrating spherical aberration of the zoom lens for projection in Example 14 at wide angle end;

FIG. 44A-*ii* is a diagram illustrating astigmatism of the zoom lens for projection in Example 14 at wide angle end;

FIG. 44A-*iii* is a diagram illustrating distortion of the zoom lens for projection in Example 14 at wide angle end;

FIG. 44A-*iv* is a diagram illustrating lateral chromatic aberration of the zoom lens for projection in Example 14 at wide angle end;

FIG. 44B-*i* is a diagram illustrating spherical aberration of the zoom lens for projection in Example 14 at middle position;

FIG. 44B-*ii* is a diagram illustrating astigmatism of the zoom lens for projection in Example 14 at middle position;

FIG. 44B-*iii* is a diagram illustrating distortion of the zoom lens for projection in Example 14 at middle position;

FIG. 44B-*iv* is a diagram illustrating lateral chromatic aberration of the zoom lens for projection in Example 14 at middle position;

FIG. 44C-*i* is a diagram illustrating spherical aberration of the zoom lens for projection in Example 14 at telephoto end;

FIG. 44C-*ii* is a diagram illustrating astigmatism of the zoom lens for projection in Example 14 at telephoto end;

FIG. 44C-*iii* is a diagram illustrating distortion of the zoom lens for projection in Example 14 at telephoto end;

FIG. 44C-*iv* is a diagram illustrating lateral chromatic aberration of the zoom lens for projection in Example 14 at telephoto end;

FIG. 45A-*i* is a diagram illustrating spherical aberration of the zoom lens for projection in Example 15 at wide angle end;

FIG. 45A-*ii* is a diagram illustrating astigmatism of the zoom lens for projection in Example 15 at wide angle end;

FIG. 45A-*iii* is a diagram illustrating distortion of the zoom lens for projection in Example 15 at wide angle end;

FIG. 45A-*iv* is a diagram illustrating lateral chromatic aberration of the zoom lens for projection in Example 15 at wide angle end;

FIG. 45B-*i* is a diagram illustrating spherical aberration of the zoom lens for projection in Example 15 at middle position;

FIG. 45B-*ii* is a diagram illustrating astigmatism of the zoom lens for projection in Example 15 at middle position;

FIG. 45B-*iii* is a diagram illustrating distortion of the zoom lens for projection in Example 15 at middle position;

FIG. 45B-*iv* is a diagram illustrating lateral chromatic aberration of the zoom lens for projection in Example 15 at middle position;

FIG. 45C-*i* is a diagram illustrating spherical aberration of the zoom lens for projection in Example 15 at telephoto end;

FIG. 45C-*ii* is a diagram illustrating astigmatism of the zoom lens for projection in Example 15 at telephoto end;

FIG. 45C-*iii* is a diagram illustrating distortion of the zoom lens for projection in Example 15 at telephoto end;

FIG. 45C-*iv* is a diagram illustrating lateral chromatic aberration of the zoom lens for projection in Example 15 at telephoto end;

FIG. 46 is a schematic diagram illustrating the structure of a projection-type display apparatus according to an embodiment of the present invention; and FIG. 47 is a schematic diagram illustrating the structure of a projection-type display apparatus according to another embodiment of the present invention.

DESCRIPTION OF THE PREFERRED EMBODIMENTS

Hereinafter, embodiments of the present invention will be described with reference to drawings.

First Embodiment

Zoom Lens

Figure 2:
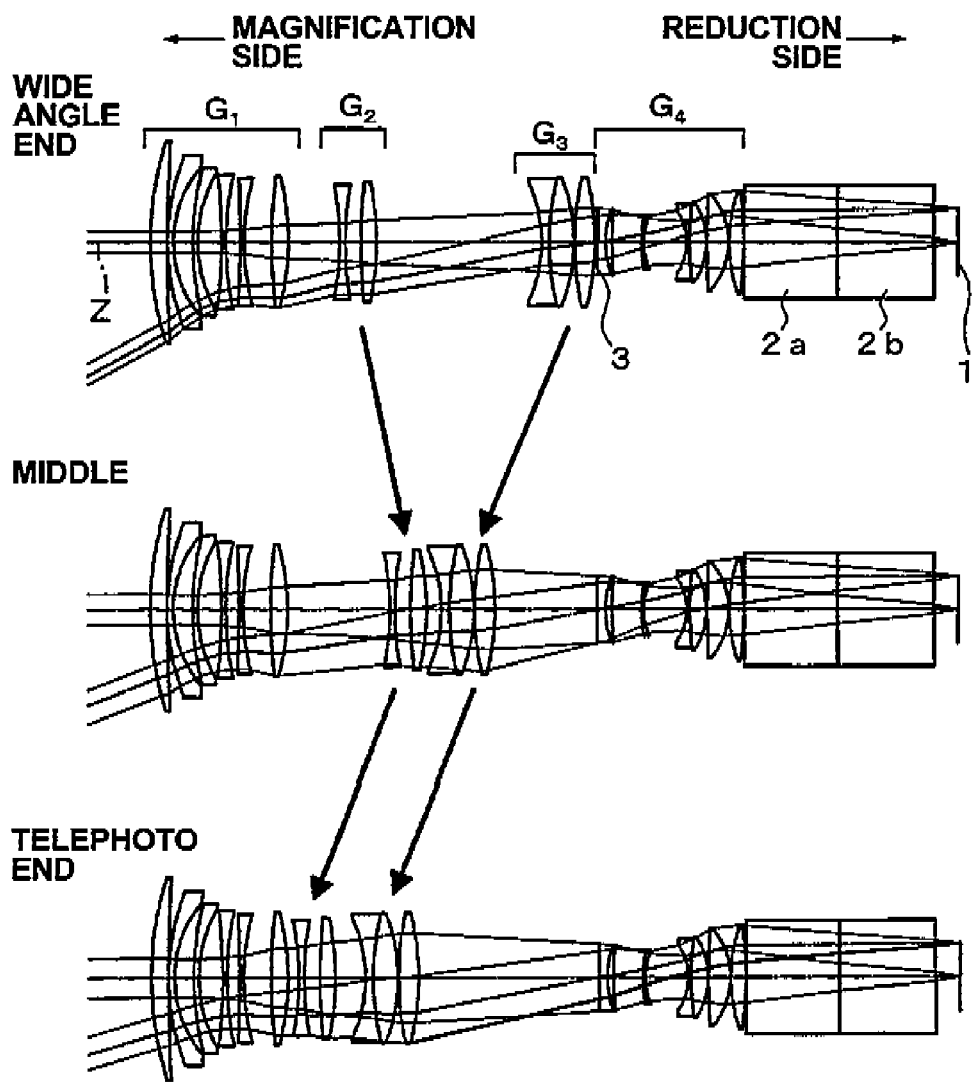
FIG. 2 is a diagram illustrating movement paths of lens groups when magnification of the variable magnification optical system is changed, and the paths of incident rays in the zoom lens for projection in Example 1.

First, with reference to FIGS. 1 and 2, a first embodiment of the present invention will be described. A variable magnification optical system according to the first embodiment of the present invention is a zoom lens for projection. FIG. 1 is a diagram illustrating the structure of the zoom lens for projection in the first embodiment of the present invention. FIG. 1 corresponds to Example 1, which will be described later. FIG. 2 is a diagram illustrating a position to which each lens group moves at wide angle end, at middle position and at telephoto end when variable magnification operations are performed on the zoom lens illustrated in FIG. 1. Arrows in FIG. 2 schematically illustrate the directions of movement of movable lens groups (moving lens groups) when the zoom lens moves from wide angle end to middle position, and from middle position to telephoto end. Further, FIG. 2 illustrates paths of rays entering the zoom lens, i.e., axial rays and off-axial rays at a maximum angle of view. In FIGS. 1 and 2, line Z represents an optical axis. The first embodiment of the present invention will be described by using the zoom lens illustrated in FIGS. 1 and 2 as an example.

A light valve (a reflective liquid crystal display panel (LCOS (liquid crystal on silicon) type), a transmissive liquid crystal display panel, a DMD (digital micromirror device), or the like) is arranged on the reduction side of the zoom lens for projection in the first embodiment. Information is given to rays at an image display plane 1 of the light valve, and the rays enter the zoom lens for projection of the first embodiment, through glass blocks 2a, 2b, such as color combination prisms (one of filters or the like may be included), from the reduction side (right side in FIGS. 1 and 2). Further, the zoom lens for projection magnifies and projects an image onto a screen arranged on the magnification side of the zoom lens (left side in FIGS. 1 and 2).

The zoom lens for projection according to the first embodiment of the present invention includes first lens group $G_1$ having negative refractive power, second lens group $G_2$ having negative refractive power, third lens group $G_3$ having positive refractive power, and fourth lens group $G_4$ having positive refractive power, which are arranged from the magnification side of the zoom lens in the order mentioned above. Further, the reduction side of the zoom lens for projection is telecentric.

Since the power is arranged in such a manner in the zoom lens for projection, the outer diameter of at least one magnification-side lens does not become too large even when the projection angle of the zoom lens is increased. Therefore, it is possible to easily increase the projection angle, and to suppress the fluctuation of aberration when magnification of the zoom lens is changed.

Further, when magnification of the variable magnification optical system is changed, the first lens group $G_1$ and the fourth lens group $G_4$ are fixed, and the second lens group $G_2$ and the third lens group $G_3$ are movable. Since the arrangement of the power of the movable lens groups is negative and positive from the magnification side, it is possible to obtain a high variable magnification ratio, while the diameter of at least one magnification-side lens remains in an appropriate size.

For example, the first lens group $G_1$ may be composed of a positive lens (first lens $L_1$ in the example illustrated in FIG. 1), which is arranged on the most magnification side, plural negative lenses (four negative lenses, namely, second lens $L_2$ through fifth lens $L_5$ in the example illustrated in FIG. 1), and a positive lens (sixth lens $L_6$ in the example illustrated in FIG. 1).

For example, the second lens group $G_2$ may be composed of two lenses of a negative lens and a positive lens, which are arranged from the magnification side in the order mentioned above (in the example illustrated in FIG. 1, seventh lens $L_7$ and eighth lens $L_8$).

For example, the third lens group $G_3$ may be composed of three lenses of a negative lens, a positive lens and a positive lens, which are arranged from the magnification side in the order mentioned above (in the example illustrated in FIG. 1, ninth lens $L_9$ through eleventh lens $L_{11}$).

For example, the fourth lens group $G_4$ may be composed of six lenses of a positive lens, two negative lenses, and three positive lenses, which are arranged from the magnification side in the order mentioned above (in the example illustrated in FIG. 1, twelfth lens $L_{12}$ through seventeenth lens $L_{17}$). Further, a stop (an aperture stop, a variable stop, or the like) 3 is arranged on the most magnification side in the fourth lens group $G_4$.

As described above, in a variable magnification optical system for projection, the reduction side of which is telecentric, the stop 3 is arranged on the reduction side of all of lens groups (second lens group $G_2$ and third lens group $G_3$ in the example illustrated in FIG. 1) that move when magnification of the variable magnification optical system is changed. Further, the stop 3 is fixed when magnification of the variable magnification optical system is changed. Therefore, Fno. (F-number) is constant through the entire range of variable magnification. Therefore, when the magnification ratio of projection is the same, the luminance of a projection screen is kept constant, regardless of the projection distance.

It is desirable that an inner focus method is used in focusing when a projection distance has changed. In the inner focus method, at least one reduction-side lens in the first lens group $G_1$ is moved in the direction of an optical axis. In the inner focus method adopted in the example illustrated in FIG. 1, two reduction-side lenses in the first lens group $G_1$ (fifth lens $L_5$ and sixth lens $L_6$) are moved in the direction of the optical axis. When the inner focus method is adopted, it is not necessary to drive at least one magnification-side lens the diameter of which is large, and which is heavy. Therefore, it is possible to reduce a burden on a drive mechanism, and to maintain constant total lens thickness during focusing. Alternatively, focusing may be performed by moving all or a part of lens groups other than the first lens group $G_1$. Alternatively, focusing may be performed by moving the whole first lens group $G_1$ or a part of the first lens group $G_1$ other than at least one reduction-side lens.

The zoom lens for projection according to the first embodiment is structured so as to satisfy the following formula (1) or (2):

$$1.5 < Bf/fw \qquad (1);$$

and $$-10.0 < f_1/fw < 0.0 \qquad (2),$$

where
Bf: back focus in air of entire system,
fw: focal length of entire system at wide angle end, and
$f_1$: focal length of first lens group $G_1$.

Alternatively, both of the formulas (1) and (2) may be satisfied.

The formula (1) defines the ratio of back focus Bf of entire system (in air) to focal length fw of the entire system at wide angle end. When the formula (1) is satisfied, it is possible to maintain an appropriate space for inserting a glass block or the like, as a beam splitter or a light combination means, such as a cross-dichroic prism and a TIR prism. Specifically, when the value of Bf/fw is lower than the lower limit defined by the formula (1), it becomes difficult to maintain a long back focus. Consequently, it becomes difficult to insert a glass block or the like as a light combination means on the reduction side of the lens system.

Therefore, it is desirable that the following formula (1') is satisfied instead of the formula (1):

$$2.0 < Bf/fw \qquad (1').$$

The formula (2) defines the power of the first lens group $G_1$. When the value of $f_1$/fw is lower than the lower limit defined by the formula (2), the outer diameter of at least one magnification-side lens becomes large, and it becomes difficult to increase the projection angle. Further, it becomes difficult to maintain a long back focus. Consequently, it becomes difficult to insert a glass block or the like as a light combination means on the reduction side of the lens system.

Therefore, it is desirable that the lower limit defined by the formula (2') is satisfied instead of the lower limit defined by the formula (2). Further, it is desirable that the upper limit defined by the formula (2') is satisfied to suppress curvature of field and distortion:

$$-6.0 < f_1/fw < -2.5 \qquad (2').$$

Further, it is desirable that the zoom lens for projection according to the first embodiment satisfies at least one of the following formulas (3) through (5):

$$f_2/fw < -5.0 \qquad (3);$$

$$1.5 < f_3/fw < 10.0 \qquad (4);$$

and $$1.0 < f_4/fw < 5.0 \qquad (5),$$

where
- $f_2$: focal length of the second lens group $G_2$,
- $f_3$: focal length of the third lens group $G_3$,
- $f_4$: focal length of the fourth lens group $G_4$, and
- fw: focal length of entire system at wide angle end.

The formula (3) defines the power of the second lens group $G_2$. When the value of $f_2$/fw exceeds the upper limit defined by the formula (3), the power of the second lens group $G_2$ becomes too high. Consequently, the power of the third lens group $G_3$ also becomes high. Therefore, it becomes difficult to correct curvature of field and chromatic aberrations.

Therefore, it is desirable that the following formula (3') is satisfied instead of the formula (3):

$$f_2/fw < -10.0 \tag{3'}$$

Further, the formula (4) defines the power of the third lens group $G_3$. When the value of $f_2$/fw exceeds the upper limit defined by the formula (4), the power of the third lens group $G_3$ becomes too low. Consequently, the amount of movement of the third lens group $G_3$ when magnification of the variable magnification optical system is changed increases, and the total lens thickness becomes thick. When the value of $f_3$/fw is lower than the lower limit defined by the formula (4), the power of the third lens group $G_3$ becomes too high, and it becomes difficult to correct spherical aberration and chromatic aberrations.

Therefore, it is desirable that the following formula (4') is satisfied instead of the formula (4):

$$3.0 < f_3/fw < 6.0 \tag{4'}$$

The formula (5) defines the power of the fourth lens group $G_4$. When the value of $f_4$/fw exceeds the upper limit defined by the formula (5), the power of the fourth lens group $G_4$ becomes too low. Consequently, spherical aberration at telephoto end becomes large. When the value of $f_4$/fw is lower than the lower limit defined by the formula (5), the power of the fourth lens group $G_4$ becomes too high. Consequently, it becomes difficult to correct spherical aberration, and the outer diameter of at least one magnification-side lens becomes large.

Therefore, it is desirable that the following formula (5') is satisfied instead of the formula (5):

$$2.0 < f_4/fw < 4.0 \tag{5'}$$

In the zoom lens for projection according to the first embodiment, it is desirable that each of all lenses is not a cemented lens but a single lens. When the zoom lens for projection is mounted on a projection-type display apparatus and a high output power light source is used together with the zoom lens for projection, there is a risk that the high intensity light greatly changes and degrades the quality of an adhesive or the like for cementing lenses together, thereby impairing the performance of the zoom lens. If no cemented lens is used, it is possible to prevent such a problem.

Further, the zoom lens for projection according to the first embodiment may be structured in such a manner that no aspheric surface is used, in other words, each surface of all lenses may be spherical, as in the example illustrated in FIG. 1. Such structure using no aspheric surface is cost-advantageous. Alternatively, the zoom lens for projection according to the first embodiment may include an aspheric surface. In that case, it is possible to correct aberrations in a more excellent manner.

Second Embodiment

Variable Magnification Optical System

Next, with reference to FIGS. 13 and 14, a second embodiment of the present invention will be described. The second embodiment of the present invention is a variable magnification optical system for projection. The variable magnification optical system for projection according to the second embodiment may be embodied in the following first through third modes. The example illustrated in FIGS. 13 and 14 includes the first through third modes. The second embodiment will be described by using the optical system illustrated in FIGS. 13 and 14 as an example.

Figure 13:
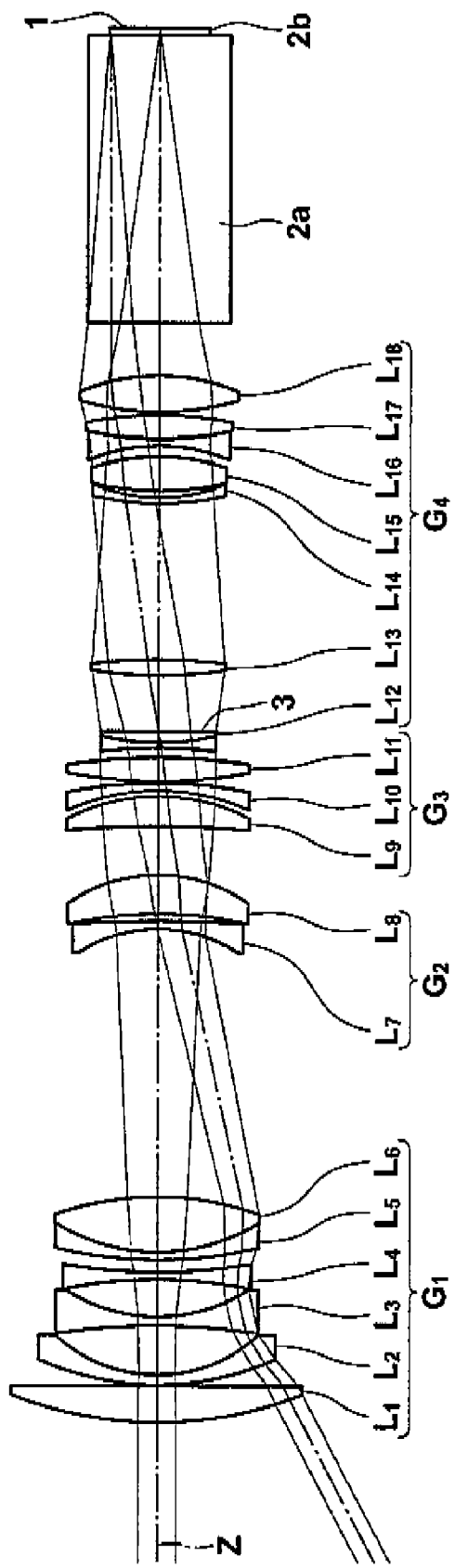
FIG. 13 is a detailed diagram illustrating the structure of a zoom lens for projection in Example 7.
Figure 14:
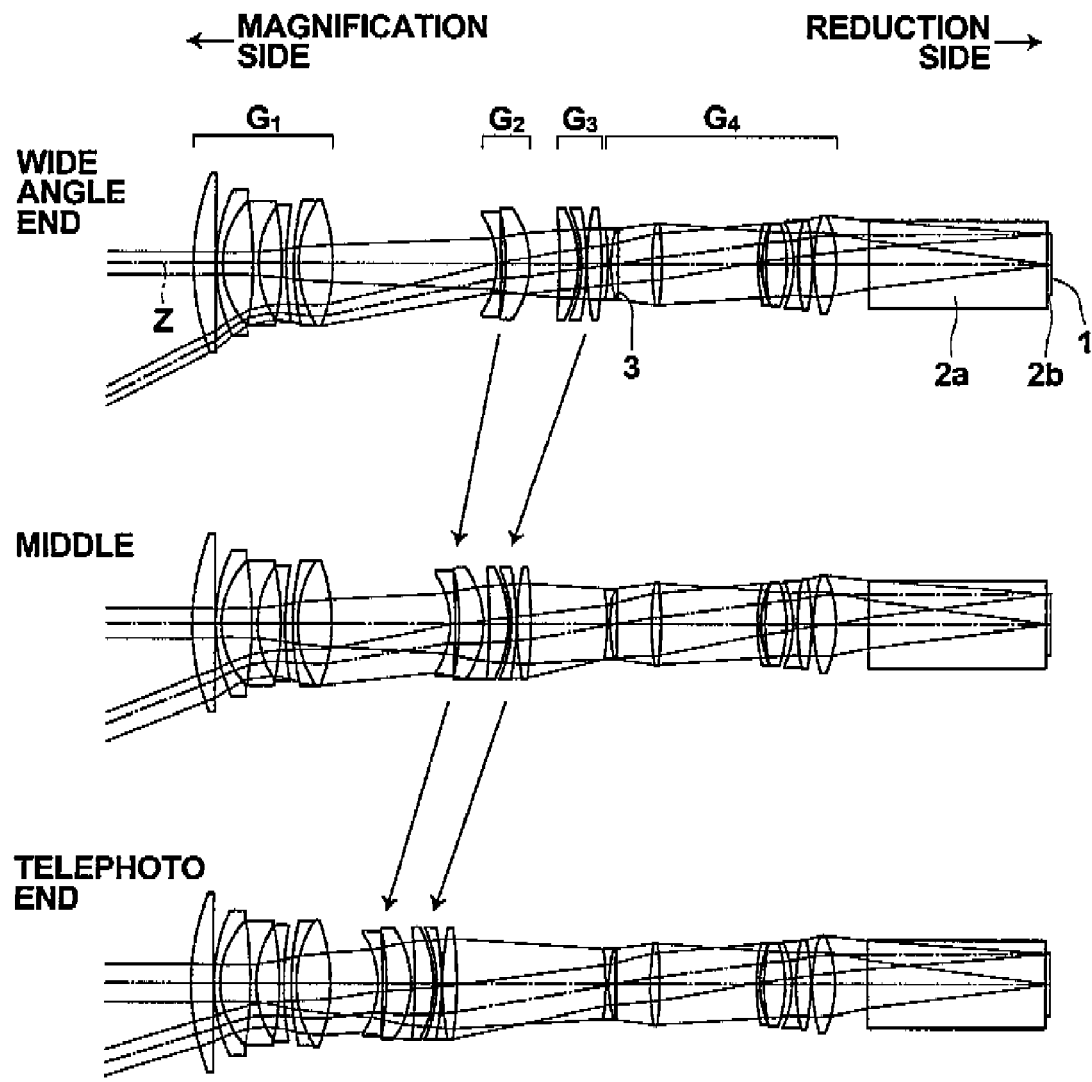
FIG. 14 is a diagram illustrating movement paths of lens groups when magnification of the variable magnification optical system is changed, and the paths of incident rays in the zoom lens for projection in Example 7.

FIG. 13 is a diagram illustrating the lens structure of the variable magnification optical system for projection in the second embodiment of the present invention. FIG. 13 corresponds to Example 7, which will be described later. FIG. 14 is a diagram illustrating a position to which each lens group moves at wide angle end, at middle position and at telephoto end when variable magnification operations are performed on the variable magnification optical system illustrated in FIG. 13. Arrows in FIG. 14 schematically illustrate the directions of movement of movable lens groups when the optical system moves from wide angle end to middle position, and from middle position to telephoto end. In FIGS. 13 and 14, line Z represents an optical axis. Further, FIG. 14 illustrates paths of rays entering the variable magnification optical system, i.e., axial rays and off-axial rays at a maximum angle of view.

A light valve (a reflective liquid crystal display panel (LCOS (liquid crystal on silicon) type), a transmissive liquid crystal display panel, a DMD (digital micromirror device), or the like) is arranged on the reduction side of the variable magnification optical system for projection in the second embodiment. Information is given to rays at an image display plane 1 of the light valve, and the rays enter the variable magnification optical system for projection of the second embodiment, through glass blocks 2a, 2b, such as color combination prisms (one of filters or the like may be included), from the reduction side (right side in FIGS. 13 and 14). Further, the variable magnification optical system for projection magnifies and projects an image onto a screen arranged on the magnification side of the variable magnification optical system for projection (left side in FIGS. 13 and 14).

First Mode of Second Embodiment

A variable magnification optical system for projection in first mode of the second embodiment of the present invention includes first lens group $G_1$ having negative refractive power, second lens group $G_2$ having negative refractive power, third lens group $G_3$ having positive refractive power, and fourth lens group $G_4$ having positive refractive power, which are arranged from the magnification side (screen side) of the variable magnification optical system in the order mentioned above. Further, the reduction side of the variable magnification optical system for projection is telecentric.

Since the refractive power is arranged in such a manner in the variable magnification optical system for projection, the outer diameter of at least one magnification-side lens is not too large even when the projection angle of the variable magnification optical system is increased. Therefore, it is possible to easily increase the projection angle, and to suppress the fluctuation of aberration when magnification of the variable magnification optical system lens is changed.

Further, when the magnification of the variable magnification optical system is changed, the first lens group $G_1$ and the fourth lens group $G_4$ are fixed, and the second lens group $G_2$ and the third lens group $G_3$ are movable. Since the arrangement of the power of the movable lens groups is negative and positive from the magnification side, it is possible to easily obtain a high variable magnification ratio, while the diameter of the variable magnification optical system is kept in an appropriate size.

For example, the first lens group $G_1$ may be composed of a positive lens (first lens $L_1$ in the example illustrated in FIG. 13), which is arranged on the most magnification side, plural negative lenses (four lenses, namely, second lens $L_2$ through fifth lens $L_5$ in the example illustrated in FIG. 13), and a positive lens (sixth lens $L_6$ in the example illustrated in FIG. 13).

For example, the second lens group $G_2$ may be composed of two lenses of a negative lens and a positive lens, which are arranged from the magnification side in the order mentioned above (in the example illustrated in FIG. 13, seventh lens $L_7$ and eighth lens $L_8$).

For example, the third lens group $G_3$ may be composed of three lenses of a positive lens, a negative lens and a positive lens, which are arranged from the magnification side in the order mentioned above (in the example illustrated in FIG. 13, ninth lens $L_9$ through eleventh lens $L_{11}$).

For example, the fourth lens group $G_4$ may be composed of seven lenses of a negative lens, a positive lens, a negative lens, a positive lens, a negative lens, and two positive lenses, which are arranged from the magnification side in the order mentioned above (in the example illustrated in FIG. 13, twelfth lens $L_{12}$ through eighteenth lens $L_{18}$).

Further, it is desirable that a stop (an aperture stop, a variable stop, or the like) 3 is arranged in the fourth lens group $G_4$, as illustrated in FIG. 13. As described above, in the variable magnification optical system for projection, the reduction of which is telecentric, the stop 3 is arranged on the reduction side of all of lens groups (second lens group $G_2$ and third lens group $G_3$ in the example illustrated in FIG. 13) that move when magnification of the variable magnification optical system is changed. Further, the stop 3 is fixed when magnification of the variable magnification optical system is changed. Therefore, Fno. (F-number) is constant through the entire range of variable magnification. Therefore, when the magnification ratio of projection is the same, the luminance of a projection screen is constant, regardless of the projection distance.

Further, when the stop 3 is a variable stop, if the stop 3 is arranged in a most-reduction-side fixed lens group, it is possible to easily set a variation mechanism for adjusting the stop 3. Especially, when the stop 3 is arranged on the most magnification side in the most-reduction-side fixed lens group, it is possible to more easily set the variation mechanism for adjusting the stop 3.

The variable magnification optical system for projection in the first mode of the second embodiment satisfies the following formula (11) or (12):

$$1.5 < Bf/fw \quad (11)$$

and $$-10.0 < f_1/fw < 0.0 \quad (12),$$

where
Bf: back focus of entire system (in air) at wide angle end,
fw: focal length of entire system at wide angle end, and
$f_1$: focal length of the first lens group $G_1$.

Alternatively, both of the formulas (11) and (12) may be satisfied.

Further, it is desirable that the variable magnification optical system for projection in the first mode of the second embodiment satisfies at least one of the formulas (13) through (16) and (18) through (20):

$$f_{MK}/fw < -3.5 \quad (13);$$

$$1.5 < f_{MS}/fw < 10.0 \quad (14);$$

$$1.0 < f_E/fw < 5.0 \quad (15);$$

$$1.8 < Bf/Im\phi \quad (16);$$

$$5.0 < Bf \times Zr^2/Im\phi \quad (18);$$

$$L/Im\phi < 12.5 \quad (19);$$

and $$1.4 < Zr \quad (20),$$

where
$f_{MK}$: focal length of a most-magnification-side lens group among plural lens groups that move when magnification of the variable magnification optical system is changed,
fw: focal length of entire system at wide angle end,
$f_{MS}$: focal length of a most-reduction-side lens group among plural lens groups that move when magnification of the variable magnification optical system is changed,
$f_E$: focal length of the lens group having positive refractive power that is arranged on the most reduction side in the entire system of the variable magnification optical system, and which is fixed when magnification of the variable magnification optical system is changed,
Bf: back focus of entire system (in air) at wide angle end,
$Im\phi$: diameter of a maximum effective image circle on the reduction side of the variable magnification optical system,
Zr: ratio of magnification at telephoto end to magnification at wide angle end, and
L: total lens thickness when projection distance is infinity.

Specifically, in the variable magnification optical system for projection in the first mode of the second embodiment, $f_{MK}$, $f_{MS}$, and $f_E$ are as follows:
$f_{MK}$: focal length of the second lens group $G_2$;
$f_{MS}$: focal length of the third lens group $G_3$; and
$f_E$: focal length of the fourth lens group $G_4$.

The actions and effects of the formulas (11) through (16) and (18) through (20) will be described later.

Second Mode of Second Embodiment

Next, a variable magnification optical system for projection in a second mode of the second embodiment of the present invention will be described. In the second mode, the variable magnification optical system includes first lens group $G_E$ having negative refractive power, and which is arranged on the most magnification side of the variable magnification optical system, and which is fixed when magnification of the variable magnification optical system is changed, a final lens group having positive refractive power, and which is arranged on the most reduction side of the variable magnification optical system, and which is fixed when magnification of the variable magnification optical system is changed, and plural lens groups that are arranged between the first lens group $G_1$ and the final lens group, and which move when magnification of the variable magnification optical system is changed. Further, the reduction side is telecentric. Further, a most-magnification-side lens group among the plural lens groups that move when magnification of the variable magnification optical system is changed has negative refractive power, and a most-reduction-side lens group among the plural lens groups has positive refractive power.

For example, in the example illustrated in FIG. 13, the final lens group corresponds to the fourth lens group $G_4$, and the plural lens groups that move when magnification of the variable magnification optical system is changed correspond to second lens group $G_2$ and third lens group $G_3$. As will be described in examples, the number of lens groups that move when magnification of the variable magnification optical system is changed is not limited to two in the second mode of the second embodiment. The number of the lens groups that move in the second mode of the second embodiment may be selected in an appropriate manner. For example, the number of the lenses may be three.

The movable lens groups are arranged in such a manner that a negative lens group is located on the most magnification side of the movable lens groups and a positive lens group is located on the most reduction side of the movable lens groups. Therefore, it is possible to obtain a high variable magnification ratio, while the outer diameter of at least one magnification-side lens remains in an appropriate size.

The variable magnification optical system for projection in the second mode of the second embodiment satisfies the following formulas (11) and (12'):

$$1.5 < Bf/fw \quad (11);$$

and $$-10.0 < f_1/fw < -2.0 \quad (12'),$$

where
  Bf: back focus of entire system (in air) at wide angle end,
  fw: focal length of entire system at wide angle end, and
  $f_1$: focal length of the first lens group.

Instead of satisfying the formulas (11) and (12'), the variable magnification optical system for projection in the second mode of the second embodiment may be structured in such a manner that a stop is arranged in the final lens group, thereby setting the numerical aperture constant through the entire range of magnification. When the variable magnification optical system for projection is structured in such a manner, the Fno. is kept constant through the entire range of magnification. If the magnification ratio of projection is the same, the luminance of a projection screen is constant, regardless of the projection distance.

Alternatively, the variable magnification optical system for projection in the second mode of the second embodiment may be structured in such a manner that the formulas (11) and (12') are satisfied, and that a stop is arranged in the final lens group, thereby setting the numerical aperture constant through the entire range of magnification.

Further, it is desirable that the variable magnification optical system in the second mode of the second embodiment satisfies at least one of the formulas (13) through (16) and (18) through (20):

$$f_{MK}/fw < -3.5 \quad (13);$$

$$1.5 < f_{MS}/fw < 10.0 \quad (14);$$

$$1.0 < f_E/fw < 5.0 \quad (15);$$

$$1.8 < Bf/Im\phi \quad (16);$$

$$5.0 < Bf \times Zr^2/Im\phi \quad (18);$$

$$L/Im\phi < 12.5 \quad (19);$$

and $$1.4 < Zr \quad (20),$$

where
  $f_{MK}$: focal length of a most-magnification-side lens group among plural lens groups that move when magnification of the variable magnification optical system is changed,
  fw: focal length of entire system at wide angle end,
  $f_{MS}$: focal length of a most-reduction-side lens group among plural lens groups that move when magnification of the variable magnification optical system is changed,
  $f_E$: focal length of the lens group having positive refractive power that is arranged on the most reduction side in the entire system of the variable magnification optical system, and which is fixed when magnification of the variable magnification optical system is changed,
  Bf: back focus of entire system (in air) at wide angle end,
  Im$\phi$: diameter of a maximum effective image circle on the reduction side of the variable magnification optical system,
  Zr: ratio of magnification at telephoto end to magnification at wide angle end, and
  L: total lens thickness when projection distance is infinity.

Specifically, in the variable magnification optical system for projection in the second mode of the second embodiment, $f_E$ is as follows:
  $f_E$: focal length of the final lens group.

In the variable magnification optical system for projection in the second mode of the second embodiment, when the number of the plural lens groups that move when magnification of the variable magnification optical system is changed is three, it is desirable that a second lens group from the magnification side among the three lens groups (in other words, a middle lens group among the lens groups in the entire system) has positive refractive power, and that the following formula (17) is satisfied:

$$5.0 < f_{Mm}/fw \quad (17),$$

where
  $f_{Mm}$: focal length of the second lens group from the magnification side among the three lens groups, and the three lens groups moving when magnification of the variable magnification optical system is changed, and
  fw: focal length of entire system at wide angle end.

For example, Example 10 illustrated in FIG. 19, which will be described later, is structured in the second mode of the second embodiment of the present invention. In Example 10, the entire system is composed of five lens groups of first lens group $G_1$ through fifth lens group $G_5$. Further, three lens groups move when magnification of the variable magnification optical system is changed. In Example 10 illustrated in FIG. 19, focal length of the third lens group $G_3$ is $f_m$.

Figure 19:
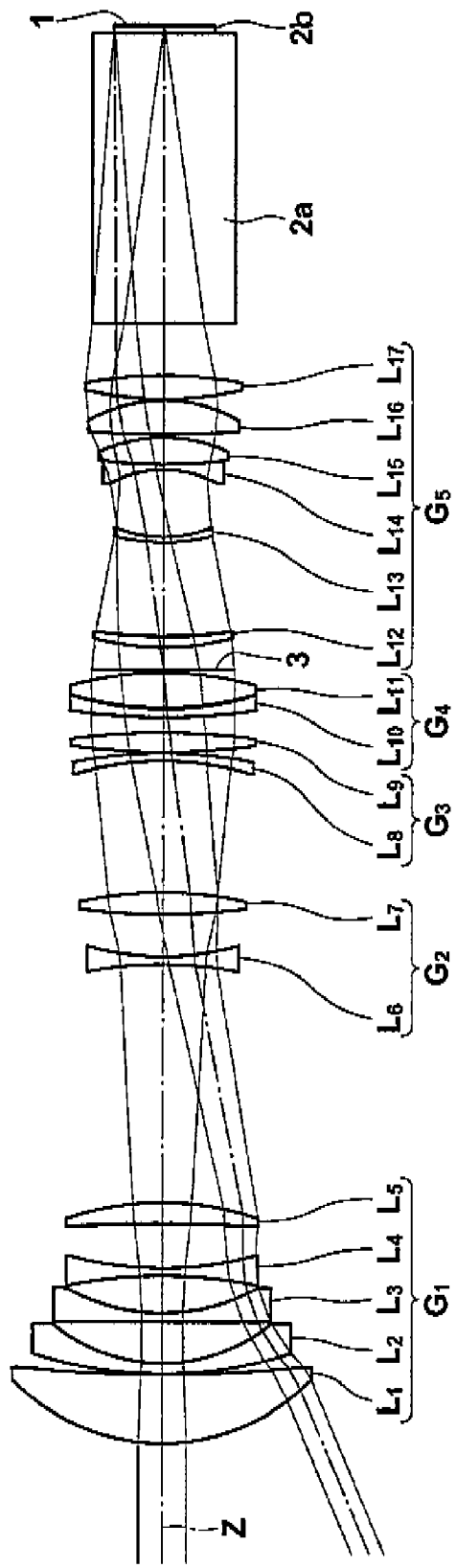
FIG. 19 is a detailed diagram illustrating the structure of a zoom lens for projection in Example 10.

In the example illustrated in FIG. 19, the arrangement of the power of the movable lens groups, which are three lens groups, is negative, positive, and positive from the magnification side. Therefore, it is possible to easily correct curvature of field through the entire range of magnification. Further, as illustrated in FIG. 19, when the variable magnification optical system is composed of five lens groups, and the arrangement of the power of the lens groups is negative, negative, positive, positive and positive from the magnification side, it is possible to realize an optical system having a long back focus and a high variable magnification ratio, and which is widely usable as a wide angle lens system through a medium telephoto lens system.

The actions and effects of the formulas (11), (12') and (13) through (20) will be described later.

Third Mode of Second Embodiment

Next, a variable magnification optical system for projection in a third mode of the second embodiment will be described. In the third mode, the variable magnification optical system includes first lens group $G_1$ having negative refractive power, and which is arranged on the most magnification side of the variable magnification optical system, and which is fixed when magnification of the variable magnification optical system is changed, a final lens group having positive refractive power, and which is arranged on the most reduction side of the variable magnification optical system, and which is fixed when magnification of the variable magnification optical system is changed, and two or three lens groups that are arranged between the first lens group $G_1$ and the final lens group, and which move when magnification of the variable magnification optical system is changed. Further, the reduction side is telecentric.

Further, in the variable magnification optical system for projection in the third mode of the second embodiment, a stop is arranged in the final lens group, thereby setting the numerical aperture constant through the entire range of magnification. Consequently, the Fno. is kept constant through the entire range of magnification. Therefore, if the magnification ratio of projection is the same, the luminance of a projection screen is constant, regardless of the projection distance.

Further, the variable magnification optical system in the third mode of the second embodiment satisfies the following formulas (18) and (19):

$$5.0 < Bf \times Zr^2 / Im\phi \quad (18);$$

and $$L/Im\phi < 12.5 \quad (19),$$

where

Bf: back focus of entire system (in air) at wide angle end,
Zr: ratio of magnification at telephoto end to magnification at wide angle end,
Im$\phi$: diameter of a maximum effective image circle on the reduction side of the variable magnification optical system, and
L: total lens thickness when projection distance is infinity.

In the variable magnification optical system for projection in the third mode of the second embodiment, it is desirable that the most-magnification-side lens group among the two or three lens groups that move when magnification of the variable magnification optical system is changed has negative refractive power. When the most-magnification-side lens group among the two or three lens groups that move when magnification of the variable magnification optical system is changed has negative refractive power, it is possible to easily obtain a high variable magnification ratio, while the diameter of at least one magnification-side lens remains in an appropriate size.

Further, it is desirable that the variable magnification optical system for projection in the third mode of the second embodiment satisfies at least one of the following formulas (11) through (16), and (20):

$$1.5 < Bf/fw \quad (11);$$

$$-10.0 < f_1/fw < 0.0 \quad (12),$$

$$f_{MK}/fw < -3.5 \quad (13);$$

$$1.5 < f_{MS}/fw < 10.0 \quad (14);$$

$$1.0 < f_E/fw < 5.0 \quad (15);$$

$$1.8 < Bf/Im\phi \quad (16);$$

and $$1.4 < Zr \quad (20),$$

where

Bf: back focus of entire system (in air) at wide angle end,
fw: focal length of entire system at wide angle end,
$f_1$: focal length of the first lens group $G_1$,
$f_{MK}$: focal length of a most-magnification-side lens group among plural lens groups that move when magnification of the variable magnification optical system is changed,
$f_{MS}$: focal length of a most-reduction-side lens group among plural lens groups that move when magnification of the variable magnification optical system is changed,
$f_E$: focal length of the lens group having positive refractive power that is arranged on the most reduction side in the entire system of the variable magnification optical system, and which is fixed when magnification of the variable magnification optical system is changed,
Im$\phi$: diameter of a maximum effective image circle on the reduction side of the variable magnification optical system, and
Zr: ratio of magnification at telephoto end to magnification at wide angle end.

Specifically, in the variable magnification optical system for projection in the third mode of the second embodiment, $f_E$ is as follows:

$f_E$: focal length of the final lens group.

In the variable magnification optical system for projection in the third mode of the second embodiment, when the number of the plural lens groups that move when magnification of the variable magnification optical system is changed is three, it is desirable that a second lens group from the magnification side among the three lens groups (in other words, a middle lens group among the lens groups in the entire system) has positive refractive power, and that the following formula (17) is satisfied in a manner similar to the second mode of the second embodiment:

$$5.0 < f_{Mm}/fw \quad (17),$$

where $f_{Mm}$: focal length of the second lens group from the magnification side among the three lens groups, and the three lens groups moving when magnification of the variable magnification optical system is changed, and
fw: focal length of entire system at wide angle end.

Next, the actions and the effects of the formulas (11) through (20) will be described.

The formula (11) defines the ratio of back focus Bf of entire system (in air) to focal length fw of the entire system at wide angle end. When the formula (11) is satisfied, it is possible to maintain an appropriate space for inserting a glass block or the like, as a beam splitter or a light combination means, such as a cross-dichroic prism and a TIR prism. Specifically, when the value of Bf/fw is lower than the lower limit defined by the formula (11), it becomes difficult to maintain a long back focus. Consequently, it becomes difficult to insert a glass block or the like as a light combination means on the reduction side of the lens system.

Therefore, it is desirable that the following formula (11') is satisfied instead of the formula (11):

$$2.0 < Bf/fw \quad (11').$$

The formula (12) defines the power of the first lens group $G_1$. When the value of $f_1/fw$ is lower than the lower limit defined by the formula (12), the outer diameter of at least one magnification-side lens becomes large, and it becomes difficult to increase the projection angle. Further, it becomes difficult to maintain a long back focus. Consequently, it becomes difficult to insert a glass block or the like as a light combination means on the reduction side of the lens system.

When the upper limit defined by the following formula (12') is satisfied instead of the upper limit defined by the formula (12), it is possible to easily suppress curvature of field and distortion, in addition to the advantageous effects achieved by satisfying the formula (12):

$$-10.0 < f_1/fw < -2.0 \qquad (12').$$

Therefore, it is desirable that the following formula (12") is satisfied instead of the formula (12'):

$$-7.0 < f_1/fw < -2.5 \qquad (12''').$$

The formula (13) defines the power of the most-magnification-side lens group among plural lens groups that move when magnification of the variable magnification optical system is changed (hereinafter, referred to as movable lens groups). When the most-magnification-side lens group among the movable lens groups has negative refractive power and the most-reduction-side lens group among the movable lens groups has positive refractive power, if the value of $f_{MK}/fw$ exceeds the upper limit defined by the formula (13), the power of the negative most-magnification-side lens group becomes too high. Consequently, the power of the most-reduction-side lens group among the movable lens groups, which is a positive lens group, also becomes high. Therefore it becomes difficult to correct curvature of field and chromatic aberrations.

Therefore, it is desirable that the following formula (13') is satisfied instead of the formula (13):

$$f_{MK}/fw < -5.0 \qquad (13').$$

Further, the formula (14) defines the power of the most-reduction-side lens group among the movable lens groups. When the value of $f_{ms}/fw$ exceeds the upper limit defined by the formula (14), the power of the most-reduction-side lens group among the movable lens groups becomes too low. Consequently, the amount of movement of this lens group when magnification of the variable magnification optical system is changed increases, and thereby, the total lens thickness becomes long. When the value of $f_{MS}/fw$ is lower than the lower limit defined by the formula (14), the power of the most-reduction-side lens group among the movable lens groups becomes too high. Consequently, it becomes difficult to correct aberrations, such as spherical aberration and chromatic aberrations.

Therefore, it is desirable that the following formula (14') is satisfied instead of the formula (14):

$$3.2 < f_{MS}/fw < 6.5 \qquad (14').$$

Further, the formula (15) defines the power of a lens group having positive refractive power that is arranged on the most reduction side in the entire system, and which is fixed when magnification of the variable magnification optical system is changed. When the value of $f_E/fw$ exceeds the upper limit defined by the formula (15), the power of this lens group becomes too low. Consequently, spherical aberration at telephoto end becomes large. When the value of $f_E/fw$ is lower than the lower limit defined by the formula (15), the power of a lens group having positive refractive power that is arranged on the most reduction side in the entire system, and which is fixed when magnification of the variable magnification optical system is changed, becomes too high. Consequently, it becomes difficult to correct aberrations, such as spherical aberrations, and the outer diameter of at least one magnification-side lens becomes large.

Therefore, it is desirable that the following formula (15') is satisfied instead of the formula (15):

$$2.0 < f_E/fw < 4.0 \qquad (15').$$

Further, the formula (16) defines the ratio of the back focus of entire system to the size of a so-called image circle. When the formula (16) is satisfied, it is possible to maintain an appropriate space for inserting a glass block or the like, as a beam splitter or a color combination means, such as a cross-dichroic prism and a TIR prism. Specifically, when the value of Bf/Imφ is lower than the lower limit defined by the formula (16), it becomes difficult to insert a glass block or the like, as a color combination means, on the reduction side of the lens system.

Therefore, it is desirable that the following formula (16') is satisfied instead of the formula (16):

$$2.0 < Bf/Im\phi \qquad (16').$$

Further, the formula (17) defines the power of the second lens group from the magnification side among the movable lens groups when the number of the movable lens groups is three. When the value of $f_{Mm}/fw$ is lower than the lower limit defined by the formula (17), the power balance of the movable lens groups is not appropriate, and it becomes difficult to correct curvature of field.

Therefore, it is desirable that the following formula (17') is satisfied instead of the formula (17):

$$6.0 < f_{Mm}/fw \qquad (17').$$

Further, the formula (18) defines the ratio of back focus and the square of a magnification ratio to the size of an image circle. When the value of $Bf \times Zr^2/Im\phi$ is lower than the lower limit defined by the formula (18), it becomes difficult to provide the variable magnification optical system with a sufficient function for use intended by the present invention. For example, appropriate back focus is not attainable.

Therefore, it is desirable that the following formula (18') is satisfied instead of the formula (18):

$$5.5 < Bf \times Zr^2/Im\phi \qquad (18').$$

Further, the formula (19) defines the ratio of the total lens thickness to the size of an image circle. When the value of L/Imφ exceeds the upper limit defined by the formula (18), it becomes difficult to provide the variable magnification optical system with a sufficient function for use intended by the present invention. Further, the total lens thickness becomes long.

Therefore, it is desirable that the following formula (19') is satisfied instead of the formula (19):

$$L/Im\phi < 12.0 \qquad (19').$$

Further, the formula (20) defines a magnification ratio. When the value of Zr is lower than the lower limit defined by the formula (20), the variable magnification optical system for projection is usable in a narrow range. Consequently, the cost advantage of the variable magnification optical system for projection decreases, and the variable magnification optical system for projection is not appropriate for use intended by the present invention.

Therefore, it is desirable that the following formula (20') is satisfied instead of the formula (20):

$$1.5 < Zr \qquad (20').$$

In the variable magnification optical systems for projection in the first, second and third modes of the second embodiment of the present invention, it is desirable that lenses arranged on the reduction side of the first lens group $G_1$ are not cemented lenses but single lenses. When the variable magnification optical system is mounted on a projection-type display apparatus, and used together with a high output power light source, the density of rays entering the lenses arranged on the reduction side of the first lens group $G_1$ is high. Therefore, there is a risk that the high intensity light greatly changes and degrades the quality of an adhesive or the like for cementing lenses together, thereby impairing the performance of the lens system. If no cemented lens is used, it is possible to prevent such a problem.

Further, in the variable magnification optical systems for projection in the first, second and third modes of the second embodiment of the present invention, all lens surfaces may be spherical, in other words, no aspheric surface is used. Such structure is cost advantageous. Alternatively, an aspheric surface or surfaces may be used in the variable magnification optical systems for projection in the first, second and third modes of the second embodiment. In that case, it is possible to correct aberrations in a more excellent manner.

Further, it is desirable that the variable magnification optical systems for projection in the first, second and third modes of the second embodiment of the present invention are structured in such a manner to function as zoom lenses by changing only a distance or distances between lens groups. Specifically, it is desirable that the optical system is convertible from a zoom lens to a varifocal lens, or from a varifocal lens to a zoom lens by changing only a distance or distances between lens groups. Accordingly, the optical system is usable in an apparatus using a different focusing method by a minimum change to the mechanism structure of the optical system. Therefore, the optical system is cost advantageous.

Further, when the variable magnification optical system for projection is used as a zoom lens, it is desirable that an inner focus method is used in focusing when a projection distance has changed. In the inner focus method, at least one reduction-side lens in the first lens group $G_1$ is moved in the direction of an optical axis. For example, two reduction-side lenses in the first lens group $G_1$ (fifth lens $L_5$ and sixth lens $L_6$ in the example illustrated in FIG. 13) are moved in the direction of the optical axis. When the inner focus method is adopted, it is not necessary to drive at least one magnification-side lens the diameter of which is large, and which is heavy. Therefore, it is possible to reduce the burden on a drive mechanism, and to maintain constant total lens thickness during focusing. Alternatively, focusing may be performed by moving all or a part of lens groups other than the first lens group $G_1$. Alternatively, focusing may be performed by moving the whole first lens group $G_1$ or a part of the first lens group $G_1$ other than at least one reduction-side lens.

It is desirable that the F-number (Fno.) of the lens for projection intended by the present invention is lower than 3.0 through the entire range of variable magnification. Further, in the lens for projection intended by the present invention, it is desirable that distortion is less than approximately 2% through the entire range of variable magnification.

<Projection-Type Display Apparatus>

Next, with reference to FIGS. 46 and 47, a projection-type display apparatus according to an embodiment of the present invention will be described. FIG. 46 is a schematic diagram illustrating the structure of a part of a projection-type display apparatus according to an embodiment of the present invention. FIG. 47 is a schematic diagram illustrating the structure of a part of a projection-type display apparatus according to another embodiment of the present invention.

The projection-type display apparatus illustrated in Figure includes an illumination optical system 10 that includes reflective liquid crystal panels 11a through 11c corresponding to light of respective colors, dichroic mirrors 12, 13 for separating colors, a cross-dichroic prism 14 for combining colors, a total reflection mirror 18, and polarization-separation prisms 15a through 15c. Further, a light source, which is not illustrated, is provided before the dichroic mirror 12. White light output from the light source enters liquid crystal display panels 11a through 11c corresponding to rays of light of three colors (G light, B light, and R light), and is optically modulated. The modulated light is projected onto a screen, which is not illustrated, by a zoom lens 19 for projection according to one of the aforementioned embodiments.

Meanwhile, the projection-type display apparatus illustrated in FIG. 47 includes an illumination optical system 20 that includes reflective liquid crystal devices 21a through 21c corresponding to light of respective colors, TIR prisms 24a through 24c for separating and combining colors, and a polarization-separation prism 25. In FIG. 47, the structure before the polarization-separation prism 25 is omitted, but white light output from a light source enters liquid crystal display devices 21a through 21c corresponding to rays of light of three colors (G light, B light, and R light), and is optically modulated. The modulated light is projected onto a screen, which is not illustrated, by a zoom lens 29 for projection according to one of the aforementioned embodiments.

The projection-type display apparatuses 10, 20 according to the embodiments of the present invention use zoom lenses for projection, the entire systems of which are compact. Therefore, it is possible to reduce the sizes of the entire projection-type display apparatuses 10, 20.

It is not necessary that the zoom lens for projection of the present invention is used in an apparatus using a reflective liquid crystal display panel as a light valve. The zoom lens for projection may be used in an apparatus using a different light modulation means, such as a transmissive liquid crystal display panel or a DMD.

EXAMPLES

Next, specific examples of the present invention will be described. Examples 1 through 6 are zoom lenses for projection, and Examples 7 through 15 are varifocal lenses for projection. Further, the varifocal lenses for projection in Examples 7 and 10 are usable as zoom lenses for projection by changing only a distance or distances between lens groups. When the lenses in Examples 7 through 15 are used as varifocal lenses for projection, an entire system extension method is adopted in focusing when magnification of the lenses or a projection distance has been changed. In the entire system extension method, focusing is performed by moving the entire system in the direction of the optical system in an integrated manner.

Example 1

FIG. 1 is a diagram illustrating the structure of a zoom lens for projection in Example 1. FIG. 2 is a diagram illustrating movement paths of lens groups. FIG. 2 illustrates positions of the lens groups at wide angle end (projection distance is 7583.0 mm), at middle position (projection distance is 7583.0 mm), and at telephoto end (projection distance is 7583.0 mm) (same for FIGS. 4, 6, 8, 10 and 12, which will be described later). As illustrated in FIGS. 1 and 2, the zoom lens for projection in Example 1 is composed of first lens group $G_1$ having negative refractive power, second lens group $G_2$ having negative refractive power, third lens group $G_3$ having positive refractive power, and fourth lens group $G_4$ having positive refractive power, which are arranged from the magnification side of the zoom lens in the order mentioned above. Further, the reduction side of the zoom lens for projection is telecentric. Further, an image display plane 1 of a light valve, such as a reflective liquid crystal display panel, and glass blocks 2a, 2b, such as a color combination prism (a filter, such as an infrared-ray cut filter and a low-pass filter, may be included) are arranged on the reduction side of the fourth lens group $G_4$.

When the magnification of the zoom lens is changed, the first lens group $G_1$ and the fourth lens group $G_4$ are fixed, and the second lens group $G_2$ and the third lens group $G_3$ are movable. FIG. 2 illustrates the manner of movement of the lens groups.

Further, an inner focus method is adopted in focusing, and fifth lens $L_5$ and sixth lens $L_6$, which are reduction-side lenses in the first lens group $G_1$, are moved in the direction of the optical axis in focusing.

The first lens group $G_1$ is composed of first lens $L_1$, which is a positive meniscus lens having a convex surface facing the magnification side, second lens $L_2$, which is a negative meniscus lens having a concave surface facing the reduction side, third lens $L_3$, which is a negative meniscus lens having a concave surface facing the reduction side, fourth lens $L_4$, which is a double concave lens, fifth lens $L_5$, which is a double concave lens, and sixth lens $L_6$, which is a double convex lens. The first lens $L_1$ through the sixth lens $L_6$ are arranged from the magnification side of the zoom lens in the order mentioned above.

Further, the second lens group $G_2$ is composed of seventh lens $L_1$, which is a double concave lens, and eighth lens $L_8$, which is a double convex lens. The seventh lens $L_7$ and the eighth lens $L_8$ are arranged from the magnification side in the order mentioned above.

Further, the third lens group $G_3$ is composed of ninth lens $L_9$, which is a double concave lens, tenth lens $L_{10}$, which is a double convex lens, and eleventh lens $L_{11}$, which is a double convex lens. The ninth lens $L_9$, the tenth lens $L_{10}$ and the eleventh lens $L_{11}$ are arranged from the magnification side in the order mentioned above. The ninth lens $L_9$ and the tenth lens $L_{10}$ face each other with a very small distance therebetween.

Further, the fourth lens group $G_4$ is composed of a stop (the stop may be an aperture stop, a variable stop or the like), twelfth lens $L_{12}$, thirteenth lens $L_{13}$, fourteenth lens $L_{14}$, fifteenth lens $L_{15}$, sixteenth lens $L_{16}$ and seventeenth lens $L_{17}$, which are arranged from the magnification side in the order mentioned above. The twelfth lens $L_{12}$ is a positive meniscus lens having a convex surface facing the magnification side. The thirteenth lens $L_{13}$ is a negative meniscus lens having a convex surface facing the magnification side. The fourteenth lens $L_{14}$ is a double concave lens, and the fifteenth lens $L_{15}$, the sixteenth lens $L_{16}$ and the seventeenth lens $L_{17}$ are double convex lenses. The fourteenth lens $L_{14}$ and the fifteenth lens $L_{15}$ face each other with a very small distance therebetween.

All lens surfaces are spherical, and no aspheric surface is used. Therefore, the zoom lens for projection in Example 1 is cost-advantageous.

Table 1 shows lens data about the zoom lens for projection in Example 1. When surface numbers are assigned to surfaces of composition elements of the zoom lens in such a manner that the magnification-side surface of the most-magnification-side lens is the first surface, and that the surface numbers sequentially increase toward the reduction side of the zoom lens, Table 1 shows radius of curvature R (mm) of the i-th surface (i=1, 2, 3, . . . ), distance D between the i-th surface and the (i+1)-th surface (mm) on optical axis Z (hereinafter, referred to as "axial surface distance"), and refractive index $N_d$ and Abbe number $v_d$ of each lens for d-line. The data in Table 1 are actual values. Further, Table 1 includes data about the stop 3 and the glass blocks 2a, 2b. The lens data for Examples 2 through 6 are represented in a similar manner.

Table 1 shows surface distances (VARIABLE 1), (VARIABLE 2), and (VARIABLE 3), which change when the magnification of the zoom lens is changed. The bottom part of Table 1 shows length of each of the variable distances at wide angle end and at telephoto end. Further, the top part of Table 1 shows focal length f of the entire system, Fno. (F-number), full angle 2ω of view, zoom ratio, and projection distance at wide angle end. The meanings of signs and the manner of representation in Table 1 are similar to those of signs in Tables 2 through 6 corresponding to Examples 2 through 6, which will be described later. Therefore, explanation of the signs will be omitted for Tables 2 through 6.

TABLE 1

EXAMPLE 1
f = 47.81~85.18, Fno. = 2.8~2.8, 2ω = 56.59°~33.07°
ZOOM RATIO = 1.78,
PROJECTION DISTANCE AT WIDE ANGLE END = 7,583.0

| SURFACE NUMBER | R | D | $N_d$ | $v_d$ |
|---|---|---|---|---|
| 1 | 247.493 | 13.014 | 1.712995 | 53.87 |
| 2 | 1,230.657 | 0.300 | | |
| 3 | 174.952 | 4.500 | 1.496999 | 81.54 |
| 4 | 87.444 | 14.937 | | |
| 5 | 218.514 | 3.900 | 1.618000 | 63.33 |
| 6 | 106.136 | 18.491 | | |
| 7 | −408.089 | 3.200 | 1.677900 | 55.34 |
| 8 | 228.425 | 11.320 | | |
| 9 | −1,065.030 | 3.100 | 1.805181 | 25.42 |
| 10 | 184.875 | 21.470 | | |
| 11 | 435.617 | 12.990 | 1.834000 | 37.16 |
| 12 | −189.467 | (VARIABLE 1) | | |
| 13 | −214.275 | 3.964 | 1.618000 | 63.33 |
| 14 | 236.874 | 12.277 | | |
| 15 | 411.476 | 12.063 | 1.618000 | 63.33 |
| 16 | −213.265 | (VARIABLE 2) | | |
| 17 | −107.872 | 6.000 | 1.531717 | 48.84 |
| 18 | 197.572 | 0.343 | | |
| 19 | 205.561 | 19.123 | 1.496999 | 81.54 |
| 20 | −128.901 | 0.300 | | |
| 21 | 215.958 | 15.784 | 1.496999 | 81.54 |
| 22 | −195.738 | (VARIABLE 3) | | |
| 23 | ∞ (STOP) | 6.529 | | |
| 24 | 74.467 | 4.645 | 1.805181 | 25.42 |
| 25 | 221.806 | 23.084 | | |
| 26 | 112.205 | 1.650 | 1.834000 | 37.16 |
| 27 | 47.699 | 33.352 | | |
| 28 | −42.221 | 2.000 | 1.834000 | 37.16 |
| 29 | 228.897 | 0.047 | | |
| 30 | 235.047 | 13.125 | 1.496999 | 81.54 |
| 31 | −54.336 | 0.300 | | |
| 32 | 547.813 | 16.801 | 1.438750 | 94.93 |
| 33 | −56.661 | 0.300 | | |
| 34 | 118.658 | 11.415 | 1.496999 | 81.54 |
| 35 | −267.109 | 0.000 | | |
| 36 | ∞ | 72.200 | 1.539956 | 59.46 |
| 37 | ∞ | 74.000 | 1.841390 | 24.56 |
| 38 | ∞ | 18.915 | | |

| | (VARIABLE 1) | (VARIABLE 2) | (VARIABLE 3) |
|---|---|---|---|
| WIDE ANGLE END | 39.479 | 128.351 | 1.988 |
| TELEPHOTO END | 6.611 | 23.125 | 140.082 |

Further, Table 16 will show numerical values corresponding to the aforementioned formulas with respect to the zoom lens for projection in Example 1. Further, the diameter Imϕ of the maximum effective image circle on the reduction side of the zoom lens for projection in Example 1 is 51.00 mm.

As Table 1 shows, the full angle 2ω of view is 56.59 degrees at wide angle end, and Fno. is 2.8 through the entire range of magnification. Therefore, the zoom lens for projection in Example 1 has a wide angle, and is a fast lens, which has a small F-number. Further, the F-number is constant from wide angle end to telephoto end.

As described above, in the zoom lens for projection of Example 1, the outer diameter of at least one magnification-side lens is small as illustrated in FIG. 1, while the zoom ratio of 1.78 is maintained as shown in Table 1.

Example 2

Figure 3:
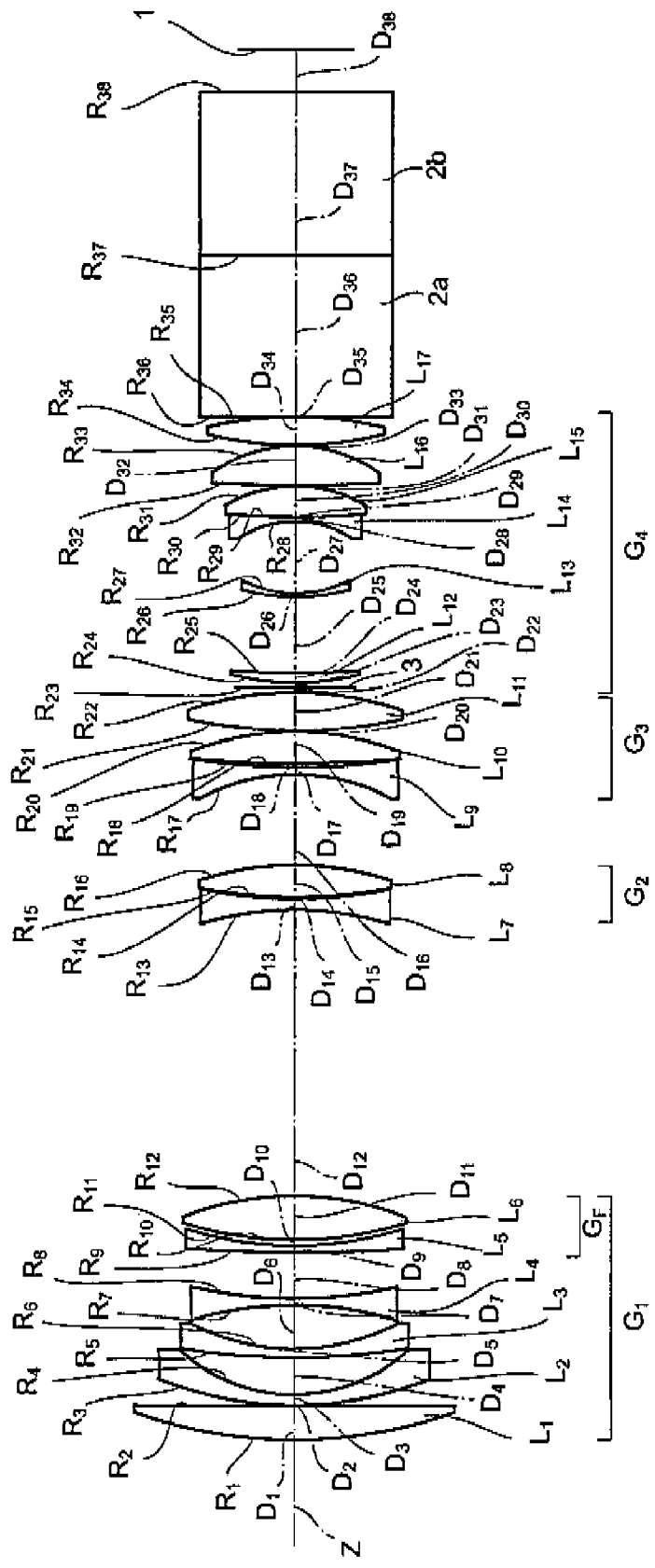
FIG. 3 is a detailed diagram illustrating the structure of a zoom lens for projection in Example 2.
Figure 4:
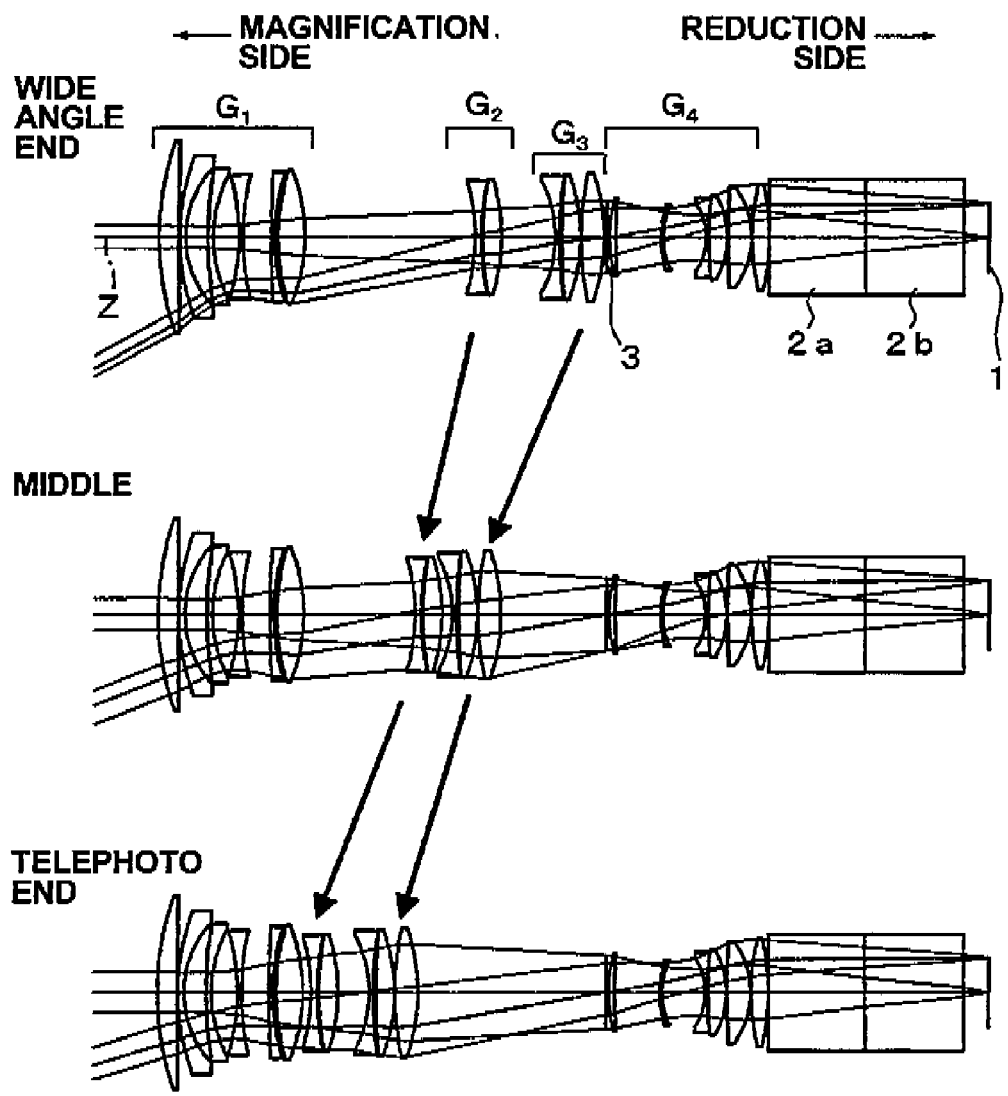
FIG. 4 is a diagram illustrating movement paths of lens groups when magnification of the variable magnification optical system is changed, and the paths of incident rays in the zoom lens for projection in Example 2.

FIG. 3 is a diagram illustrating the structure of a zoom lens for projection in Example 2. FIG. 4 is a diagram illustrating movement paths of lens groups. As illustrated in FIGS. 3 and 4, the zoom lens for projection in Example 2 is structured in a substantially similar manner to the zoom lens for projection in Example 1. However, Example 2 differs from Example 1 in that the fifth lens $L_5$ in the first lens group $G_1$ is a negative meniscus lens having a convex surface facing the magnification side.

In the zoom lens for projection of Example 2, the fifth lens $L_5$ and the sixth lens $L_6$ face each other with a very small distance therebetween, but they are not cemented together. The seventh lens $L_7$ and the eighth lens $L_8$ face each other with a very small distance therebetween, but they are not cemented together. The ninth lens $L_9$ and the tenth lens $L_{10}$ face each other with a very small distance therebetween, but they are not cemented together. The fourteenth lens $L_{14}$ and the fifteenth lens $L_{15}$ face each other with a very small distance therebetween, but they are not cemented together.

Table 2 shows lens data about the zoom lens for projection in Example 2. Further, Table 16 will show numerical values corresponding to the aforementioned formulas with respect to the zoom lens for projection in Example 2. The diameter Imφ of the maximum effective image circle on the reduction side of the zoom lens for projection in Example 2 is 51.00 mm.

TABLE 2

| EXAMPLE 2 | | | | |
|---|---|---|---|---|
| f = 47.75~85.03, Fno. = 2.8~2.8, 2ω = 56.59°~33.07° | | | | |
| ZOOM RATIO = 1.78, | | | | |
| PROJECTION DISTANCE AT WIDE ANGLE END = 7,583.0 | | | | |
| SURFACE NUMBER | R | D | $N_d$ | $v_d$ |
| 1 | 213.761 | 15.186 | 1.516330 | 64.14 |
| 2 | 9,640.947 | 0.299 | | |
| 3 | 164.874 | 4.499 | 1.496999 | 81.54 |
| 4 | 74.611 | 16.732 | | |
| 5 | 308.841 | 3.899 | 1.618000 | 63.33 |
| 6 | 98.322 | 19.786 | | |
| 7 | −151.831 | 3.099 | 1.772499 | 49.60 |
| 8 | 205.742 | 20.629 | | |
| 9 | 753.965 | 2.999 | 1.805181 | 25.42 |
| 10 | 156.363 | 2.418 | | |
| 11 | 166.626 | 20.000 | 1.762001 | 40.10 |
| 12 | −135.268 | (VARIABLE 1) | | |
| 13 | −140.594 | 4.634 | 1.772499 | 49.60 |
| 14 | 204.170 | 1.005 | | |
| 15 | 221.200 | 14.361 | 1.666718 | 48.32 |
| 16 | −138.448 | (VARIABLE 2) | | |
| 17 | −89.153 | 3.000 | 1.575006 | 41.50 |
| 18 | 300.773 | 1.891 | | |
| 19 | 555.569 | 14.174 | 1.651597 | 58.55 |
| 20 | −128.891 | 0.300 | | |
| 21 | 225.088 | 17.480 | 1.496999 | 81.54 |
| 22 | −142.488 | (VARIABLE 3) | | |
| 23 | ∞ (STOP) | 1.998 | | |
| 24 | 105.579 | 4.553 | 1.805181 | 25.42 |
| 25 | 334.702 | 34.357 | | |
| 26 | 92.609 | 1.598 | 1.804398 | 39.59 |
| 27 | 51.666 | 32.325 | | |

TABLE 2-continued

| EXAMPLE 2 | | | | |
|---|---|---|---|---|
| f = 47.75~85.03, Fno. = 2.8~2.8, 2ω = 56.59°~33.07° | | | | |
| ZOOM RATIO = 1.78, | | | | |
| PROJECTION DISTANCE AT WIDE ANGLE END = 7,583.0 | | | | |
| SURFACE NUMBER | R | D | $N_d$ | $v_d$ |
| 28 | −46.149 | 1.999 | 1.834000 | 37.16 |
| 29 | 313.730 | 0.101 | | |
| 30 | 333.588 | 13.897 | 1.496999 | 81.54 |
| 31 | −60.590 | 0.298 | | |
| 32 | 627.172 | 17.829 | 1.438750 | 94.93 |
| 33 | −63.312 | 0.299 | | |
| 34 | 159.388 | 12.854 | 1.496999 | 81.54 |
| 35 | −174.714 | 0.000 | | |
| 36 | ∞ | 72.200 | 1.539956 | 59.46 |
| 37 | ∞ | 74.000 | 1.841390 | 24.56 |
| 38 | ∞ | 18.883 | | |
| | (VARIABLE 1) | (VARIABLE 2) | (VARIABLE 3) | |
| WIDE ANGLE END | 128.685 | 40.961 | 1.974 | |
| TELEPHOTO END | 5.821 | 23.689 | 142.110 | |

As Table 2 shows, the full angle 2ω of view is 56.84 degrees at wide angle end, and Fno. is 2.8 through the entire range of magnification. Therefore, the zoom lens for projection in Example 2 has a wide angle, and is a fast lens. Further, the F-number is constant from wide angle end to telephoto end.

As described above, in the zoom lens for projection of Example 2, the outer diameter of at least one magnification-side lens is small as illustrated in FIG. 3, while the zoom ratio of 1.78 is maintained as shown in Table 2.

Example 3

Figure 5:
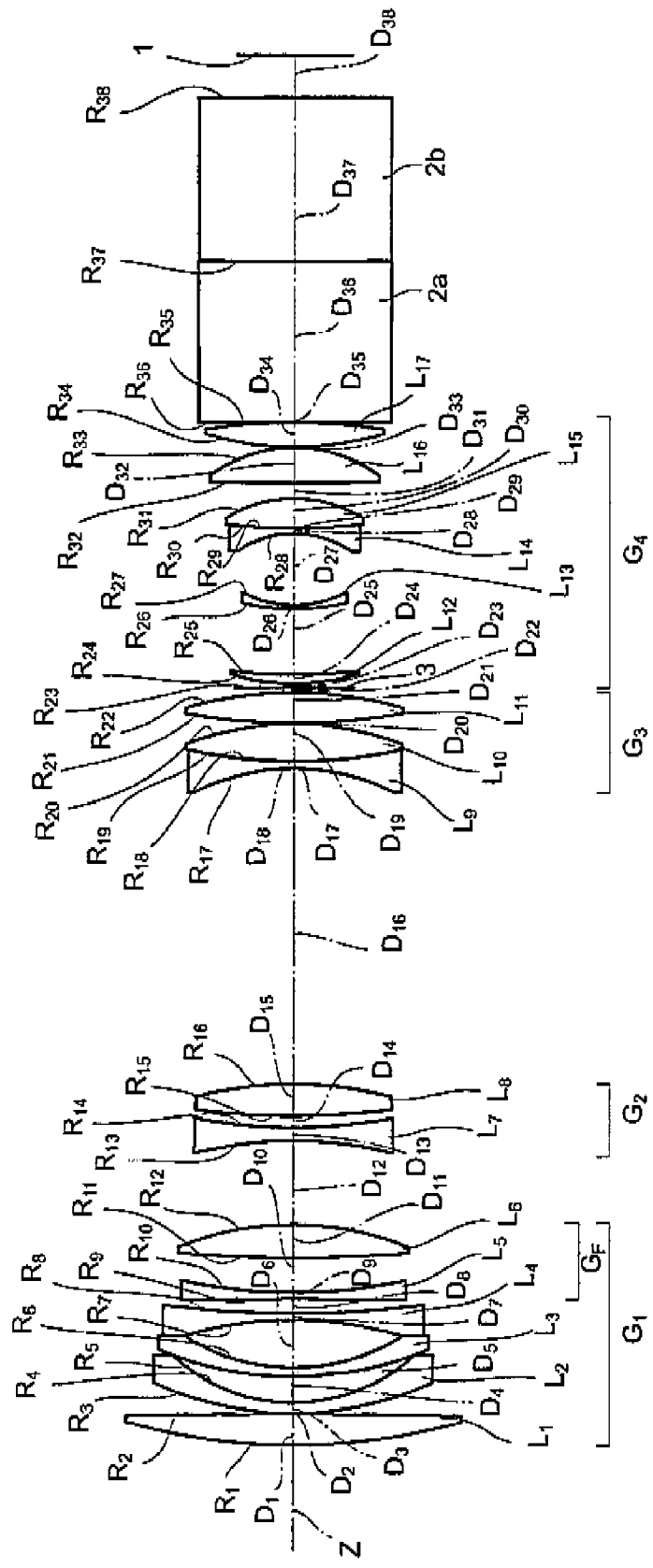
FIG. 5 is a detailed diagram illustrating the structure of a zoom lens for projection in Example 3.
Figure 6:
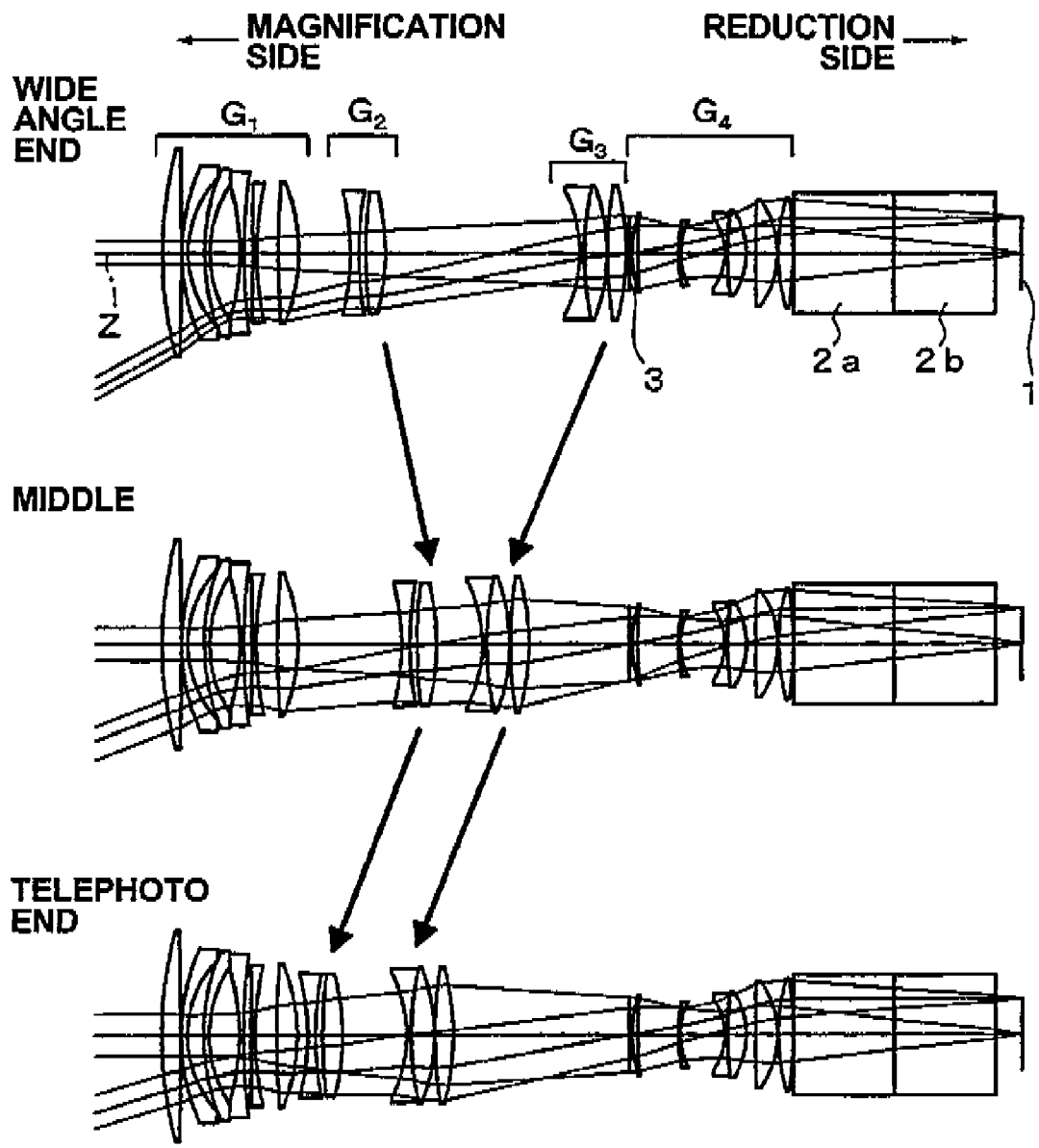
FIG. 6 is a diagram illustrating movement paths of lens groups when magnification of the variable magnification optical system is changed, and the paths of incident rays in the zoom lens for projection in Example 3.

FIG. 5 is a diagram illustrating the structure of a zoom lens for projection in Example 3. FIG. 6 is a diagram illustrating movement paths of lens groups. As illustrated in FIGS. 5 and 6, the zoom lens for projection in Example 3 is structured in a substantially similar manner to the zoom lens for projection in Example 1. However, Example 3 differs from Example 1 in that the first lens $L_1$ in the first lens group $G_1$ is a double convex lens.

In the zoom lens for projection of Example 3, the ninth lens $L_9$ and the tenth lens $L_{10}$ face each other with a very small distance therebetween, but they are not cemented together. The fourteenth lens $L_{14}$ and the fifteenth lens $L_{15}$ face each other with a very small distance therebetween, but they are not cemented together.

Table 3 shows lens data about the zoom lens for projection in Example 3. Further, Table 16 will show numerical values corresponding to the aforementioned formulas with respect to the zoom lens for projection in Example 3. The diameter Imφ of the maximum effective image circle on the reduction side of the zoom lens for projection in Example 3 is 51.00 mm.

TABLE 3

EXAMPLE 3
f = 47.76~85.09, Fno. = 2.8~2.8, 2ω = 56.73°~33.20°
ZOOM RATIO = 1.78,
PROJECTION DISTANCE AT WIDE ANGLE END = 7,583.0

| SURFACE NUMBER | R | D | $N_d$ | $v_d$ |
|---|---|---|---|---|
| 1 | 274.335 | 13.810 | 1.516330 | 64.14 |
| 2 | −3,368.643 | 0.309 | | |
| 3 | 150.028 | 4.501 | 1.496999 | 81.54 |
| 4 | 77.999 | 11.790 | | |
| 5 | 154.829 | 3.905 | 1.618000 | 63.33 |
| 6 | 89.120 | 21.573 | | |
| 7 | −172.365 | 3.100 | 1.806098 | 40.92 |
| 8 | 441.045 | 6.241 | | |
| 9 | −4,371.436 | 3.000 | 1.805181 | 25.42 |
| 10 | 225.653 | 15.707 | | |
| 11 | 634.525 | 14.970 | 1.720467 | 34.71 |
| 12 | −131.958 | (VARIABLE 1) | | |
| 13 | −178.411 | 6.000 | 1.618000 | 63.33 |
| 14 | 229.281 | 5.206 | | |
| 15 | 353.220 | 14.259 | 1.603112 | 60.64 |
| 16 | −177.523 | (VARIABLE 2) | | |
| 17 | −98.753 | 3.000 | 1.595509 | 39.24 |
| 18 | 205.907 | 0.300 | | |
| 19 | 217.298 | 16.741 | 1.589130 | 61.14 |
| 20 | −130.244 | 0.302 | | |
| 21 | 281.901 | 13.708 | 1.603001 | 65.44 |
| 22 | −177.560 | (VARIABLE 3) | | |
| 23 | ∞ (STOP) | 2.004 | | |
| 24 | 90.532 | 4.278 | 1.805181 | 25.42 |
| 25 | 269.204 | 29.507 | | |
| 26 | 102.206 | 1.700 | 1.834807 | 42.71 |
| 27 | 50.573 | 32.409 | | |
| 28 | −44.553 | 2.200 | 1.800999 | 34.97 |
| 29 | 245.256 | 0.050 | | |
| 30 | 252.263 | 13.475 | 1.496999 | 81.54 |
| 31 | −57.138 | 6.675 | | |
| 32 | 864.377 | 16.326 | 1.438750 | 94.93 |
| 33 | −63.587 | 0.301 | | |
| 34 | 134.795 | 11.006 | 1.496999 | 81.54 |
| 35 | −257.400 | 0.000 | | |
| 36 | ∞ | 72.200 | 1.539956 | 59.46 |
| 37 | ∞ | 74.000 | 1.841390 | 24.56 |
| 38 | ∞ | 18.927 | | |

| | (VARIABLE 1) | (VARIABLE 2) | (VARIABLE 3) |
|---|---|---|---|
| WIDE ANGLE END | 37.703 | 142.010 | 1.974 |
| TELEPHOTO END | 6.341 | 47.298 | 128.048 |

As Table 3 shows, the full angle 2ω of view is 56.73 degrees at wide angle end, and Fno. is 2.8 through the entire range of magnification. Therefore, the zoom lens for projection in Example 3 has a wide angle, and is a fast lens. Further, the F-number is constant from wide angle end to telephoto end.

As described above, in the zoom lens for projection of Example 3, the outer diameter of at least one magnification-side lens is small as illustrated in FIG. 5, while the zoom ratio of 1.78 is maintained as shown in Table 3.

Example 4

Figure 7:
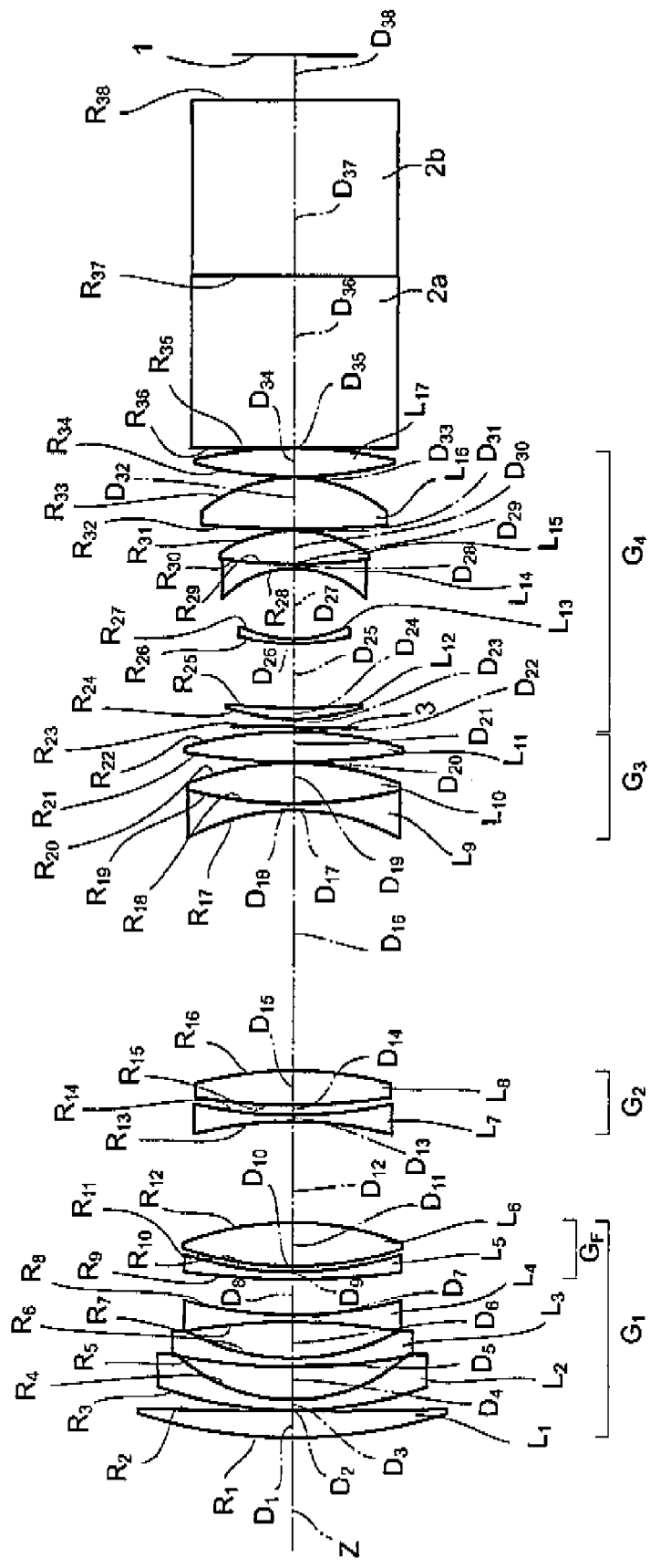
FIG. 7 is a detailed diagram illustrating the structure of a zoom lens for projection in Example 4.
Figure 8:
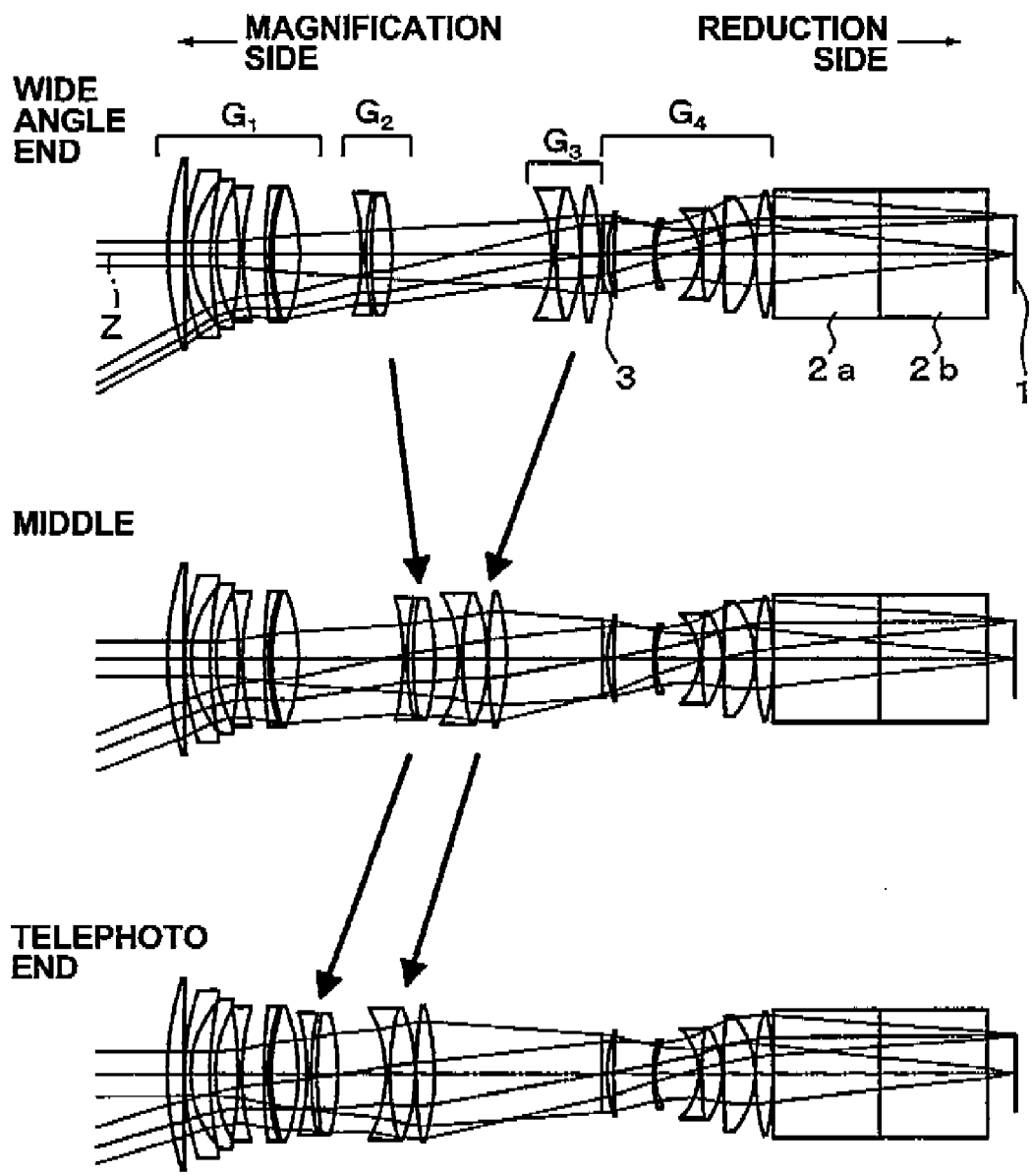
FIG. 8 is a diagram illustrating movement paths of lens groups when magnification of the variable magnification optical system is changed, and the paths of incident rays in the zoom lens for projection in Example 4.

FIG. 7 is a diagram illustrating the structure of a zoom lens for projection in Example 4. FIG. 8 is a diagram illustrating movement paths of lens groups. As illustrated in FIGS. 7 and 8, the zoom lens for projection in Example 4 is structured in a substantially similar manner to the zoom lens for projection in Example 1. However, Example 4 differs from Example 1 in that the fifth lens $L_5$ in the first lens group $G_1$ is a negative meniscus lens having a convex surface facing the magnification side.

In the zoom lens for projection of Example 4, the ninth lens $L_9$ and the tenth lens $L_{10}$ face each other with a very small distance therebetween, but they are not cemented together. The fourteenth lens $L_{14}$ and the fifteenth lens $L_{15}$ face each other with a very small distance therebetween, but they are not cemented together.

Table 4 shows lens data about the zoom lens for projection in Example 4. Further, Table 16 will show numerical values corresponding to the aforementioned formulas with respect to the zoom lens for projection in Example 4. The diameter Imϕ of the maximum effective image circle on the reduction side of the zoom lens for projection in Example 4 is 51.00 mm.

TABLE 4

EXAMPLE 4
f = 47.65~84.88, Fno. = 2.8~2.8, 2ω = 56.94°~33.24°
ZOOM RATIO = 1.78,
PROJECTION DISTANCE AT WIDE ANGLE END = 7,583.0

| SURFACE NUMBER | R | D | $N_d$ | $v_d$ |
|---|---|---|---|---|
| 1 | 209.285 | 11.168 | 1.516330 | 64.14 |
| 2 | 1,928.403 | 0.500 | | |
| 3 | 168.468 | 4.198 | 1.496999 | 81.54 |
| 4 | 71.513 | 13.549 | | |
| 5 | 243.333 | 3.636 | 1.618000 | 83.33 |
| 6 | 90.776 | 15.446 | | |
| 7 | −240.767 | 2.758 | 1.772499 | 49.60 |
| 8 | 166.186 | 15.118 | | |
| 9 | 334.289 | 3.101 | 1.805181 | 25.42 |
| 10 | 143.593 | 2.169 | | |
| 11 | 142.795 | 18.483 | 1.595509 | 39.24 |
| 12 | −123.831 | (VARIABLE 1) | | |
| 13 | −155.222 | 2.677 | 1.618000 | 63.33 |
| 14 | 187.947 | 4.127 | | |
| 15 | 252.181 | 14.394 | 1.603112 | 60.64 |
| 16 | −160.449 | (VARIABLE 2) | | |
| 17 | −88.940 | 2.720 | 1.595509 | 39.24 |
| 18 | 170.326 | 0.301 | | |
| 19 | 178.020 | 16.963 | 1.589130 | 61.14 |
| 20 | −117.065 | 0.301 | | |
| 21 | 251.820 | 12.719 | 1.603001 | 65.44 |
| 22 | −164.786 | (VARIABLE 3) | | |
| 23 | ∞ (STOP) | 3.476 | | |
| 24 | 89.208 | 4.454 | 1.805181 | 25.42 |
| 25 | 271.845 | 27.201 | | |
| 26 | 95.184 | 1.729 | 1.834807 | 42.71 |
| 27 | 48.049 | 29.754 | | |
| 28 | −42.145 | 1.951 | 1.834000 | 37.16 |
| 29 | 217.185 | 0.050 | | |
| 30 | 222.905 | 14.056 | 1.496999 | 81.54 |
| 31 | −54.695 | 0.649 | | |
| 32 | 504.534 | 21.583 | 1.438750 | 94.93 |
| 33 | −59.829 | 0.336 | | |
| 34 | 155.821 | 11.993 | 1.496999 | 81.54 |
| 35 | −195.583 | 0.000 | | |
| 36 | ∞ | 72.200 | 1.539956 | 59.46 |
| 37 | ∞ | 74.000 | 1.841390 | 24.56 |
| 38 | ∞ | 18.894 | | |

| | (VARIABLE 1) | (VARIABLE 2) | (VARIABLE 3) |
|---|---|---|---|
| WIDE ANGLE END | 42.492 | 109.411 | 1.944 |
| TELEPHOTO END | 5.358 | 33.278 | 115.211 |

As Table 4 shows, the full angle 2ω of view is 56.94 degrees at wide angle end, and Fno. is 2.8 through the entire range of magnification. Therefore, the zoom lens for projection in Example 4 has a wide angle, and is a fast lens. Further, the F-number is constant from wide angle end to telephoto end.

As described above, in the zoom lens for projection of Example 4, the outer diameter of at least one magnification-side lens is small as illustrated in FIG. 7, while the zoom ratio of 1.78 is maintained as shown in Table 4.

Example 5

Figure 9:
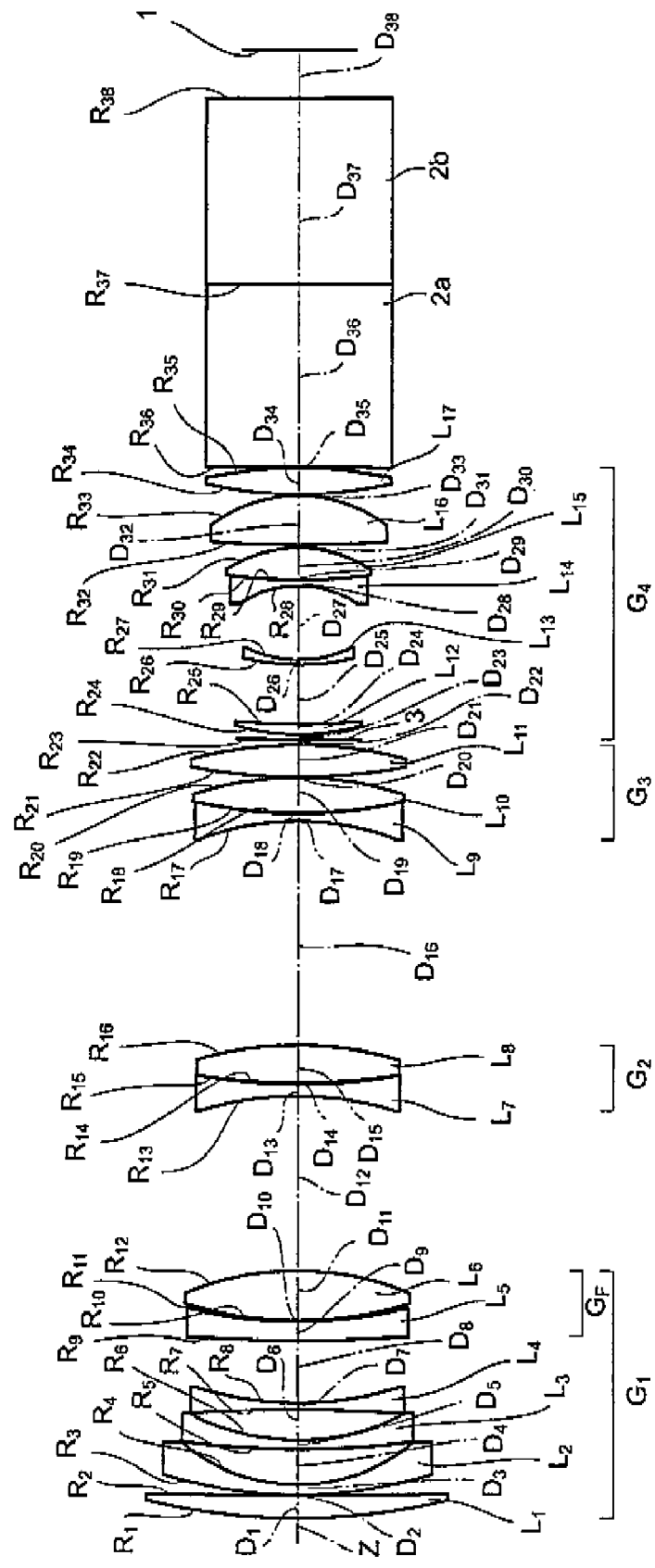
FIG. 9 is a detailed diagram illustrating the structure of a zoom lens for projection in Example 5.
Figure 10:
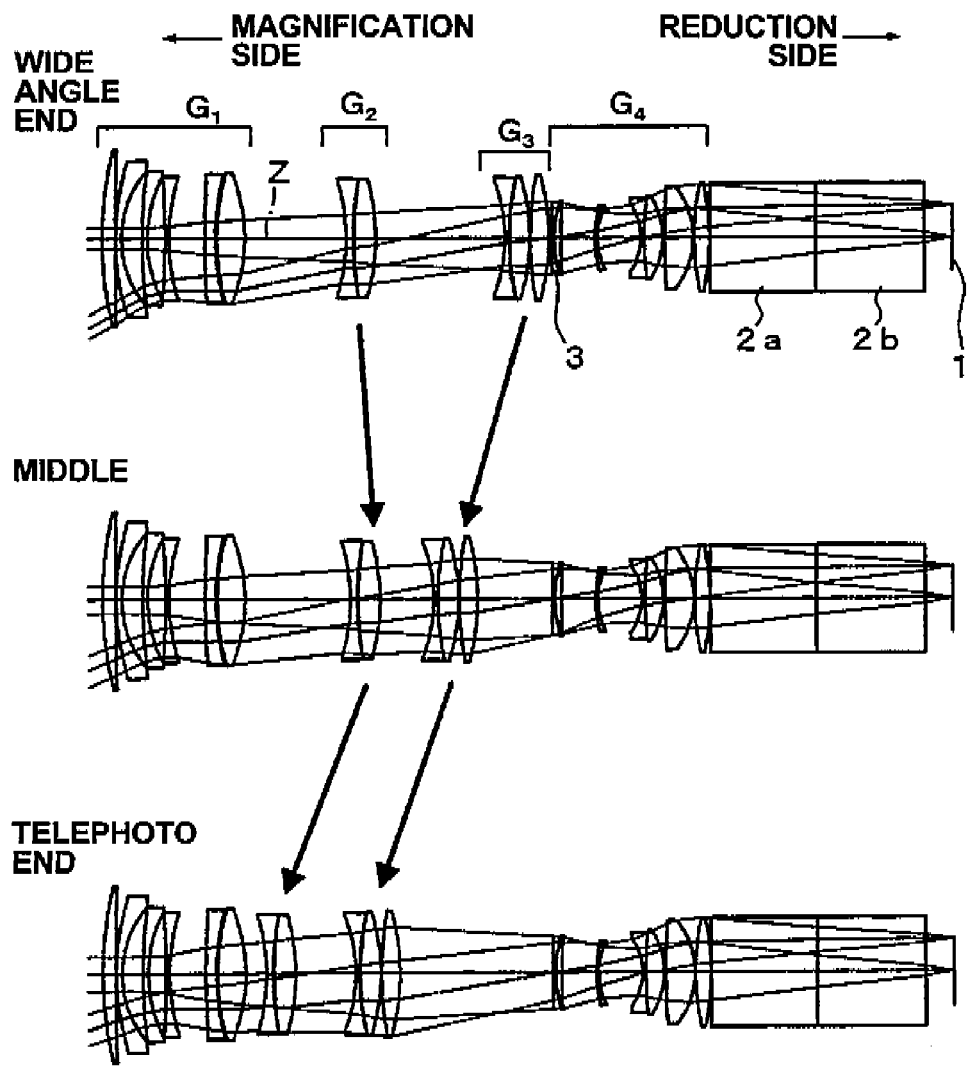
FIG. 10 is a diagram illustrating movement paths of lens groups when magnification of the variable magnification optical system is changed, and the paths of incident rays in the zoom lens for projection in Example 5.

FIG. 9 is a diagram illustrating the structure of a zoom lens for projection in Example 5. FIG. 10 is a diagram illustrating movement paths of lens groups. As illustrated in FIGS. 9 and 10, the zoom lens for projection in Example 5 is structured in a substantially similar manner to the zoom lens for projection in Example 1. However, Example 5 differs from Example 1 in that the fifth lens $L_5$ in the first lens group $G_1$ is a negative meniscus lens having a convex surface facing the magnification side.

In the zoom lens for projection of Example 5, the fifth lens $L_5$ and the sixth lens $L_5$ face each other with a very small distance therebetween, but they are not cemented together. The seventh lens $L_7$ and the eighth lens $L_8$ face each other with a very small distance therebetween, but they are not cemented together. The ninth lens $L_9$ and the tenth lens $L_{10}$ face each other with a very small distance therebetween, but they are not cemented together. The fourteenth lens $L_{14}$ and the fifteenth lens $L_{15}$ face each other with a very small distance therebetween, but they are not cemented together.

Table 5 shows lens data about the zoom lens for projection in Example 5. Further, Table 16 will show numerical values corresponding to the aforementioned formulas with respect to the zoom lens for projection in Example 5. The diameter Imϕ of the maximum effective image circle on the reduction side of the zoom lens for projection in Example 5 is 51.00 mm.

TABLE 5

EXAMPLE 5
f = 41.04~65.66, Fno. = 2.8~2.8, 2ω = 56.96°~36.99°
ZOOM RATIO = 1.60,
PROJECTION DISTANCE AT WIDE ANGLE END = 7,583.0

| SURFACE NUMBER | R | D | $N_d$ | $v_d$ |
|---|---|---|---|---|
| 1 | 246.871 | 9.057 | 1.500096 | 55.12 |
| 2 | 2,440.767 | 0.194 | | |
| 3 | 177.074 | 3.980 | 1.496999 | 81.54 |
| 4 | 68.974 | 14.183 | | |
| 5 | 366.471 | 3.466 | 1.618000 | 63.33 |
| 6 | 89.186 | 12.055 | | |
| 7 | −645.819 | 2.650 | 1.772499 | 49.60 |
| 8 | 138.446 | 23.842 | | |
| 9 | 635.987 | 7.360 | 1.805181 | 25.42 |
| 10 | 178.066 | 0.580 | | |
| 11 | 149.657 | 19.606 | 1.576652 | 41.38 |
| 12 | −113.698 | (VARIABLE 1) | | |
| 13 | −129.371 | 4.612 | 1.618000 | 63.33 |
| 14 | 214.720 | 0.815 | | |
| 15 | 278.221 | 14.540 | 1.616472 | 58.79 |
| 16 | −141.454 | (VARIABLE 2) | | |
| 17 | −105.054 | 2.819 | 1.595509 | 39.24 |
| 18 | 178.019 | 0.364 | | |
| 19 | 192.356 | 13.900 | 1.504039 | 60.91 |
| 20 | −134.546 | 0.290 | | |
| 21 | 223.173 | 12.738 | 1.603001 | 65.44 |
| 22 | −155.776 | (VARIABLE 3) | | |
| 23 | ∞ (STOP) | 1.841 | | |
| 24 | 82.768 | 4.300 | 1.805181 | 25.42 |
| 25 | 285.290 | 23.604 | | |
| 26 | 91.325 | 1.630 | 1.834807 | 42.71 |
| 27 | 45.123 | 29.626 | | |
| 28 | −39.941 | 2.210 | 1.834000 | 37.16 |

TABLE 5-continued

EXAMPLE 5
f = 41.04~65.66, Fno. = 2.8~2.8, 2ω = 56.96°~36.99°
ZOOM RATIO = 1.60,
PROJECTION DISTANCE AT WIDE ANGLE END = 7,583.0

| SURFACE NUMBER | R | D | $N_d$ | $v_d$ |
|---|---|---|---|---|
| 29 | 211.908 | 0.050 | | |
| 30 | 218.422 | 12.631 | 1.496999 | 81.54 |
| 31 | −51.177 | 1.085 | | |
| 32 | 459.513 | 19.672 | 1.438760 | 94.93 |
| 33 | −56.275 | 0.310 | | |
| 34 | 155.638 | 10.617 | 1.496999 | 81.54 |
| 35 | −175.118 | 0.000 | | |
| 36 | ∞ | 72.614 | 1.539956 | 59.46 |
| 37 | ∞ | 74.000 | 1.841390 | 24.56 |
| 38 | ∞ | 18.881 | | |

| | (VARIABLE 1) | (VARIABLE 2) | (VARIABLE 3) |
|---|---|---|---|
| WIDE ANGLE END | 69.717 | 88.883 | 1.994 |
| TELEPHOTO END | 14.463 | 40.857 | 105.253 |

As Table 5 shows, the full angle 2ω of view is 56.96 degrees at wide angle end, and Fno. is 2.8 through the entire range of magnification. Therefore, the zoom lens for projection in Example 5 has a wide angle, and is a fast lens. Further, the F-number is constant from wide angle end to telephoto end.

As described above, in the zoom lens for projection of Example 5, the outer diameter of at least one magnification-side lens is small as illustrated in FIG. 9, while the zoom ratio of 1.60 is maintained as shown in Table 5.

Example 6

Figure 11:
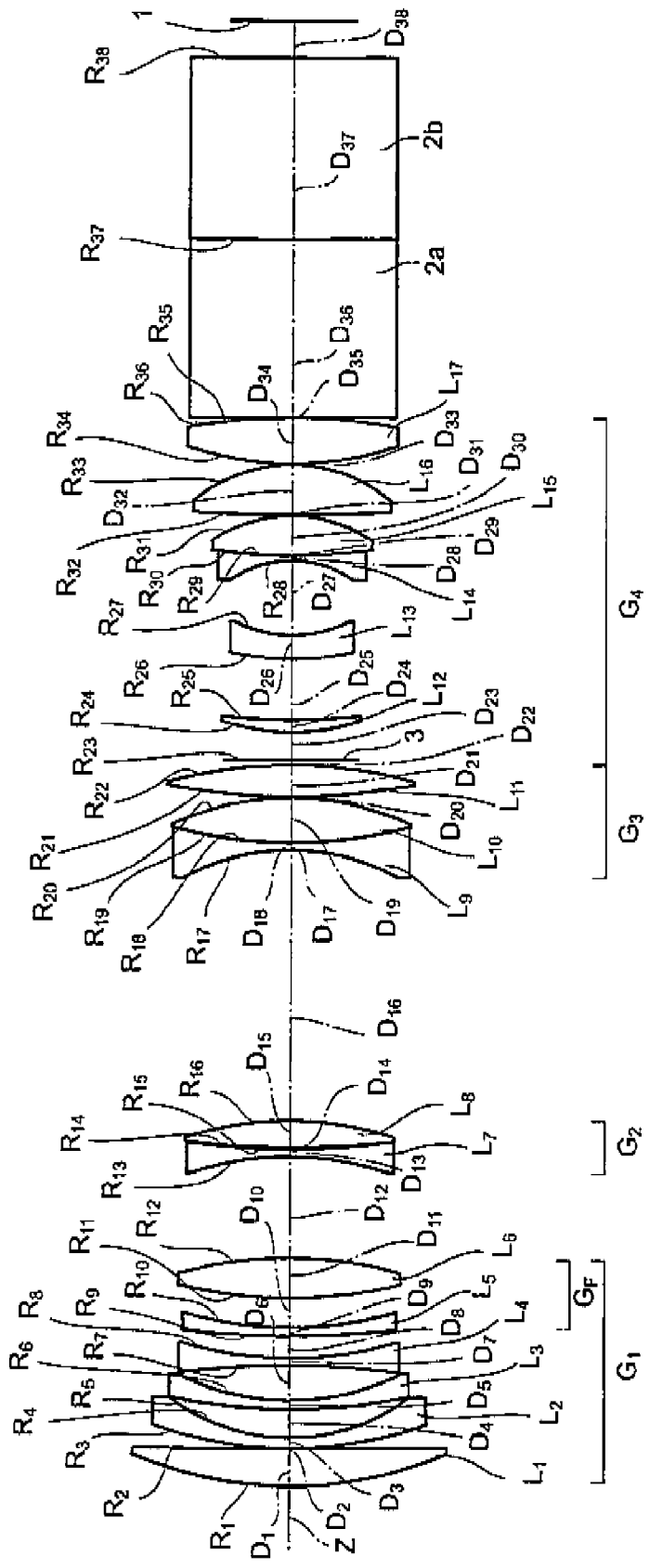
FIG. 11 is a detailed diagram illustrating the structure of a zoom lens for projection in Example 6.
Figure 12:
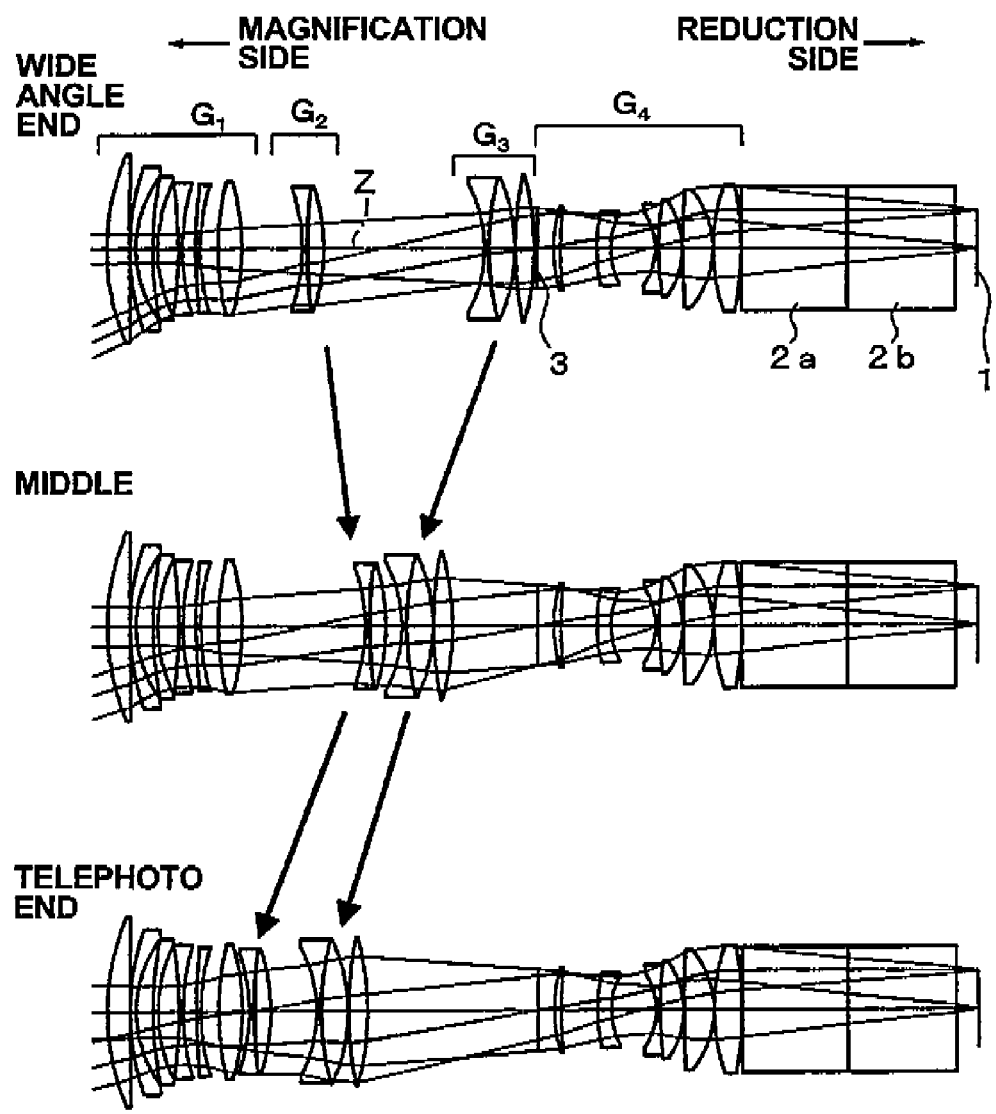
FIG. 12 is a diagram illustrating movement paths of lens groups when magnification of the variable magnification optical system is changed, and the paths of incident rays in the zoom lens for projection in Example 6.

FIG. 11 is a diagram illustrating the structure of a zoom lens for projection in Example 6. FIG. 12 is a diagram illustrating movement paths of lens groups. As illustrated in FIGS. 11 and 12, the zoom lens for projection in Example 6 is structured in a substantially similar manner to the zoom lens for projection in Example 1. However, Example 6 differs from Example 1 in that the fifth lens $L_5$ in the first lens group $G_1$ is a negative meniscus lens having a convex surface facing the magnification side.

In the zoom lens for projection of Example 6, the seventh lens $L_7$ and the eighth lens $L_8$ face each other with a very small distance therebetween, but they are not cemented together. The ninth lens $L_9$ and the tenth lens $L_{10}$ face each other with a very small distance therebetween, but they are not cemented together. The fourteenth lens $L_{14}$ and the fifteenth lens $L_{14}$, face each other with a very small distance therebetween, but they are not cemented together.

Table 6 shows lens data about the zoom lens for projection in Example 6. Further, Table 16 will show numerical values corresponding to the aforementioned formulas with respect to the zoom lens for projection in Example 6. The diameter Imϕ of the maximum effective image circle on the reduction side of the zoom lens for projection in Example 6 is 51.00 mm.

TABLE 6

EXAMPLE 6
f = 57.78~102.85, Fno. = 2.8~2.8, 2ω = 48.16°~27.70°
ZOOM RATIO = 1.78,
PROJECTION DISTANCE AT WIDE ANGLE END = 7,583.0

| SURFACE NUMBER | R | D | $N_d$ | $v_d$ |
|---|---|---|---|---|
| 1 | 161.531 | 15.233 | 1.514342 | 64.52 |
| 2 | 5,624.167 | 0.301 | | |
| 3 | 166.260 | 4.155 | 1.496999 | 81.54 |
| 4 | 80.316 | 11.470 | | |
| 5 | 231.583 | 3.710 | 1.618000 | 63.33 |
| 6 | 102.920 | 14.099 | | |
| 7 | −316.755 | 2.848 | 1.772499 | 49.60 |
| 8 | 150.149 | 7.579 | | |
| 9 | 415.472 | 3.157 | 1.805181 | 25.42 |
| 10 | 146.956 | 12.197 | | |
| 11 | 189.922 | 16.367 | 1.628699 | 37.34 |
| 12 | −161.488 | (VARIABLE 1) | | |
| 13 | −123.637 | 2.811 | 1.618000 | 63.33 |
| 14 | 279.329 | 0.683 | | |
| 15 | 359.310 | 10.911 | 1.632626 | 59.87 |
| 16 | −136.510 | (VARIABLE 2) | | |
| 17 | −89.682 | 2.813 | 1.595509 | 39.24 |
| 18 | 179.141 | 0.300 | | |
| 19 | 186.833 | 18.069 | 1.588181 | 61.61 |
| 20 | −113.524 | 0.300 | | |
| 21 | 246.995 | 13.100 | 1.603001 | 65.44 |
| 22 | −182.400 | (VARIABLE 3) | | |
| 23 | ∞ (STOP) | 11.393 | | |
| 24 | 93.807 | 4.784 | 1.805181 | 25.42 |
| 25 | 265.732 | 24.914 | | |
| 26 | 113.897 | 9.587 | 1.834807 | 42.71 |
| 27 | 50.210 | 30.448 | | |
| 28 | −43.421 | 2.106 | 1.834000 | 37.16 |
| 29 | 220.516 | 0.050 | | |
| 30 | 225.153 | 16.155 | 1.496999 | 81.54 |
| 31 | −56.954 | 0.300 | | |
| 32 | 594.794 | 20.519 | 1.438750 | 94.93 |
| 33 | −61.963 | 0.300 | | |
| 34 | 127.586 | 18.881 | 1.496999 | 81.54 |
| 35 | −230.767 | 0.000 | | |
| 36 | ∞ | 72.614 | 1.539956 | 59.46 |
| 37 | ∞ | 74.000 | 1.841390 | 24.56 |
| 38 | ∞ | 15.035 | | |

| | (VARIABLE 1) | (VARIABLE 2) | (VARIABLE 3) |
|---|---|---|---|
| WIDE ANGLE END | 42.823 | 110.155 | 1.954 |
| TELEPHOTO END | 6.147 | 31.638 | 117.148 |

As Table 6 shows, the full angle 2ω of view is 48.16 degrees at wide angle end, and Fno. is 2.8 through the entire range of magnification. Therefore, the zoom lens for projection in Example 6 has a wide angle, and is a fast lens. Further, the F-number is constant from wide angle end to telephoto end.

As described above, in the zoom lens for projection of Example 6, the outer diameter of at least one magnification-side lens is small as illustrated in FIG. 11, while the zoom ratio of 1.78 is maintained as shown in Table 6.

Example 7

FIG. 13 is a diagram illustrating the structure of a variable magnification optical system for projection in Example 7. FIG. 14 is a diagram illustrating movement paths of lens groups. FIG. 14 illustrates the positions of the lens groups at wide angle end, at middle position, and at telephoto end (reduction ratio of −0.002 times) (same for FIGS. 16, 18, 20, 22, 24, 26, 28 and 30, which will be described later). As illustrated in FIGS. 13 and 14, the variable magnification optical system for projection in Example 7 is composed of first lens group $G_1$ having negative refractive power, second lens group $G_2$ having negative refractive power, third lens group $G_3$ having positive refractive power, and fourth lens group $G_4$ having positive refractive power, which are arranged from the magnification side of the variable magnification optical system in the order mentioned above. Further, the reduction side of the variable magnification optical system for projection is telecentric. Further, an image display plane 1 of a light valve, such as a reflective liquid crystal display panel, and glass blocks 2a, 2b, such as a color combination prism (a filter, such as an infrared-ray cut filter and a low-pass filter, may be included) are arranged on the reduction side of the fourth lens group $G_4$.

When the magnification of the variable magnification optical system is changed, the first lens group $G_1$ and the fourth lens group $G_4$ are fixed, and the second lens group $G_2$ and the third lens group $G_3$ are movable. FIG. 14 illustrates the manner of movement of the lens groups.

The first lens group $G_1$ is composed of first lens $L_1$, which is a plano-convex lens having a convex surface facing the magnification side, second lens $L_2$, which is a negative meniscus lens having a concave surface facing the reduction side, third lens $L_3$, which is a double concave lens, fourth lens $L_4$, which is a double concave lens, fifth lens $L_5$, which is a negative meniscus lens having a concave surface facing the reduction side, and sixth lens $L_6$, which is a double convex lens. The first lens $L_1$ through the sixth lens $L_6$ are arranged from the magnification side of the variable magnification optical system in the order mentioned above. The fifth lens $L_5$ and the sixth lens $L_6$ are cemented together.

Further, the second lens group $G_2$ is composed of seventh lens $L_7$, which is a negative meniscus lens having a convex surface facing the reduction side, and eighth lens $L_8$, which is a positive meniscus lens having a convex surface facing the reduction side. The seventh lens $L_7$ and the eighth lens $L_8$ are arranged from the magnification side in the order mentioned above.

Further, the third lens group $G_3$ is composed of ninth lens $L_9$, which is a positive meniscus lens having a convex surface facing the reduction side, tenth lens $L_{10}$, which is a negative meniscus lens having a convex surface facing the reduction side, and eleventh lens $L_{11}$, which is a double convex lens. The ninth lens $L_9$, the tenth lens $L_{10}$ and the eleventh lens $L_{11}$ are arranged from the magnification side in the order mentioned above.

Further, the fourth lens group $G_4$ is composed of twelfth lens $L_{12}$, a stop (the stop may be an aperture stop, a variable stop or the like) thirteenth lens $L_{13}$, fourteenth lens $L_{14}$, fifteenth lens $L_{15}$, sixteenth lens $L_{16}$, seventeenth lens $L_{17}$ and eighteenth lens $L_{19}$, which are arranged from the magnification side in the order mentioned above. The twelfth lens $L_{12}$ is a double concave lens. The thirteenth lens $L_{13}$ is a double convex lens. The fourteenth lens $L_{14}$ is a negative meniscus lens having a concave surface facing the reduction side. The fifteenth lens $L_{15}$ is a double convex lens, and the sixteenth lens $L_{16}$ is a double concave lens. The seventeenth lens $L_{17}$ and the eighteenth lens $L_{18}$ are double convex lenses. The sixteenth lens $L_{16}$ and the seventeenth lens $L_{17}$ face each other with a very small distance therebetween.

All lens surfaces are spherical, and no aspheric surface is used. Therefore, the variable magnification optical system for projection in Example 7 is cost-advantageous.

Table 7 shows lens data about the variable magnification optical system for projection in Example 7. Table 7 shows radius of curvature R of each surface of the variable magnification optical system for projection in Example 7, axial surface distance D, and refractive index $N_d$ and Abbe number $v_d$ of each lens for d-line.

Table 7 shows surface distances (VARIABLE 1), (VARIABLE 2), and (VARIABLE 3), which change when the magnification of the variable magnification optical system is changed. The bottom part of Table 7 shows the focal length of entire system and the length of each of the variable distances at wide angle end, at middle position, and at telephoto end. Further, the top part of Table 7 shows Fno (F-number), full angle $2\omega$ of view, and variable magnification ratio Zr. The meanings of signs and the manner of representation in Table 7 are similar to those of signs in Tables 8 through 15 corresponding to Examples 8 through 15, which will be described later. Therefore, explanation of the signs will be omitted for Examples 8 through 15. The data in Table 7 are normalized by assuming the focal length to be 10.00 mm. The data in Tables 8 through 15 are normalized in the same manner.

7. Further, the diameter Imø of the maximum effective image circle on the reduction side of the variable magnification optical system for projection in Example 7 is 10.36. Table 7 shows data when the variable magnification optical system for projection in Example 7 is used as a varifocal lens. Lens distances when the variable magnification optical system for projection in Example 7 is used as a zoom lens will be shown in Table 17.

As Table 7 shows, the full angle $2\omega$ of view is 55.2 degrees at wide angle end, and Fno. is 2.49 through the entire range of magnification. Therefore, the variable magnification optical system for projection in Example 7 has a wide angle, and is a fast lens. Further, the F-number is constant from wide angle end to telephoto end.

As described above, in the variable magnification optical system for projection of Example 7, the outer diameter of at

TABLE 7

EXAMPLE 7
Fno = 2.49~2.49, $2\omega$ = 55.2°~35.0°, Zr = 1.64

| SURFACE NUMBER | R | D | Nd | vd |
|---|---|---|---|---|
| 1 | 41.6206 | 3.7713 | 1.51680 | 64.20 |
| 2 | ∞ | 0.1295 | | |
| 3 | 29.7794 | 1.0359 | 1.71300 | 53.94 |
| 4 | 15.5304 | 5.1631 | | |
| 5 | −68.8546 | 0.9323 | 1.61800 | 63.33 |
| 6 | 17.6567 | 3.9429 | | |
| 7 | −46.8452 | 0.7251 | 1.78590 | 44.20 |
| 8 | 58.8265 | 1.2903 | | |
| 9 | 44.9401 | 0.8287 | 1.76182 | 26.52 |
| 10 | 20.3125 | 5.8002 | 1.80610 | 40.92 |
| 11 | −31.0284 | (VARIABLE 1) | | |
| 12 | −15.1858 | 0.8028 | 1.63854 | 55.38 |
| 13 | −132.6224 | 0.7126 | | |
| 14 | −44.0024 | 4.1372 | 1.58144 | 40.75 |
| 15 | −16.4796 | (VARIABLE 2) | | |
| 16 | −111.9759 | 3.1759 | 1.49700 | 81.61 |
| 17 | −20.6819 | 0.5754 | | |
| 18 | −22.9086 | 0.8028 | 1.76182 | 26.52 |
| 19 | −49.1414 | 0.1523 | | |
| 20 | 49.3308 | 2.4700 | 1.61800 | 63.33 |
| 21 | −67.9405 | (VARIABLE 3) | | |
| 22 | −44.2904 | 0.5179 | 1.48749 | 70.23 |
| 23 | 22.8154 | 1.2000 | | |
| 24 | ∞ (STOP) | 5.8245 | | |
| 25 | 41.8849 | 1.7003 | 1.69895 | 30.13 |
| 26 | −56.5567 | 16.3976 | | |
| 27 | 31.4631 | 0.5956 | 1.77250 | 49.60 |
| 28 | 18.0432 | 0.6869 | | |
| 29 | 29.6834 | 3.5956 | 1.49700 | 81.61 |
| 30 | −22.1345 | 1.1426 | | |
| 31 | −18.6327 | 0.6215 | 1.74950 | 35.28 |
| 32 | 30.7321 | 0.1920 | | |
| 33 | 37.8583 | 2.3906 | 1.49700 | 81.61 |
| 34 | −37.8583 | 0.3012 | | |
| 35 | 29.2036 | 3.8136 | 1.49700 | 81.61 |
| 36 | −21.5389 | 5.5426 | | |
| 37 | ∞ | 30.1692 | 1.51633 | 64.14 |
| 38 | ∞ | 0.7769 | 1.50847 | 61.19 |
| 39 | ∞ | | | |

| | FOCAL LENGTH | (VARIABLE 1) | (VARIABLE 2) | (VARIABLE 3) |
|---|---|---|---|---|
| WIDE ANGLE END | 10.00 | 27.9979 | 5.0631 | 1.0333 |
| MIDDLE POSITION | 12.81 | 20.2130 | 1.0422 | 12.8391 |
| TELEPHOTO END | 16.40 | 8.1069 | 0.6278 | 25.3596 |

Further, Table 16 will show numerical values corresponding to the aforementioned formulas with respect to the variable magnification optical system for projection in Example 7.

least one magnification-side lens is small as illustrated in FIG. 13, while the variable magnification ratio of 1.64 is maintained as shown in Table 7.

Example 8

Figure 15:
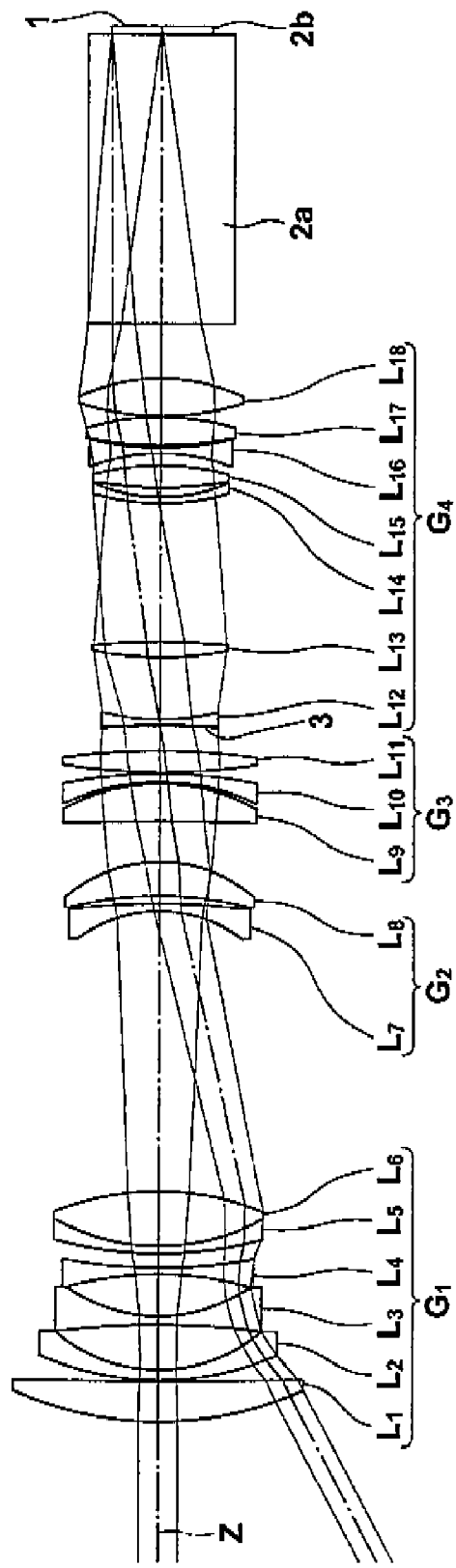
FIG. 15 is a detailed diagram illustrating the structure of a zoom lens for projection in Example 8.

FIG. 15 is a diagram illustrating the structure of a variable magnification optical system for projection in Example 8.

will show numerical values corresponding to the aforementioned formulas with respect to the variable magnification optical system for projection in Example 8. The diameter Imø of the maximum effective image circle on the reduction side of the variable magnification optical system for projection in Example 8 is 10.37.

TABLE 8

EXAMPLE 8
Fno. = 2.48~2.48, 2ω = 55.2°~35.2°, Zr = 1.64

| SURFACE NUMBER | R | D | Nd | νd |
|---|---|---|---|---|
| 1 | 36.6835 | 4.1480 | 1.51633 | 64.14 |
| 2 | 554.8811 | 0.1298 | | |
| 3 | 30.6404 | 1.0885 | 1.77250 | 49.60 |
| 4 | 16.4348 | 4.6744 | | |
| 5 | −82.0371 | 0.9330 | 1.61800 | 63.33 |
| 6 | 16.8029 | 4.3045 | | |
| 7 | −35.5268 | 0.7256 | 1.71300 | 53.87 |
| 8 | 55.4508 | 1.4132 | | |
| 9 | 40.3543 | 0.7920 | 1.80518 | 25.42 |
| 10 | 22.1112 | 5.7069 | 1.78590 | 44.20 |
| 11 | −29.1090 | (VARIABLE 1) | | |
| 12 | −14.2649 | 0.8034 | 1.77250 | 49.60 |
| 13 | −74.5529 | 0.7234 | | |
| 14 | −40.2855 | 3.6185 | 1.60342 | 38.03 |
| 15 | −14.8838 | (VARIABLE 2) | | |
| 16 | −325.3959 | 3.8751 | 1.49700 | 81.54 |
| 17 | −20.6531 | 0.2041 | | |
| 18 | −23.0649 | 0.8734 | 1.80518 | 25.42 |
| 19 | −50.0925 | 0.1294 | | |
| 20 | 63.5801 | 2.1786 | 1.69680 | 55.53 |
| 21 | −70.4492 | (VARIABLE 3) | | |
| 22 | ∞ (STOP) | 0.1739 | | |
| 23 | −39.1251 | 0.5183 | 1.48749 | 70.23 |
| 24 | 23.1781 | 6.4538 | | |
| 25 | 35.1193 | 1.6228 | 1.71736 | 29.52 |
| 26 | −65.8813 | 14.4119 | | |
| 27 | 24.4471 | 0.6479 | 1.77250 | 49.60 |
| 28. | 17.5037 | 0.9646 | | |
| 29 | 39.4913 | 2.3103 | 1.49700 | 81.61 |
| 30 | −27.1504 | 1.3214 | | |
| 31 | −19.0473 | 0.5080 | 1.80610 | 33.27 |
| 32 | 28.8819 | 0.3361 | | |
| 33 | 41.8900 | 2.8543 | 1.49700 | 81.61 |
| 34 | −27.7179 | 0.0778 | | |
| 35 | 27.9946 | 3.9187 | 1.49700 | 81.61 |
| 36 | −20.8709 | 5.6825 | | |
| 37 | ∞ | 30.1920 | 1.51633 | 64.14 |
| 38 | ∞ | 0.7775 | 1.50847 | 61.19 |
| 39 | ∞ | | | |

| | FOCAL LENGTH | (VARIABLE 1) | (VARIABLE 2) | (VARIABLE 3) |
|---|---|---|---|---|
| WIDE ANGLE END | 10.00 | 29.0713 | 4.2253 | 2.5880 |
| MIDDLE POSITION | 12.81 | 20.5109 | 0.9012 | 14.4725 |
| TELEPHOTO END | 16.40 | 8.4379 | 0.3626 | 27.0842 |

Figure 16:
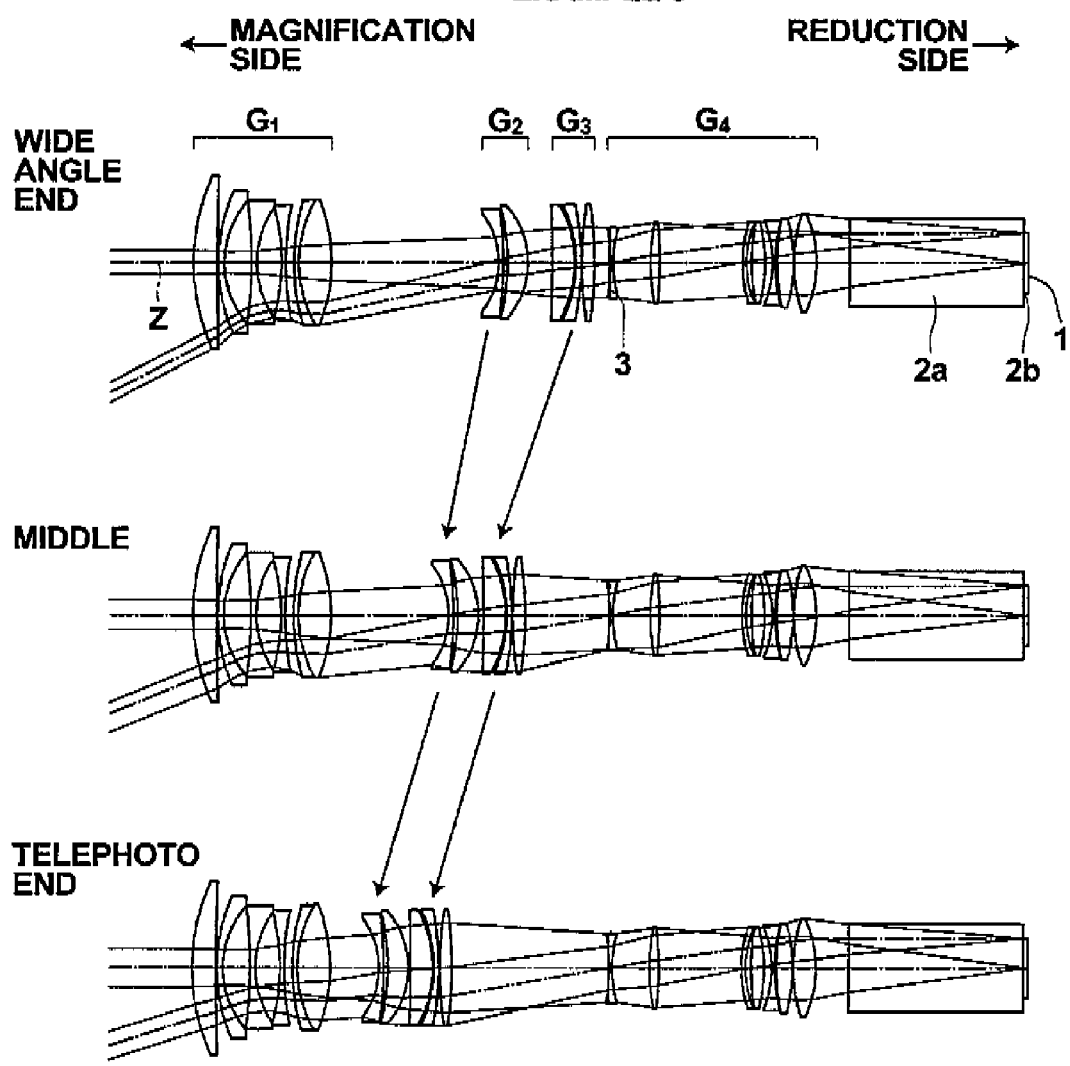
FIG. 16 is a diagram illustrating movement paths of lens groups when magnification of the variable magnification optical system is changed, and the paths of incident rays in the zoom lens for projection in Example 8.

FIG. 16 is a diagram illustrating movement paths of lens groups. As illustrated in FIGS. 15 and 16, the variable magnification optical system for projection in Example 8 is structured in a substantially similar manner to the variable magnification optical system for projection in Example 7. However, Example 8 differs from Example 7 in that the first lens $L_1$ in the first lens group $G_1$ is a positive meniscus lens having a convex surface facing the magnification side. Further, in Example 8, the order of arrangement of the stop 3 and the twelfth lens $L_{12}$ differs from the order of arrangement in Example 7. In Example 8, the stop 3 is arranged on the most magnification side in the fourth lens group $G_4$.

Table 8 shows lens data about the variable magnification optical system for projection in Example 8. Further, Table 16

As Table 8 shows, the full angle 2ω of view is 55.2 degrees at wide angle end, and Fno. is 2.48 through the entire range of magnification. Therefore, the variable magnification optical system for projection in Example 8 has a wide angle, and is a fast lens. Further, the F-number is constant from wide angle end to telephoto end.

As described above, in the variable magnification optical system for projection of Example 8, the outer diameter of at least one magnification-side lens is small as illustrated in FIG. 15, while the variable magnification ratio of 1.64 is maintained as shown in Table 8.

Example 9

Figure 17:
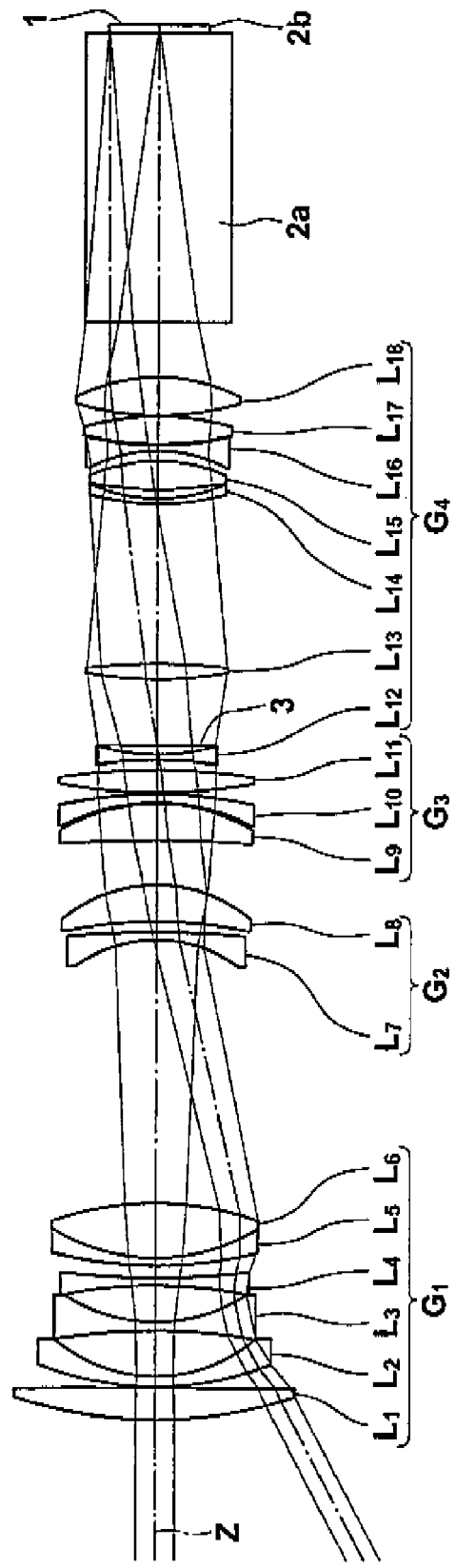
FIG. 17 is a detailed diagram illustrating the structure of a zoom lens for projection in Example 9.

FIG. 17 is a diagram illustrating the structure of a variable magnification optical system for projection in Example 9.

Figure 18:
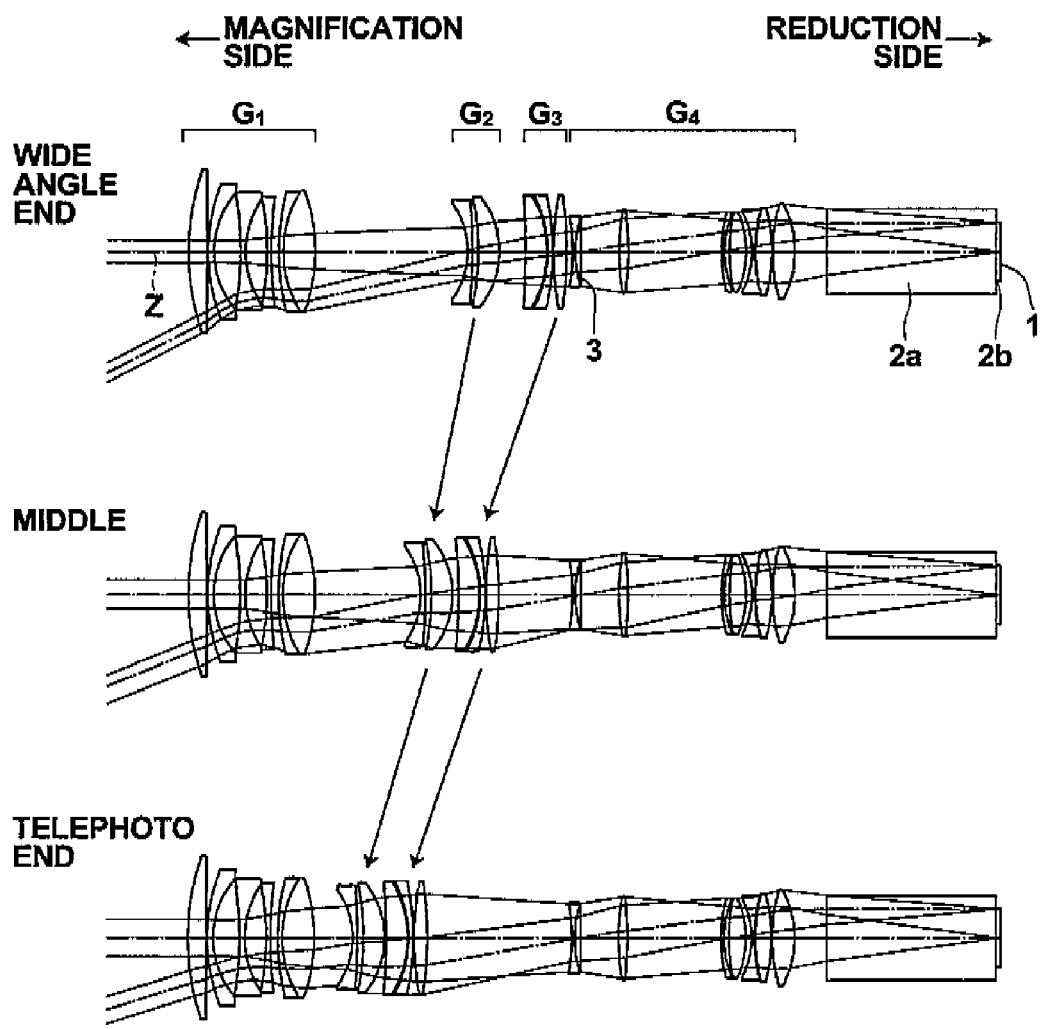
FIG. 18 is a diagram illustrating movement paths of lens groups when magnification of the variable magnification optical system is changed, and the paths of incident rays in the zoom lens for projection in Example 9.

FIG. 18 is a diagram illustrating movement paths of lens groups. As illustrated in FIGS. 17 and 18, the variable magnification optical system for projection in Example 9 is structured in a substantially similar manner to the variable magnification optical system for projection in Example 7. However, Example 9 differs from Example 7 in that the first lens $L_1$ in the first lens group $G_1$ is a double convex lens.

Table 9 shows lens data about the variable magnification optical system for projection in Example 9. Further, Table 16 will show numerical values corresponding to the aforementioned formulas with respect to the variable magnification optical system for projection in Example 9. Further, the diameter Imφ of the maximum effective image circle on the reduction side of the variable magnification optical system for projection in Example 9 is 10.36.

TABLE 9

EXAMPLE 9
Fno. = 2.48~2.48, 2ω = 55.2°~35.0°, Zr = 1.64

| SURFACE NUMBER | R | D | Nd | νd |
|---|---|---|---|---|
| 1 | 45.9299 | 3.2958 | 1.51633 | 64.14 |
| 2 | −1272.8642 | 0.1295 | | |
| 3 | 32.6029 | 1.0878 | 1.71300 | 53.87 |
| 4 | 16.0461 | 4.7192 | | |
| 5 | −65.7812 | 0.9324 | 1.61800 | 63.33 |
| 6 | 17.4318 | 3.7953 | | |
| 7 | −47.5579 | 0.7252 | 1.80610 | 40.92 |
| 8 | 78.1980 | 1.3220 | | |
| 9 | 43.2564 | 0.7915 | 1.76182 | 26.52 |
| 10 | 20.2171 | 5.7093 | 1.80610 | 40.92 |
| 11 | −31.5136 | (VARIABLE 1) | | |
| 12 | −14.4923 | 0.8029 | 1.71300 | 53.87 |
| 13 | −111.5868 | 1.1190 | | |
| 14 | −45.4442 | 3.7910 | 1.57501 | 41.5 |
| 15 | −15.3715 | (VARIABLE 2) | | |
| 16 | −131.8496 | 3.8114 | 1.49700 | 81.54 |
| 17 | −19.6620 | 0.1294 | | |
| 18 | −21.5083 | 0.8728 | 1.75520 | 27.51 |
| 19 | −45.0890 | 0.1295 | | |
| 20 | 54.5055 | 2.3731 | 1.61800 | 63.33 |
| 21 | −66.3736 | (VARIABLE 3) | | |
| 22 | −42.3620 | 0.5180 | 1.48749 | 70.23 |
| 23 | 21.7869 | 1.0000 | | |
| 24 | ∞ (STOP) | 6.8288 | | |
| 25 | 41.5083 | 1.6191 | 1.80610 | 33.27 |
| 26 | −62.9566 | 16.8479 | | |
| 27 | 27.1678 | 0.5180 | 1.71300 | 53.87 |
| 28 | 17.4161 | 0.9496 | | |
| 29 | 37.2278 | 2.9872 | 1.49700 | 81.54 |
| 30 | −17.4902 | 1.0544 | | |
| 31 | −15.4182 | 0.5076 | 1.83400 | 37.16 |
| 32 | 28.1430 | 0.1875 | | |
| 33 | 33.7712 | 2.8680 | 1.49700 | 81.54 |
| 34 | −29.0679 | 0.0777 | | |
| 35 | 30.6653 | 3.9897 | 1.49700 | 81.54 |
| 36 | −18.8389 | 5.6778 | | |
| 37 | ∞ | 30.1720 | 1.51633 | 64.14 |
| 38 | ∞ | 0.7770 | 1.50847 | 61.19 |
| 39 | ∞ | | | |

| | FOCAL LENGTH | (VARIABLE 1) | (VARIABLE 2) | (VARIABLE 3) |
|---|---|---|---|---|
| WIDE ANGLE END | 10.00 | 27.2754 | 4.6531 | 1.0354 |
| MIDDLE POSITION | 12.81 | 18.8919 | 1.0172 | 13.0547 |
| TELEPHOTO END | 16.40 | 6.9006 | 0.2606 | 25.8026 |

As Table 9 shows, the full angle 2ω of view is 55.2 degrees at wide angle end, and Fno. is 2.48 through the entire range of magnification. Therefore, the variable magnification optical system for projection in Example 9 has a wide angle, and is a fast lens. Further, the F-number is constant from wide angle end to telephoto end.

As described above, in the variable magnification optical system for projection of Example 9, the outer diameter of at least one magnification-side lens is small as illustrated in FIG. 17, while the variable magnification ratio of 1.64 is maintained as shown in Table 9.

Example 10

Figure 20:
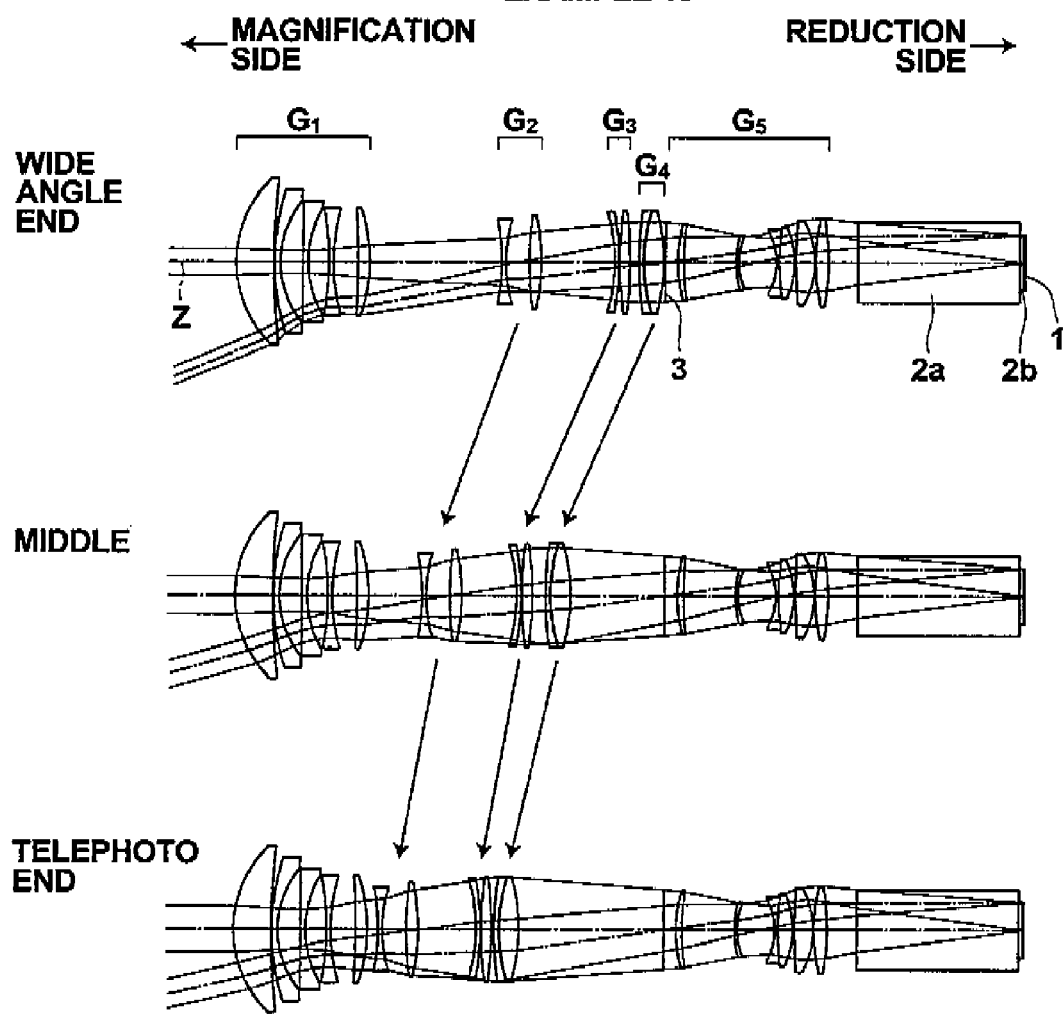
FIG. 20 is a diagram illustrating movement paths of lens groups when magnification of the variable magnification optical system is changed, and the paths of incident rays in the zoom lens for projection in Example 10.

FIG. 19 is a diagram illustrating the structure of a variable magnification optical system for projection in Example 10. FIG. 20 is a diagram illustrating movement paths of lens groups. As illustrated in FIGS. 19 and 20, the variable magnification optical system for projection in Example 10 is composed of first lens group $G_1$ having negative refractive power, second lens group $G_2$ having negative refractive power, third lens group $G_3$ having positive refractive power, fourth lens group $G_4$ having positive refractive power, and fifth lens group $G_5$ having positive refractive power, which are arranged from the magnification side of the variable magnification optical system in the order mentioned above. Further, the reduction side of the variable magnification optical system for projection is telecentric. Further, an image display plane 1 of a light valve, such as a reflective liquid crystal display panel, and glass blocks 2a, 2b, such as a color combination prism (a filter, such as an infrared-ray cut filter and a low-pass filter, may be included) are arranged on the reduction side of the fifth lens group $G_5$.

When the magnification of the variable magnification optical system is changed, the first lens group $G_1$ and the fifth lens group $G_5$ are fixed, and the second lens group $G_2$, the third lens group $G_3$ and fourth lens group $G_4$ are movable. FIG. 20 illustrates the manner of movement of the lens groups.

The first lens group $G_1$ is composed of first lens $L_1$, which is a positive meniscus lens having a convex surface facing the magnification side, second lens $L_2$, which is a negative meniscus lens having a concave surface facing the reduction side, third lens $L_3$, which is a plano-concave lens having a concave surface facing the reduction side, fourth lens $L_4$, which is a double concave lens, and fifth lens $L_5$, which is a positive meniscus lens having a convex surface facing the reduction side. The first lens $L_1$ through the fifth lens $L_5$ are arranged from the magnification side of the variable magnification optical system in the order mentioned above.

Further, the second lens group $G_2$ is composed of sixth lens $L_6$, which is a double concave lens, and seventh lens $L_7$, which is a double convex lens. The sixth lens $L_6$ and the seventh lens $L_7$ are arranged from the magnification side in the order mentioned above.

Further, the third lens group $G_3$ is composed of eighth lens $L_8$, which is a negative meniscus lens having a convex surface facing the reduction side, and ninth lens $L_9$, which is a double convex lens. The eighth lens $L_9$ and the ninth lens $L_9$ are arranged from the magnification side in the order mentioned above.

Further, the fourth lens group $G_4$ is composed of tenth lens $L_{10}$ and eleventh lens $L_{11}$, which are arranged from the magnification side in the order mentioned above. The tenth lens $L_1$ is a negative meniscus lens having a convex surface facing the magnification side. The eleventh lens $L_{11}$ is a double convex lens. The tenth lens $L_{10}$ and the eleventh lens $L_{11}$ face each other with a very small distance therebetween.

Further, the fifth lens group $G_5$ is composed of a stop (the stop may be an aperture stop, a variable stop, or the like) 3, twelfth lens $L_{12}$, thirteenth lens $L_{13}$, fourteenth lens $L_{14}$, fifteenth lens $L_{15}$, sixteenth lens $L_{16}$, and seventeenth lens $L_{17}$, which are arranged from the magnification side in the order mentioned above. The twelfth lens $L_{12}$ is a positive meniscus lens having a convex surface facing the magnification side. The thirteenth lens $L_{13}$ is a negative meniscus lens having a convex surface facing the magnification side. The fourteenth lens $L_{14}$ is a double concave lens. The fifteenth lens $L_{15}$, the sixteenth lens $L_{16}$, and the seventeenth lens $L_{17}$ are double convex lenses. The fourteenth lens $L_{14}$ and the fifteenth lens $L_{15}$ face each other with a very small distance therebetween.

All lens surfaces are spherical, and no aspheric surface is used. Therefore, the variable magnification optical system for projection in Example 10 is cost-advantageous.

Table 10 shows lens data about the variable magnification optical system for projection in Example 10. In Example 10, four surface distances change when magnification of the variable magnification optical system is changed. Therefore, Table 10 shows distances (Variable 1), (Variable 2), (Variable 3), and (Variable 4). Examples 11 through 15 are similar to Example 10 in this respect. Further, Table 16 will show numerical values corresponding to the aforementioned formulas with respect to the variable magnification optical system for projection in Example 10. Further, the diameter Imφ of the maximum effective image circle on the reduction side of the variable magnification optical system for projection in Example 10 is 8.28. Table 10 shows data when the variable magnification optical system for projection in Example 10 is used as a varifocal lens. Lens distances when the variable magnification optical system for projection in Example 10 is used as a zoom lens will be shown in Table 18.

TABLE 10

EXAMPLE 10
Fno. = 2.50~2.50, 2ω = 45.6°~26.6°, Zr = 1.745

| SURFACE UMBER | R | D | Nd | vd |
|---|---|---|---|---|
| 1 | 17.4798 | 5.6336 | 1.48749 | 70.23 |
| 2 | 113.1727 | 0.0837 | | |
| 3 | 35.5854 | 0.8779 | 1.61800 | 63.33 |
| 4 | 14.4207 | 3.4144 | | |
| 5 | ∞ | 0.7521 | 1.49700 | 81.61 |
| 6 | 16.3592 | 3.0968 | | |
| 7 | −39.6094 | 0.6292 | 1.63854 | 55.38 |
| 8 | 29.5664 | 3.7072 | | |
| 9 | −138.6589 | 1.7421 | 1.77250 | 49.60 |
| 10 | −24.5100 | (VARIABLE 1) | | |
| 11 | −32.9866 | 0.8338 | 1.58913 | 61.14 |
| 12 | 22.9127 | 3.5374 | | |
| 13 | 54.5180 | 1.7938 | 1.51742 | 52.43 |
| 14 | −31.8473 | (VARIABLE 2) | | |
| 15 | −25.2843 | 0.6623 | 1.80000 | 29.84 |
| 16 | −37.6407 | 0.0829 | | |
| 17 | 57.4224 | 1.5506 | 1.61800 | 63.33 |
| 18 | −57.4224 | (VARIABLE 3) | | |
| 19 | 55.1941 | 0.6726 | 1.83400 | 37.16 |
| 20 | 25.5990 | 0.1218 | | |
| 21 | 28.1906 | 2.9383 | 1.49700 | 81.61 |
| 22 | −28.1906 | (VARIABLE 4) | | |
| 23 | ∞ (STOP) | 1.8302 | | |
| 24 | 21.8886 | 0.9196 | 1.80518 | 25.42 |
| 25 | 44.0144 | 7.8337 | | |
| 26 | 16.6537 | 0.4139 | 1.83400 | 37.16 |
| 27 | 10.3633 | 5.6212 | | |

TABLE 10-continued

EXAMPLE 10
Fno. = 2.50~2.50, 2ω = 45.6°~26.6°, Zr = 1.745

| | | | | |
|---|---|---|---|---|
| 28 | −9.4518 | 0.4145 | 1.83481 | 42.71 |
| 29 | 38.9213 | 0.0099 | | |
| 30 | 39.9686 | 2.2431 | 1.49700 | 81.61 |
| 31 | −13.0395 | 0.2529 | | |
| 32 | 83.6658 | 2.8378 | 1.49700 | 81.61 |
| 33 | −12.5683 | 0.0948 | | |
| 34 | 28.8419 | 1.9689 | 1.49700 | 81.61 |
| 35 | −35.9180 | 4.3462 | | |
| 36 | ∞ | 24.1110 | 1.51633 | 64.14 |
| 37 | ∞ | 0.6209 | 1.50847 | 61.19 |
| 38 | ∞ | | | |

| | FOCAL LENGTH | (VARIABLE 1) | (VARIABLE 2) | (VARIABLE 3) | (VARIABLE 4) |
|---|---|---|---|---|---|
| WIDE ANGLE END | 10.00 | 19.7513 | 10.9381 | 1.2940 | 0.2476 |
| MIDDLE POSITION | 14.47 | 7.9330 | 8.2791 | 2.0235 | 13.9955 |
| TELEPHOTO END | 17.45 | 1.5877 | 8.6589 | 0.4129 | 21.5714 |

As Table 10 shows, the full angle 2ω of view is 45.6 degrees at wide angle end, and Fno. is 2.50 through the entire range of magnification. Therefore, the variable magnification optical system for projection in Example 10 has a wide angle, and is a fast lens. Further, the F-number is constant from wide angle end to telephoto end.

As described above, in the variable magnification optical system for projection of Example 10, the outer diameter of at least one magnification-side lens is small as illustrated in FIG. 19, while the variable magnification ratio of 1.75 is maintained as shown in Table 10.

Example 11

Figure 21:
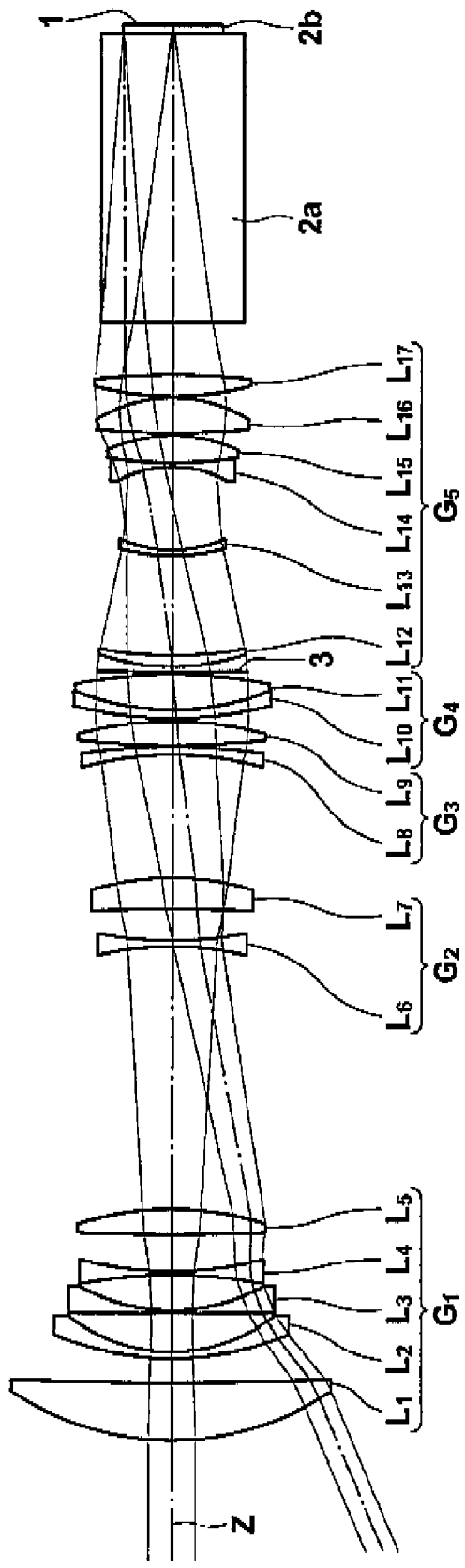
FIG. 21 is a detailed diagram illustrating the structure of a zoom lens for projection in Example 11.
Figure 22:
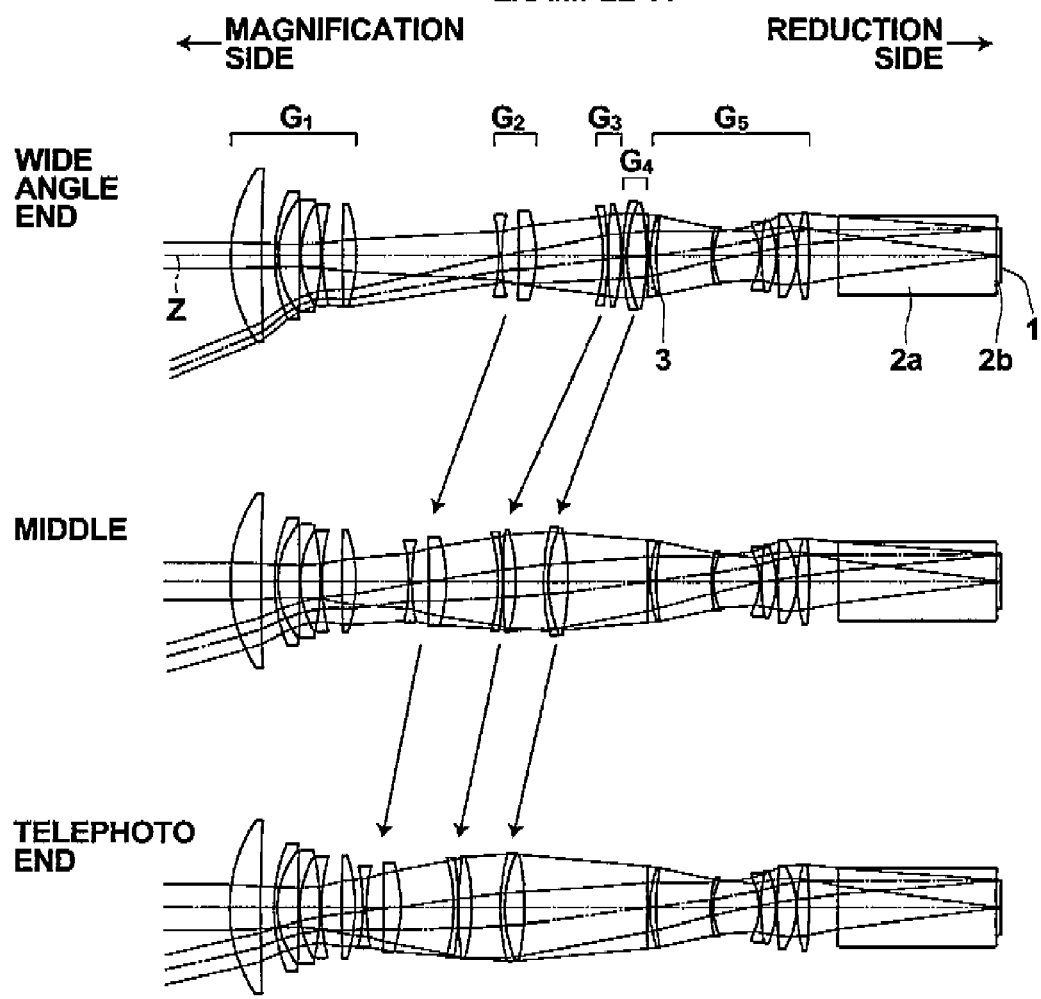
FIG. 22 is a diagram illustrating movement paths of lens groups when magnification of the variable magnification optical system is changed, and the paths of incident rays in the zoom lens for projection in Example 11.

FIG. 21 is a diagram illustrating the structure of a variable magnification optical system for projection in Example 11. FIG. 22 is a diagram illustrating movement paths of lens groups. As illustrated in FIGS. 21 and 22, the variable magnification optical system for projection in Example 11 is structured in a substantially similar manner to the variable magnification optical system in Example 10. However, Example 11 differs from Example 10 in that the fifth lens $L_5$ in the first lens group $G_1$ is a double convex lens, and that seventh lens $L_7$ in the second lens group $G_2$ is a positive meniscus lens having a convex surface facing the reduction side.

Table 11 shows lens data about the variable magnification optical system for projection in Example 11. Further, Table 16 will show numerical values corresponding to the aforementioned formulas with respect to the variable magnification optical system for projection in Example 11. The diameter Imφ of the maximum effective image circle on the reduction side of the variable magnification optical system for projection in Example 11 is 8.28.

TABLE 11

EXAMPLE 11
Fno. = 2.50~2.50, 2ω = 45.6°~26.6°, Zr = 1.745

| SURFACE NUMBER | R | D | Nd | νd |
|---|---|---|---|---|
| 1 | 24.2600 | 4.7187 | 1.48749 | 70.23 |
| 2 | 340.5666 | 2.0335 | | |
| 3 | 25.4311 | 0.5175 | 1.49700 | 81.61 |
| 4 | 13.8459 | 3.2277 | | |
| 5 | 0.0000 | 0.2482 | 1.49700 | 81.61 |
| 6 | 15.8079 | 2.9984 | | |
| 7 | −38.0538 | 0.2484 | 1.80000 | 29.84 |
| 8 | 31.1538 | 3.0719 | | |
| 9 | 196.0048 | 2.1052 | 1.71736 | 29.52 |
| 10 | −25.9771 | (VARIABLE 1) | | |
| 11 | −26.4992 | 0.4857 | 1.58913 | 61.14 |
| 12 | 31.0597 | 2.6396 | | |
| 13 | −163.3827 | 2.5981 | 1.51742 | 52.43 |
| 14 | −23.1212 | (VARIABLE 2) | | |
| 15 | −27.1227 | 0.6624 | 1.74000 | 28.30 |
| 16 | −53.6491 | 0.0828 | | |
| 17 | 70.5615 | 2.0110 | 1.52249 | 59.84 |
| 18 | −29.3067 | (VARIABLE3) | | |
| 19 | 33.4845 | 0.6728 | 1.83400 | 37.16 |
| 20 | 21.1184 | 0.0384 | | |
| 21 | 21.5587 | 2.9905 | 1.49700 | 81.61 |
| 22 | −39.2959 | (VARIABLE 4) | | |
| 23 | ∞ (STOP) | 0.4145 | | |
| 24 | 19.1797 | 0.9127 | 1.80518 | 25.42 |
| 25 | 33.2855 | 8.3432 | | |
| 26 | 17.6560 | 0.4140 | 1.83400 | 37.16 |

TABLE 11-continued

EXAMPLE 11
Fno. = 2.50~2.50, 2ω = 45.6°~26.6°, Zr = 1.745

| | | | | |
|---|---|---|---|---|
| 27 | 10.4495 | 6.9867 | | |
| 28 | −9.6692 | 0.3104 | 1.83481 | 42.71 |
| 29 | 33.7738 | 0.0102 | | |
| 30 | 34.5594 | 2.2749 | 1.49700 | 81.61 |
| 31 | −13.3615 | 0.2070 | | |
| 32 | 75.0517 | 2.9316 | 1.49700 | 81.61 |
| 33 | −12.2832 | 0.0824 | | |
| 34 | 24.5412 | 1.8522 | 1.49700 | 81.61 |
| 35 | −57.3297 | 4.3472 | | |
| 36 | ∞ | 24.1164 | 1.51633 | 64.14 |
| 37 | ∞ | 0.6210 | 1.50847 | 61.19 |
| 38 | ∞ | | | |

| | FOCAL LENGTH | (VARIABLE 1) | (VARIABLE 2) | (VARIABLE 3) | (VARIABLE 4) |
|---|---|---|---|---|---|
| WIDE ANGLE END | 10.00 | 21.8301 | 10.2715 | 0.2070 | 0.2068 |
| MIDDLE POSITION | 14.47 | 8.0961 | 7.9584 | 4.2559 | 12.2050 |
| TELEPHOTO END | 17.45 | 1.2341 | 8.0965 | 4.4275 | 18.7573 |

As Table 11 shows, the full angle 2ω of view is 45.6 degrees at wide angle end, and Fno. is 2.50 through the entire range of magnification. Therefore, the variable magnification optical system for projection in Example 11 has a wide angle, and is a fast lens. Further, the F-number is constant from wide angle end to telephoto end.

As described above, in the variable magnification optical system for projection of Example 11, the outer diameter of at least one magnification-side lens is small as illustrated in FIG. 21, while the variable magnification ratio of 1.75 is maintained as shown in Table 11.

Example 12

Figure 23:
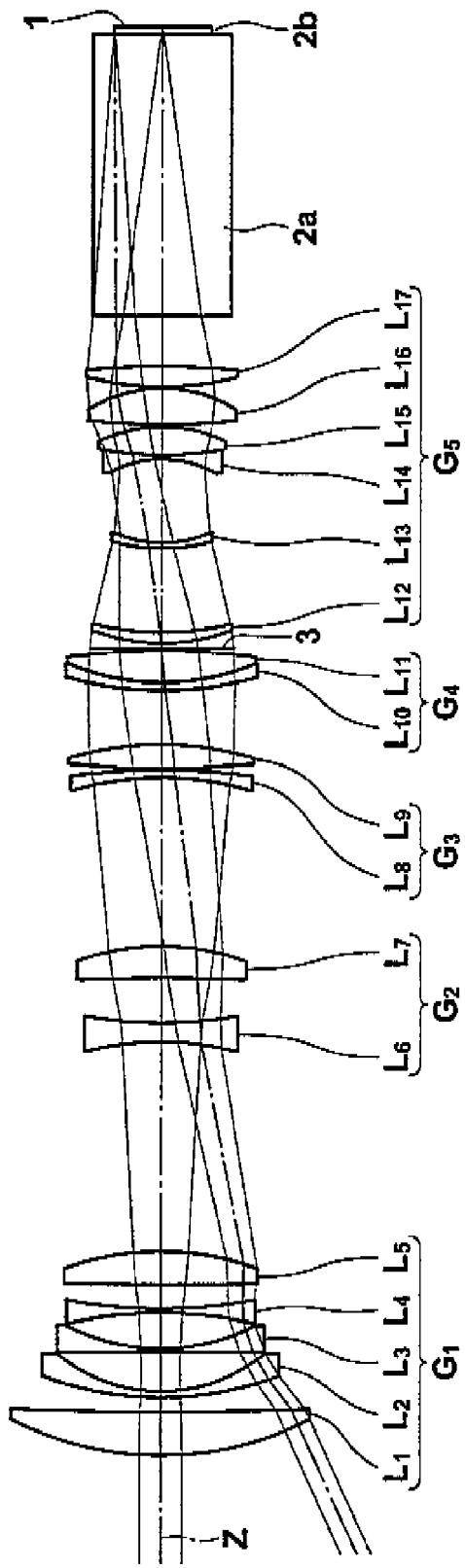
FIG. 23 is a detailed diagram illustrating the structure of a zoom lens for projection in Example 12.
Figure 24:
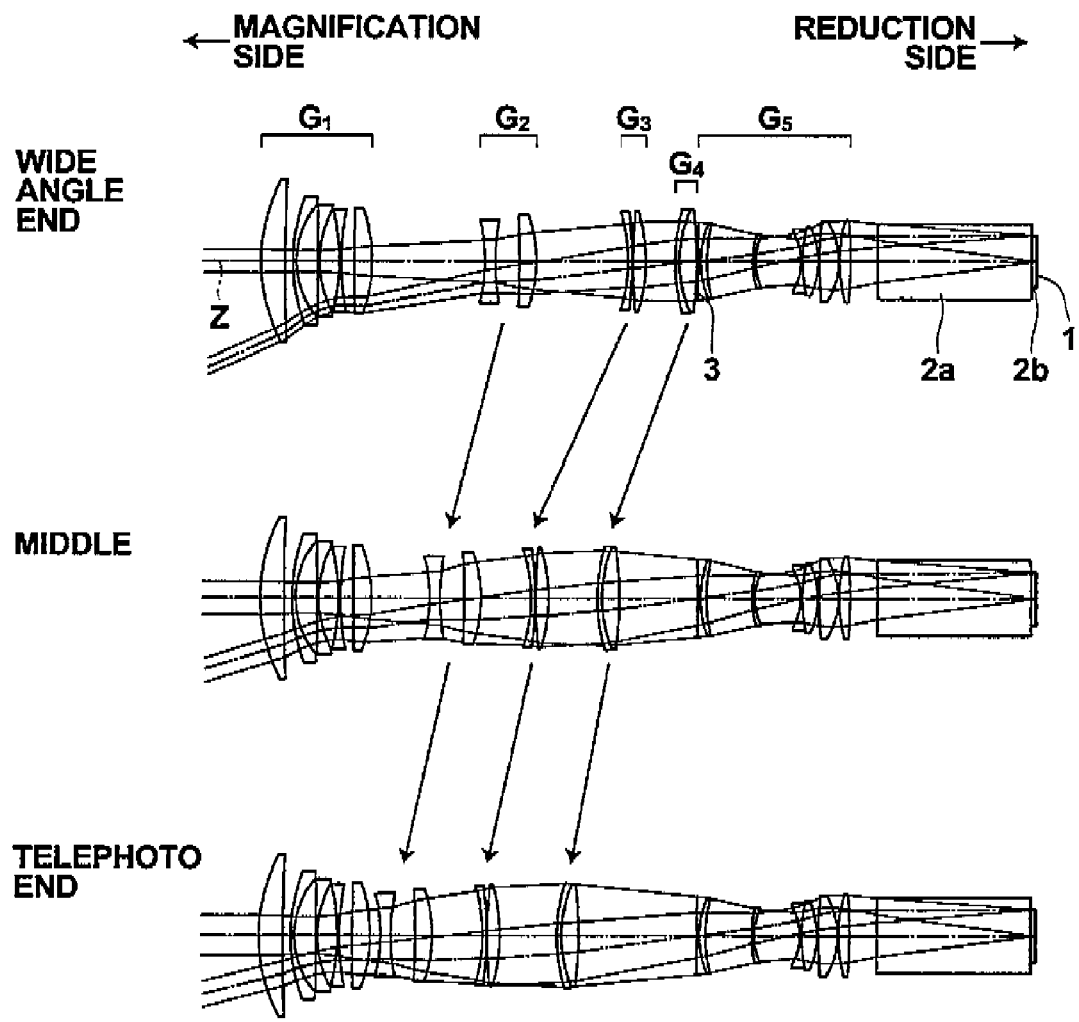
FIG. 24 is a diagram illustrating movement paths of lens groups when magnification of the variable magnification optical system is changed, and the paths of incident rays in the zoom lens for projection in Example 12.

FIG. 23 is a diagram illustrating the structure of a variable magnification optical system for projection in Example 12. FIG. 24 is a diagram illustrating movement paths of lens groups. As illustrated in FIGS. 23 and 24, the variable magnification optical system for projection in Example 12 is structured in a substantially similar manner to the variable magnification optical system in Example 10. However, Example 12 differs from Example 10 in that the fifth lens $L_5$ in the first lens group $G_1$ is a double convex lens, and that seventh lens $L_7$ in the second lens group $G_2$ is a positive meniscus lens having a convex surface facing the reduction side.

Table 12 shows lens data about the variable magnification optical system for projection in Example 12. Further, Table 16 will show numerical values corresponding to the aforementioned formulas with respect to the variable magnification optical system for projection in Example 12. The diameter Imφ of the maximum effective image circle on the reduction side of the variable magnification optical system for projection in Example 12 is 9.04.

TABLE 12

EXAMPLE 12
Fno. = 2.50~2.50, 2ω = 49.2°~29.0°, Zr = 1.746

| SURFACE NUMBER | R | D | Nd | νd |
|---|---|---|---|---|
| 1 | 30.5719 | 4.0949 | 1.48749 | 70.23 |
| 2 | 366.5598 | 1.3692 | | |
| 3 | 31.9920 | 0.5650 | 1.49700 | 81.61 |
| 4 | 15.2357 | 3.6863 | | |
| 5 | 0.0000 | 0.2713 | 1.49700 | 81.61 |
| 6 | 18.9551 | 3.4060 | | |
| 7 | −37.8057 | 0.3524 | 1.80000 | 29.84 |
| 8 | 47.3831 | 2.2292 | | |
| 9 | 491.1618 | 3.1212 | 1.71736 | 29.52 |
| 10 | −26.4287 | (VARIABLE 1) | | |
| 11 | −28.7667 | 1.8081 | 1.58913 | 61.14 |
| 12 | 41.2062 | 4.1904 | | |
| 13 | −154.6014 | 2.9101 | 1.51742 | 52.43 |
| 14 | −23.4983 | (VARIABLE 2) | | |
| 15 | −28.4019 | 0.7232 | 1.74000 | 28.30 |
| 16 | −62.5855 | 0.0904 | | |
| 17 | 83.7273 | 2.2434 | 1.52249 | 59.84 |
| 18 | −29.9507 | (VARIABLE 3) | | |
| 19 | 32.5365 | 0.7345 | 1.83400 | 37.16 |
| 20 | 22.4006 | 0.0380 | | |
| 21 | 22.8149 | 2.9376 | 1.49700 | 81.61 |
| 22 | −71.4494 | (VARIABLE 4) | | |
| 23 | ∞ (STOP) | 0.4520 | | |
| 24 | 17.3899 | 1.0430 | 1.80518 | 25.42 |
| 25 | 27.8819 | 7.8781 | | |

TABLE 12-continued

EXAMPLE 12
Fno. = 2.50~2.50, 2ω = 49.2°~29.0°, Zr = 1.746

| | | | | |
|---|---|---|---|---|
| 26 | 17.7.725 | 0.4520 | 1.83400 | 37.16 |
| 27 | 10.6152 | 7.9073 | | |
| 28 | −10.2014 | 0.3391 | 1.83481 | 42.71 |
| 29 | 30.5797 | 0.0112 | | |
| 30 | 31.1813 | 2.6386 | 1.49700 | 81.61 |
| 31 | −14.1901 | 0.2260 | | |
| 32 | 69.4417 | 3.3776 | 1.49700 | 81.61 |
| 33 | −12.8988 | 0.0903 | | |
| 34 | 26.5995 | 1.9313 | 1.49700 | 81.61 |
| 35 | −79.7029 | 4.7462 | | |
| 36 | ∞ | 26.3302 | 1.51633 | 64.14 |
| 37 | ∞ | 0.6780 | 1.50847 | 61.19 |
| 38 | ∞ | | | |

| | FOCAL LENGTH | (VARIABLE 1) | (VARIABLE 2) | (VARIABLE 3) | (VARIABLE 4) |
|---|---|---|---|---|---|
| WIDE ANGLE END | 10.00 | 19.5273 | 15.8089 | 5.0358 | 0.2255 |
| MIDDLE POSITION | 14.48 | 10.0256 | 8.7056 | 8.3965 | 13.4697 |
| TELEPHOTO END | 17.46 | 1.7498 | 8.7251 | 9.8397 | 20.2828 |

As Table 12 shows, the full angle 2ω of view is 49.2 degrees at wide angle end, and Fno. is 2.50 through the entire range of magnification. Therefore, the variable magnification optical system for projection in Example 12 has a wide angle, and is a fast lens. Further, the F-number is constant from wide angle end to telephoto end.

As described above, in the variable magnification optical system for projection of Example 12, the outer diameter of at least one magnification-side lens is small as illustrated in FIG. 23, while the variable magnification ratio of 1.75 is maintained as shown in Table 12.

Example 13

Figure 25:
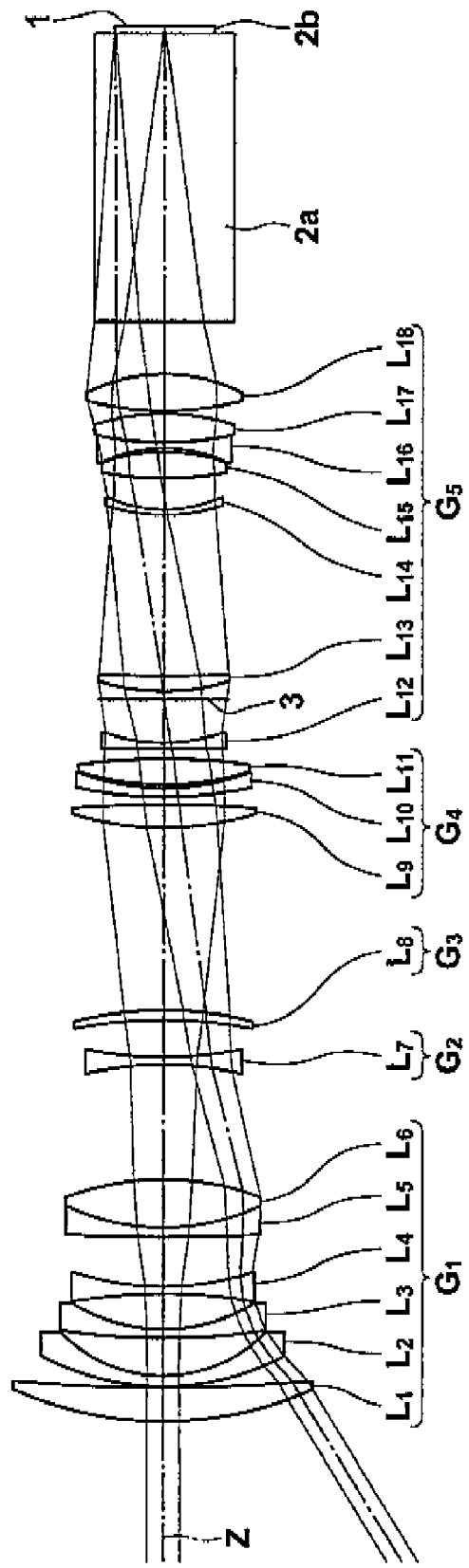
FIG. 25 is a detailed diagram illustrating the structure of a zoom lens for projection in Example 13.
Figure 26:
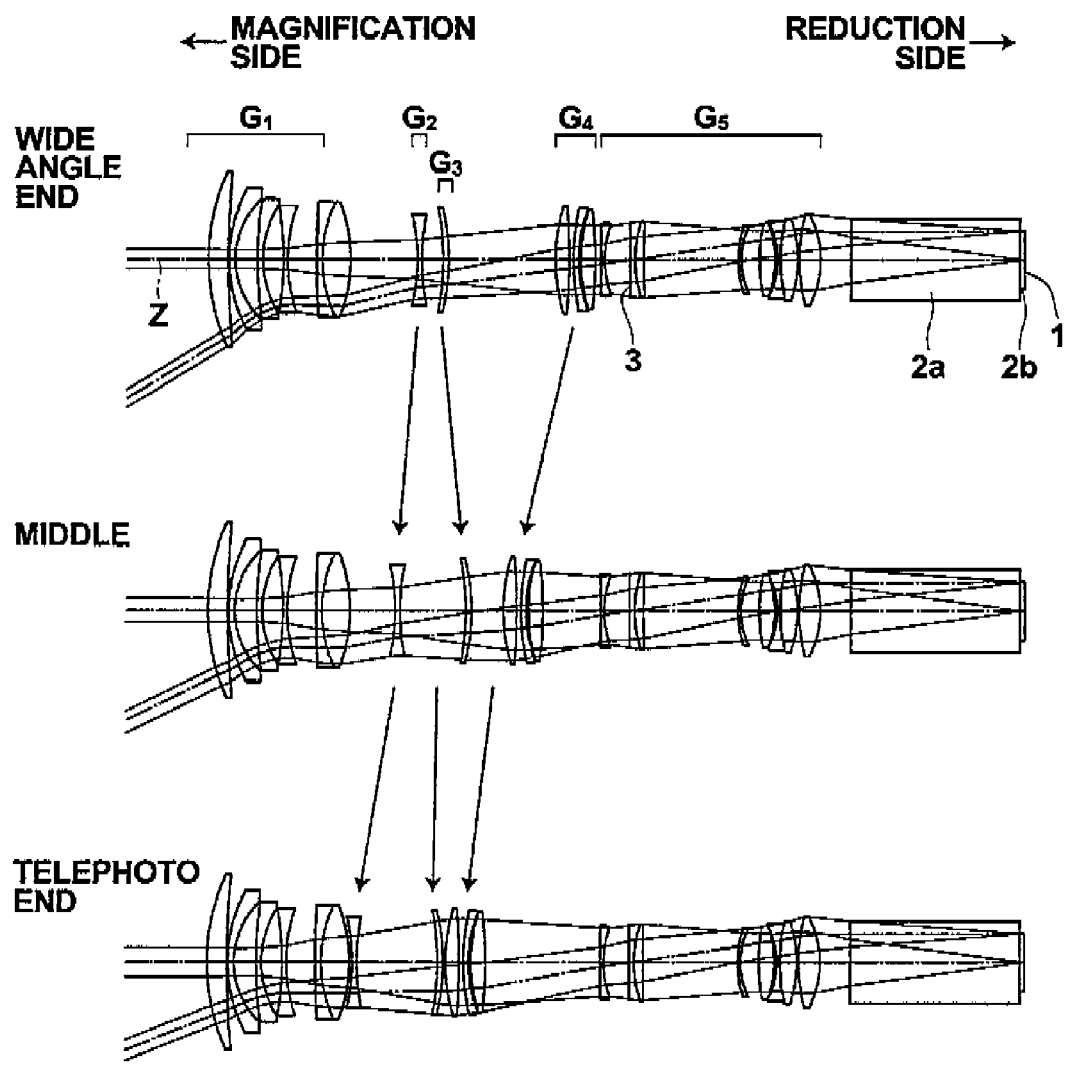
FIG. 26 is a diagram illustrating movement paths of lens groups when magnification of the variable magnification optical system is changed, and the paths of incident rays in the zoom lens for projection in Example 13.

FIG. 25 is a diagram illustrating the structure of a variable magnification optical system for projection in Example 13. FIG. 26 is a diagram illustrating movement paths of lens groups. As illustrated in FIGS. 25 and 26, the variable magnification optical system for projection in Example 13 is composed of first lens group $G_1$ having negative refractive power, second lens group $G_2$ having negative refractive power, third lens group $G_3$ having positive refractive power, fourth lens group $G_4$ having positive refractive power, and fifth lens group $G_5$ having positive refractive power, which are arranged from the magnification side of the variable magnification optical system in the order mentioned above. Further, the reduction side of the variable magnification optical system for projection is telecentric. Further, an image display plane 1 of a light valve, such as a reflective liquid crystal display panel, and glass blocks 2a, 2b, such as a color combination prism (a filter, such as an infrared-ray cut filter and a low-pass filter, may be included) are arranged on the reduction side of the fifth lens group $G_5$.

When the magnification of the variable magnification optical system is changed, the first lens group $G_1$ and the fifth lens group $G_5$ are fixed, and the second lens group $G_2$, the third lens group $G_3$ and fourth lens group $G_4$ are movable. FIG. 26 illustrates the manner of movement of the lens groups.

The first lens group $G_1$ is composed of first lens $L_1$, which is a positive meniscus lens having a convex surface facing the magnification side, second lens $L_2$, which is a negative meniscus lens having a concave surface facing the reduction side, third lens $L_3$, which is a negative meniscus lens having a concave surface facing the reduction side, fourth lens $L_4$, which is a double concave lens, fifth lens $L_5$, which is a negative meniscus lens having a convex surface facing the magnification side, and the sixth lens $L_6$, which is a double convex lens. The first lens $L_1$ through the sixth lens $L_6$ are arranged from the magnification side of the variable magnification optical system in the order mentioned above. The fifth lens $L_5$ and the sixth lens $L_5$ are cemented together.

Further, the second lens group $G_2$ is composed of seventh lens $L_7$, which is a double concave lens.

Further, the third lens group $G_3$ is composed of eighth lens $L_8$, which is a positive meniscus lens having a convex surface facing the reduction side.

Further, the fourth lens group $G_4$ is composed of ninth lens $L_9$, which is a double convex lens, tenth lens $L_{10}$, which is a negative meniscus lens having a convex surface facing the magnification side, and eleventh lens $L_{11}$, which is a double convex lens. The ninth lens $L_9$ through the eleventh lens $L_H$ are arranged from the magnification side in the order mentioned above.

Further, the fifth lens group $G_5$ is composed of twelfth lens a stop (the stop may be an aperture stop, a variable stop or $L_{12}$, the like) 3, thirteenth lens $L_{13}$, fourteenth lens $L_{14}$, fifteenth lens $L_{15}$, sixteenth lens $L_{16}$, seventeenth lens $L_{17}$ and eighteenth lens $L_{18}$, which are arranged from the magnification side in the order mentioned above. The twelfth lens $L_{12}$ is a negative meniscus lens having a convex surface facing the magnification side. The thirteenth lens $L_{13}$ is a positive meniscus lens having a convex surface facing the magnification side. The fourteenth lens $L_{14}$ is a negative meniscus lens having a convex surface facing the magnification side. The fifteenth lens $L_{15}$ is a double convex lens, and the sixteenth lens $L_{16}$ is a double concave lens. The seventeenth lens $L_{17}$ and the eighteenth lens $L_{18}$ are double convex lenses. The sixteenth lens $L_{15}$ and the seventeenth lens $L_1$, face each other with a very small distance therebetween.

All lens surfaces are spherical, and no aspheric surface is used. Therefore, the variable magnification optical system for projection in Example 13 is cost-advantageous.

Table 13 shows lens data about the variable magnification optical system for projection in Example 13. Further, Table 16 will show numerical values corresponding to the aforementioned formulas with respect to the variable magnification optical system for projection in Example 13. The diameter Imφ of the maximum effective image circle on the reduction side of the variable magnification optical system for projection in Example 13 is 12.11.

nification optical system for projection in Example 14 is structured in a substantially similar manner to the variable magnification optical system in Example 13. However,

TABLE 13

EXAMPLE 13
Fno. = 2.49~2.49, 2ω = 62.8°~43.4°, Zr = 1.516

| SURFACE NUMBER | R | D | Nd | νd |
|---|---|---|---|---|
| 1 | 44.6090 | 4.1518 | 1.51633 | 64.14 |
| 2 | 205.8109 | 0.1514 | | |
| 3 | 31.8049 | 1.2719 | 1.71300 | 53.87 |
| 4 | 17.5005 | 4.6255 | | |
| 5 | 84.8909 | 1.0902 | 1.61800 | 63.33 |
| 6 | 21.0943 | 4.3438 | | |
| 7 | −64.9333 | 0.8479 | 1.77250 | 49.60 |
| 8 | 35.0921 | 6.0713 | | |
| 9 | 257.4667 | 1.1568 | 1.62588 | 35.70 |
| 10 | 27.8784 | 5.8884 | 1.74320 | 49.34 |
| 11 | −34.1683 | (VARIABLE 1) | | |
| 12 | −41.2069 | 0.9388 | 1.48749 | 70.23 |
| 13 | 49.3014 | (VARIABLE 2) | | |
| 14 | −56.2615 | 1.2113 | 1.60342 | 38.03 |
| 15 | −43.6332 | (VARIABLE 3) | | |
| 16 | 38.5260 | 2.8749 | 1.48749 | 70.23 |
| 17 | −139.5180 | 0.9084 | | |
| 18 | 51.4520 | 1.0205 | 1.80518 | 25.42 |
| 19 | 28.8501 | 0.4856 | | |
| 20 | 34.2926 | 3.0963 | 1.48749 | 70.23 |
| 21 | −81.4870 | (VARIABLE 4) | | |
| 22 | 1480.2720 | 0.7571 | 1.61800 | 63.33 |
| 23 | 22.3263 | 5.2903 | | |
| 24 | ∞ (STOP) | 1.0107 | | |
| 25 | 26.6157 | 1.8762 | 1.75520 | 27.51 |
| 28 | 278.8295 | 19.7493 | | |
| 27 | 22.6656 | 0.6057 | 1.80400 | 46.57 |
| 28 | 16.8399 | 3.8491 | | |
| 29 | 40.0569 | 3.2487 | 1.49700 | 81.54 |
| 30 | −23.1167 | 0.4821 | | |
| 31 | −17.6750 | 0.5936 | 1.83400 | 37.16 |
| 32 | 34.2588 | 0.1517 | | |
| 33 | 39.7228 | 3.4865 | 1.49700 | 81.54 |
| 34 | −27.1199 | 0.3025 | | |
| 35 | 38.4529 | 4.4873 | 1.49700 | 81.54 |
| 36 | −21.1982 | 6.4763 | | |
| 37 | ∞ | 35.2799 | 1.51633 | 64.14 |
| 38 | ∞ | 0.9085 | 1.50847 | 61.19 |
| 39 | ∞ | | | |

| | FOCAL LENGTH | (VARIABLE 1) | (VARIABLE 2) | (VARIABLE 3) | (VARIABLE 4) |
|---|---|---|---|---|---|
| WIDE ANGLE END | 10.00 | 14.0090 | 4.5432 | 22.3053 | 1.2112 |
| MIDDLE POSITION | 12.31 | 9.5536 | 13.8208 | 6.6203 | 12.0740 |
| TELEPHOTO END | 15.16 | 0.6442 | 16.9588 | 0.4538 | 24.0119 |

As Table 13 shows, the full angle 2ω of view is 62.8 degrees at wide angle end, and Fno. is 2.49 through the entire range of magnification. Therefore, the variable magnification optical system for projection in Example 13 has a wide angle, and is a fast lens. Further, the F-number is constant from wide angle end to telephoto end.

As described above, in the variable magnification optical system for projection of Example 13, the outer diameter of at least one magnification-side lens is small as illustrated in FIG. 25, while the variable magnification ratio of 1.52 is maintained as shown in Table 13.

Example 14

Figure 27:
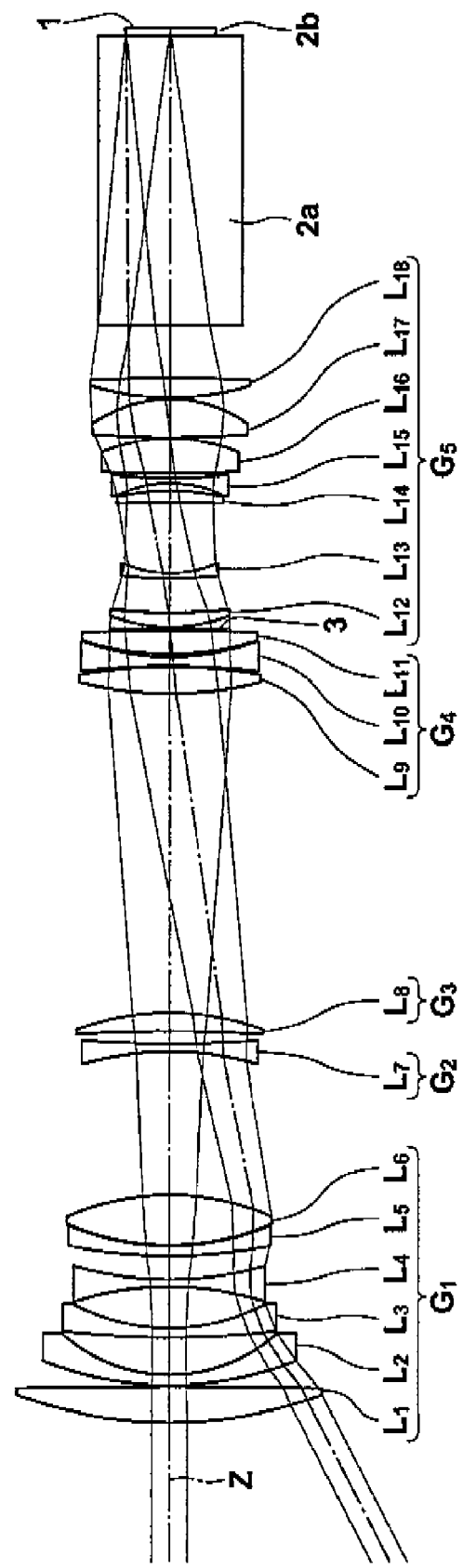
FIG. 27 is a detailed diagram illustrating the structure of a zoom lens for projection in Example 14.
Figure 28:
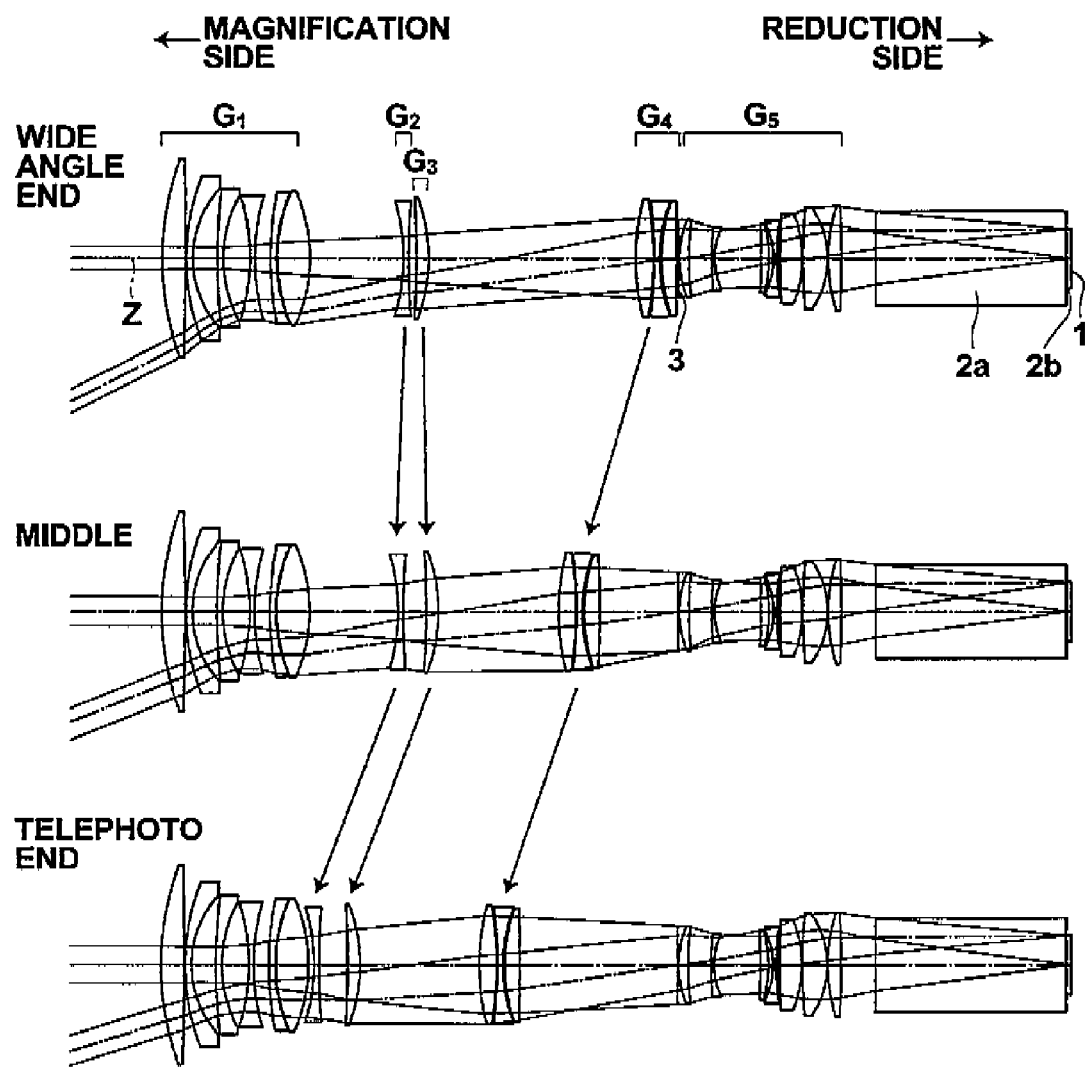
FIG. 28 is a diagram illustrating movement paths of lens groups when magnification of the variable magnification optical system is changed, and the paths of incident rays in the zoom lens for projection in Example 14.

FIG. 27 is a diagram illustrating the structure of a variable magnification optical system for projection in Example 14. FIG. 28 is a diagram illustrating movement paths of lens groups. As illustrated in FIGS. 27 and 28, the variable mag- Example 14 differs from Example 13 in that the first lens $L_1$ in the first lens group $G_1$ is a double convex lens, and that the fifth lens $L_5$ and the sixth lens $L_6$ are not cemented together, and that tenth lens $L_{10}$ in the fourth lens group $G_4$ is a double concave lens. Further, the structure of the lens group $G_5$ is different.

In Example 14, the fifth lens group $G_5$ is composed of a stop (an aperture stop, a variable stop, or the like) 3, twelfth lens $L_{12}$, thirteenth lens $L_{13}$, fourteenth lens $L_{14}$, fifteenth lens $L_{15}$, sixteenth lens $L_{16}$, seventeenth lens $L_{17}$ and eighteenth lens $L_{15}$, which are arranged from the magnification side in the order mentioned above. The twelfth lens $L_{12}$ is a positive meniscus lens having a convex surface facing the magnification side. The thirteenth lens $L_{13}$ is a negative meniscus lens having a convex surface facing the magnification side. The fourteenth lens $L_{14}$ is a positive meniscus lens having a concave surface facing the magnification side. The fifteenth lens $L_{15}$ is a double concave lens. The sixteenth lens $L_{16}$, the seventeenth lens $L_{12}$, and the eighteenth lens $L_{18}$ are double convex lenses.

Table 14 shows lens data about the variable magnification optical system for projection in Example 14. Further, Table 16 will show numerical values corresponding to the aforementioned formulas with respect to the variable magnification optical system for projection in Example 14. The diameter Imφ of the maximum effective image circle on the reduction side of the variable magnification optical system for projection in Example 14 is 10.15.

least one magnification-side lens is small as illustrated in FIG. 27, while the variable magnification ratio of 1.6 is maintained as shown in Table 14.

Example 15

Figure 29:
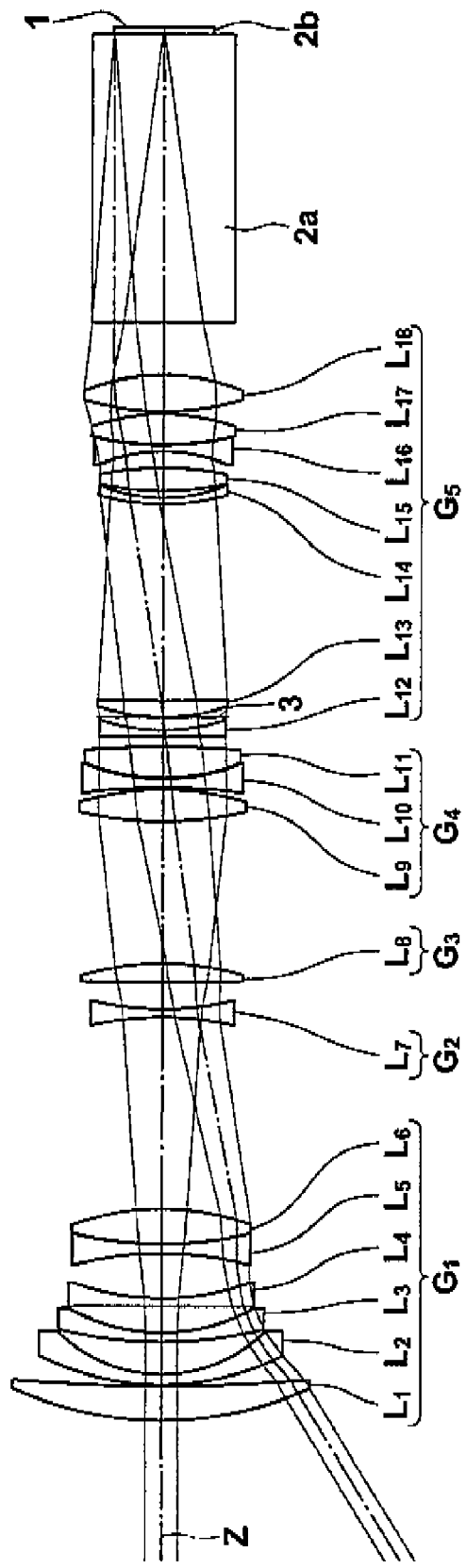
FIG. 29 is a detailed diagram illustrating the structure of a zoom lens for projection in Example 15.
Figure 30:
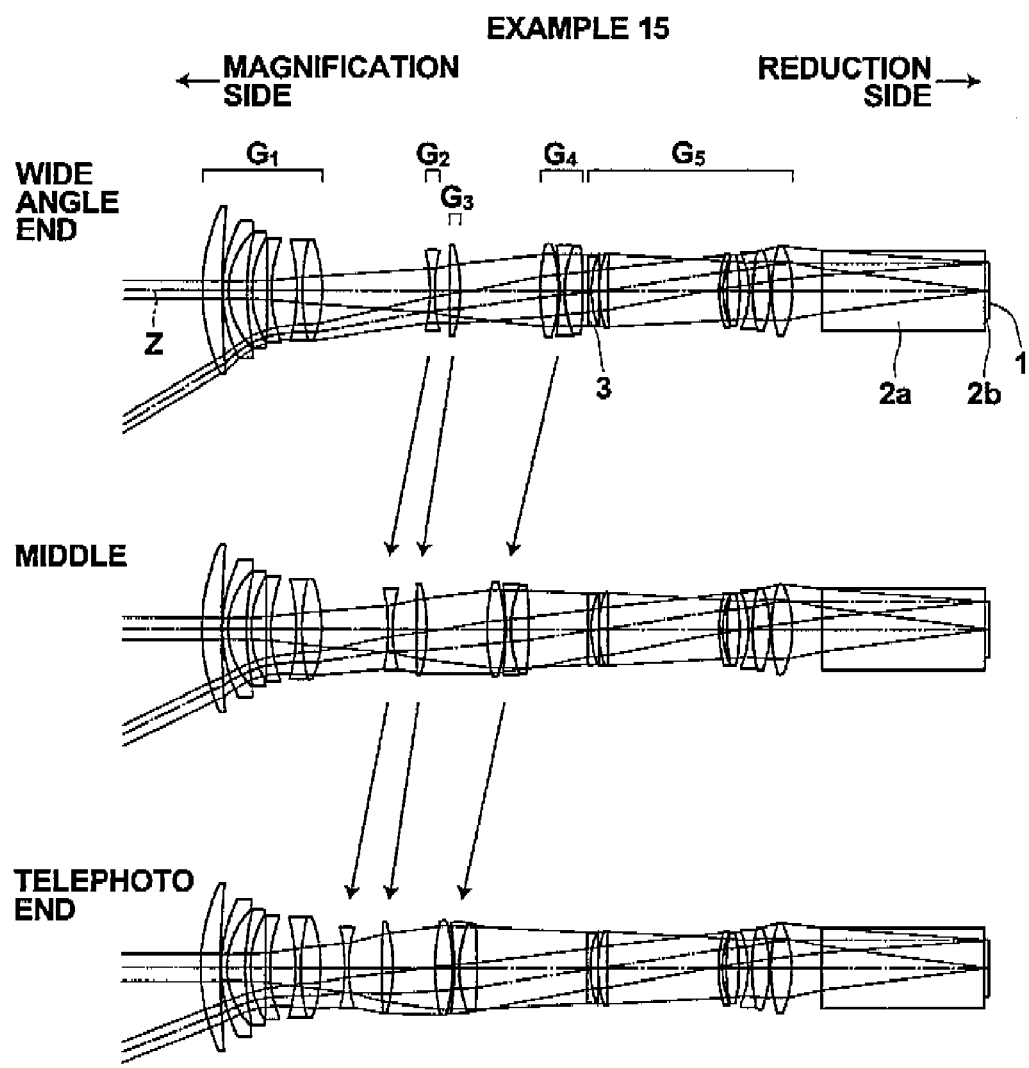
FIG. 30 is a diagram illustrating movement paths of lens groups when magnification of the variable magnification optical system is changed, and the paths of incident rays in the zoom lens for projection in Example 15.

FIG. 29 is a diagram illustrating the structure of a variable magnification optical system for projection in Example 15. FIG. 30 is a diagram illustrating movement paths of lens groups. As illustrated in FIGS. 29 and 30, the variable magnification optical system for projection in Example 15 is

TABLE 14

EXAMPLE 14
Fno. = 2.50~2.50, 2ω = 54.2°~35.2°, Zr = 1.599

| SURFACE NUMBER | R | D | Nd | vd |
|---|---|---|---|---|
| 1 | 50.5206 | 3.9977 | 1.51633 | 64.14 |
| 2 | −817.9363 | 0.1410 | | |
| 3 | 38.3226 | 1.1843 | 1.49700 | 81.54 |
| 4 | 18.0911 | 4.2542 | | |
| 5 | 108.4125 | 1.0151 | 1.61800 | 63.33 |
| 6 | 22.9716 | 4.7139 | | |
| 7 | −34.2090 | 0.7895 | 1.77250 | 49.60 |
| 8 | 38.9583 | 2.6793 | | |
| 9 | 58.3196 | 1.0772 | 1.80518 | 25.42 |
| 10 | 28.8367 | 0.1227 | | |
| 11 | 29.0032 | 5.6598 | 1.65412 | 39.68 |
| 12 | −28.6146 | (VARIABLE 1) | | |
| 13 | −33.9212 | 0.8741 | 1.61800 | 63.33 |
| 14 | 125.7057 | (VARIABLE 2) | | |
| 15 | −169.2957 | 2.1268 | 1.51633 | 64.14 |
| 16 | −29.4570 | (VARIABLE 3) | | |
| 17 | 41.1532 | 3.0760 | 1.62041 | 60.29 |
| 18 | −58.1652 | 0.0845 | | |
| 19 | −83.0004 | 0.9503 | 1.60342 | 38.03 |
| 20 | 27.5780 | 0.3860 | | |
| 21 | 31.6391 | 2.6096 | 1.61800 | 63.33 |
| 22 | −309.5511 | (VARIABLE 4) | | |
| 23 | ∞ (STOP) | 0.1410 | | |
| 24 | 18.0016 | 1.6726 | 1.78472 | 25.68 |
| 25 | 68.2901 | 3.8715 | | |
| 26 | 57.6794 | 0.5640 | 1.74950 | 35.33 |
| 27 | 12.8976 | 7.9852 | | |
| 28 | −233.7350 | 1.3643 | 1.49700 | 81.54 |
| 29 | −24.7501 | 0.8693 | | |
| 30 | −13.3024 | 0.5527 | 1.83400 | 37.16 |
| 31 | 58.0072 | 0.5426 | | |
| 32 | 152.3124 | 3.9634 | 1.43875 | 94.93 |
| 33 | −20.1753 | 0.0846 | | |
| 34 | 118.0486 | 4.3432 | 1.43875 | 94.93 |
| 35 | −15.2879 | 0.0846 | | |
| 36 | 29.5252 | 2.3138 | 1.49700 | 81.54 |
| 37 | −146.0513 | 5.9236 | | |
| 38 | ∞ | 32.8507 | 1.51633 | 64.14 |
| 39 | ∞ | 0.8459 | 1.50847 | 61.19 |
| 40 | ∞ | | | |

| | FOCAL LENGTH | (VARIABLE 1) | (VARIABLE 2) | (VARIABLE 3) | (VARIABLE 4) |
|---|---|---|---|---|---|
| WIDE ANGLE END | 10.00 | 16.1938 | 1.3839 | 35.9988 | 0.2717 |
| MIDDLE POSITION | 12.65 | 15.3181 | 4.0188 | 20.9644 | 13.5469 |
| TELEPHOTO END | 15.99 | 0.9535 | 4.9581 | 20.6643 | 27.3088 |

As Table 14 shows, the full angle 2ω of view is 54.2 degrees at wide angle end, and Fno. is 2.50 through the entire range of magnification. Therefore, the variable magnification optical system for projection in Example 14 has a wide angle, and is a fast lens. Further, the F-number is constant from wide angle end to telephoto end.

As described above, in the variable magnification optical system for projection of Example 14, the outer diameter of at structured in a substantially similar manner to the variable magnification optical system in Example 13. However, Example 15 differs from Example 13 in that the fourth lens $L_4$ in the first lens group $G_1$ is a plano-concave lens having a flat surface facing the magnification side, and that the fifth lens $L_5$ in the first lens group $G_1$ is a double concave lens, and that the eighth lens $L_s$ in the third lens group $G_3$ is a double convex lens, and that that tenth lens $L_{10}$ in the fourth lens group $G_4$ is a double concave lens, and that the twelfth lens $L_{12}$ in the fifth lens group $G_5$ is a plano-concave lens having a flat surface facing the magnification side.

Table 15 shows lens data about the variable magnification optical system for projection in Example 15. Further, Table 16 will show numerical values corresponding to the aforementioned formulas with respect to the variable magnification optical system for projection in Example 15. The diameter Imφ of the maximum effective image circle on the reduction side of the variable magnification optical system for projection in Example 15 is 12.12.

a fast lens. Further, the F-number is constant from wide angle end to telephoto end.

As described above, in the variable magnification optical system for projection of Example 15, the outer diameter of at least one magnification-side lens is small as illustrated in FIG. 29, while the variable magnification ratio of 1.52 is maintained as shown in Table 15.

Table 16 shows numerical values corresponding to the aforementioned formulas with respect to Examples 1 through 15. Since the zoom lenses for projection in Examples 1

TABLE 15

EXAMPLE 15
Fno. = 2.49~2.49, 2ω = 62.8°~43.4°, Zr = 1.516

| SURFACE NUMBER | R | D | Nd | vd |
|---|---|---|---|---|
| 1 | 43.6785 | 4.2525 | 1.48749 | 70.23 |
| 2 | 208.3442 | 0.1514 | | |
| 3 | 32.928 | 1.2721 | 1.71300 | 53.87 |
| 4 | 17.8699 | 3.9534 | | |
| 5 | 51.4768 | 1.1510 | 1.61800 | 63.33 |
| 6 | 23.0431 | 3.2607 | | |
| 7 | ∞ | 0.9692 | 1.80518 | 25.42 |
| 8 | 31.8946 | 5.4793 | | |
| 9 | −41.6211 | 1.1510 | 1.49700 | 81.54 |
| 10 | 45.8932 | 4.3161 | 1.56732 | 42.82 |
| 11 | −31.5477 | (VARIABLE 1) | | |
| 12 | −39.3762 | 0.9389 | 1.49700 | 81.54 |
| 13 | 35.0884 | (VARIABLE 2) | | |
| 14 | 456.3834 | 2.3119 | 1.51633 | 64.14 |
| 15 | −35.0956 | (VARIABLE 3) | | |
| 16 | 46.0257 | 3.8863 | 1.48749 | 70.23 |
| 17 | −36.716 | 0.2931 | | |
| 18 | −72.9339 | 1.0207 | 1.60342 | 38.03 |
| 19 | 24.8746 | 0.1277 | | |
| 20 | 26.2264 | 3.7989 | 1.62041 | 60.29 |
| 21 | −116.5405 | (VARIABLE 4) | | |
| 22 | ∞ | 0.7572 | 1.61800 | 63.33 |
| 23 | 22.7748 | 1.6679 | | |
| 24 | ∞ (STOP) | 0.0000 | | |
| 25 | 24.8323 | 1.9392 | 1.76182 | 26.52 |
| 28 | 199.8094 | 24.1936 | | |
| 27 | 28.5748 | 0.7572 | 1.83400 | 37.16 |
| 28 | 20.0323 | 0.8645 | | |
| 29 | 37.6272 | 2.8294 | 1.49700 | 81.54 |
| 30 | −37.6272 | 1.9935 | | |
| 31 | −19.9589 | 0.7572 | 1.74950 | 35.33 |
| 32 | 34.3304 | 0.1510 | | |
| 33 | 39.2197 | 3.6844 | 1.49700 | 81.54 |
| 34 | −26.1446 | 0.3029 | | |
| 35 | 34.1567 | 4.4604 | 1.49700 | 81.54 |
| 36 | −25.1921 | 6.5365 | | |
| 37 | ∞ | 35.2861 | 1.51833 | 64.14 |
| 38 | ∞ | 0.9087 | 1.50847 | 61.19 |
| 39 | ∞ | | | |

| | FOCAL LENGTH | (VARIABLE 1) | (VARIABLE 2) | (VARIABLE 3) |
|---|---|---|---|---|
| WIDE ANGLE END | 10.00 | 23.4433 | 3.3226 | 17.4265 |
| MIDDLE POSITION | 12.31 | 14.4809 | 5.1707 | 13.0168 |
| TELEPHOTO END | 15.16 | 5.1583 | 7.3011 | 9.0954 |

As Table 15 shows, the full angle 2ω of view is 62.8 degrees at wide angle end, and Fno. is 2.49 through the entire range of magnification. Therefore, the variable magnification optical system for projection in Example 15 has a wide angle, and is through 6 are categorized into the variable magnification optical systems for projection, Table 16 shows numerical values for both of the first embodiment and the second embodiment of the present invention.

TABLE 16

| FORMULA | EXAMPLE 1 | EXAMPLE 2 | EXAMPLE 3 | EXAMPLE 4 | EXAMPLE 5 | EXAMPLE 6 |
|---|---|---|---|---|---|---|
| (1).(11) Bf/fw | 2.22 | 2.22 | 2.22 | 2.22 | 2.59 | 1.77 |
| (2).(12) $f_1$/fw | −4.75 | −4.41 | −4.10 | −3.72 | −4.36 | −3.56 |

TABLE 16-continued

|  | | | | | |
|---|---|---|---|---|---|
| (3) $f_2$/fw | −29.93 | −19.80 | −28.86 | −27.88 | −32.02 | −29.86 |
| (13) $f_{MK}$/fw | | | | | | |
| (4) $f_3$/fw | 4.95 | 4.64 | 4.53 | 4.07 | 5.22 | 3.40 |
| (14) $f_{MS}$/fw | | | | | | |
| (5) $f_4$/fw | 3.07 | 3.25 | 3.16 | 3.17 | 3.41 | 2.62 |
| (15) $f_E$/fw | | | | | | |
| (16) Bf /Im φ | 2.08 | 2.08 | 2.08 | 2.07 | 2.08 | 2.01 |
| (18) Bf/Im φ × Zr² | 6.59 | 6.59 | 6.59 | 6.57 | 5.34 | 6.35 |
| (19) L/Im φ | 9.02 | 9.02 | 9.02 | 8.15 | 8.14 | 8.52 |
| (20) Zr | 1.78 | 1.78 | 1.78 | 1.78 | 1.60 | 1.78 |

| FORMULA | EXAMPLE 7 | EXAMPLE 8 | EXAMPLE 9 | EXAMPLE 10 | EXAMPLE 11 | EXAMPLE 12 | EXAMPLE 13 | EXAMPLE 14 | EXAMPLE 15 |
|---|---|---|---|---|---|---|---|---|---|
| (11) Bf/fw | 2.60 | 2.61 | 2.61 | 2.08 | 2.08 | 2.27 | 3.03 | 2.82 | 3.04 |
| (12) $f_1$/fw | −4.65 | −4.74 | −4.89 | −3.68 | −3.48 | −3.62 | −5.47 | −4.26 | −2.87 |
| (13) $f_{MK}$/fw | −10.73 | −9.00 | −9.01 | −7.56 | −5.50 | −8.62 | −4.59 | −4.31 | −3.72 |
| (14) $f_{MS}$/fw | 4.22 | 4.05 | 4.15 | 5.61 | 4.77 | 5.85 | 4.25 | 5.55 | 5.03 |
| (15) $f_E$/fw | 2.95 | 2.98 | 2.99 | 3.02 | 3.23 | 3.47 | 3.43 | 3.47 | 3.77 |
| (16) Bf/Im φ | 2.51 | 2.52 | 2.52 | 2.51 | 2.52 | 2.52 | 2.51 | 2.77 | 2.51 |
| (17) $f_{Mn}$/fw | | | | 8.59 | 8.12 | 9.93 | 31.09 | 6.87 | 6.32 |
| (18) Bf/Im φ × Zr² | 6.74 | 6.77 | 6.77 | 7.66 | 7.66 | 7.67 | 5.76 | 7.09 | 5.77 |
| (19) L/Im φ | 10.57 | 10.45 | 10.45 | 10.70 | 10.70 | 11.25 | 10.57 | 11.62 | 10.57 |
| (20) Zr | 1.640 | 1.640 | 1.640 | 1.745 | 1.745 | 1.746 | 1.516 | 1.599 | 1.516 |

Table 17 shows focal lengths of the entire system and lengths of variable distances when the variable magnification optical system for projection in Example 7 is used as a zoom lens for projection by changing only a distance or distances between lens groups. Table 17 shows values at wide angle end, at middle position, and at telephoto end when a projection distance is infinity. In Example 7, when the lens is used as a zoom lens, an inner focus method is adopted in focusing when the projection distance has changed. In focusing by using the inner focus method, the cemented lens of the fifth lens $L_5$ and the sixth lens $L_6$ in the first lens group $G_1$ is moved in the direction of the optical axis. In Table 17, the column of D8 shows a distance between surfaces that changes during focusing, in other words, a distance between the fourth lens $L_4$ and the fifth lens $L_5$.

TABLE 17

|  | FOCAL LENGTH | D8 | (VARIABLE 1) | (VARIABLE 2) | (VARIABLE 3) |
|---|---|---|---|---|---|
| WIDE ANGLE END | 9.99 | 1.2631 | 28.0251 | 5.0631 | 1.0333 |
| MIDDLE POSITION | 12.79 | 1.2631 | 20.1347 | 1.1353 | 12.8515 |
| TELEPHOTO END | 16.38 | 1.2631 | 7.9500 | 0.8005 | 25.3710 |

Table 18 shows focal lengths of the entire system and lengths of variable distances when the variable magnification optical system for projection in Example 10 is used as a zoom lens for projection by changing only a distance or distances between lens groups. Table 18 shows values at wide angle end, at middle position, and at telephoto end when a projection distance is infinity. In Example 10, when the lens is used as a zoom lens, an inner focus method is adopted in focusing when a projection distance has changed. In focusing by using the inner focus method, the fifth lens $L_5$ in the first lens group is moved in the direction of the optical axis. In Table 18, the column of D8 shows a distance between surfaces that changes during focusing, in other words, a distance between the fourth lens $L_4$ and the fifth lens $L_5$.

TABLE 18

|  | FOCAL LENGTH | D8 | (VARIABLE 1) | (VARIABLE 2) | (VARIABLE 3) | (VARIABLE 4) |
|---|---|---|---|---|---|---|
| WIDE ANGLE END | 9.99 | 3.6344 | 19.8241 | 10.9381 | 1.2940 | 0.2476 |
| MIDDLE POSITION | 14.46 | 3.6344 | 8.0058 | 8.2791 | 2.0235 | 13.9955 |
| TELEPHOTO END | 17.44 | 3.6344 | 1.6605 | 8.6589 | 0.4129 | 21.5714 |

FIGS. 31A-i, 31A-ii, 31A-iii and 31A-iv are diagrams illustrating aberrations in Example 1 (spherical aberration, astigmatism, distortion, and lateral chromatic aberration at wide angle end, respectively). FIGS. 31B-i, 31B-ii, 31B-iii and 31B-iv are diagrams illustrating aberrations in Example 1 (spherical aberration, astigmatism, distortion, and lateral chromatic aberration at middle position, respectively). FIGS. 31C-i, 31C-ii, 31C-iii and 31C-iv are diagrams illustrating aberrations in Example (spherical aberration, astigmatism, distortion, and lateral chromatic aberration at telephoto end, respectively). Similarly, FIGS. 32A-i through 32C-iv, FIGS. 33A-i through 33C-iv, FIGS. 34A-i through 34C-iv, FIGS. 35A-i through 35C-iv, FIGS. 36A-i through 36C-iv, FIGS. 37A-i through 37C-iv, FIGS. 38A-i through 38C-iv, FIGS. 39A-i through 39C-iv, FIGS. 40A-i through 40C-iv, FIGS.

41A-i through 41C-iv, FIGS. 42A-i through 42C-iv, FIGS. 43A-i through 43C-iv, FIGS. 44A-i through 44C-iv, and FIGS. 45A-i through 45C-iv are diagram illustrating aberrations in Examples 2 through 15, respectively. In these diagrams, "F" represents Fno. (F-number), and "ω" represents a half angle of view. In the diagrams illustrating spherical aberrations, aberration curves for d-line (wavelength is 587.6 nm), F-line (wavelength is 486.1 nm), and C-line (wavelength is 656.3 nm) are illustrated. In the diagrams illustrating lateral chromatic aberrations, aberration curves of F-line and C-line with respect to d-line are illustrated. The diagrams for Examples 1 through 6 illustrate aberrations when projection distance is 7583.0 mm. The diagrams for Examples 7 through 15 illustrate aberrations when reduction ratio is −0.002 times. As FIGS. 31A-i through 45C-iv illustrate, various kinds of aberration, such as spherical aberration, distortion, and lateral chromatic aberration, are corrected in an excellent manner in Examples 1 through 15.

In Examples 1 through 15, the reduction side is telecentric. Further, the lenses in Examples 1 through 15 have long back focus, and no aspheric surface is used. Further, Fno. is in the range of from 2.5 to 2.8, which is small, and the full angle of view exceeds degrees. Further, the outer diameter of at least one magnification-side lens does not become too large even when the projection angle is increased. Further, it is possible to suppress the fluctuation of aberrations when magnification of the variable magnification optical system is changed, while a large magnification ratio is maintained. Further, the Fno. is constant through the entire range of from wide angle end to telephoto end.

The zoom lenses for projection of the present invention and the variable magnification optical systems for projection of the present invention are not limited to the aforementioned examples, and various modifications are possible without departing from the gist of the present invention. For example, the radius of curvature R of each lens and the axial surface intervals D may be changed in an appropriate manner.

Further, the structure of the projection-type display apparatus of the present invention is not limited to the aforementioned structure. The projection-type display apparatus may be structured in various manners by providing the zoom lens for projection or the variable magnification optical system for projection of the present invention in the apparatus.

What is claimed is:

1. A variable magnification optical system for projection consisting of:
   a first lens group having negative refractive power, and which is fixed when magnification of the variable magnification optical system is changed;
   a second lens group having negative refractive power, and which moves when magnification of the variable magnification optical system is changed;
   a third lens group having positive refractive power, and which moves when magnification of the variable magnification optical system is changed; and
   a fourth lens group having positive refractive power, and which is fixed when magnification of the variable magnification optical system is changed, the first lens group, the second lens group, the third lens group and the fourth lens group being arranged from the magnification side of the variable magnification optical system in the order mentioned above,
   wherein the reduction side of the variable magnification optical system is telecentric, and
   wherein the following formula (11) is satisfied:

$$1.5 < Bf/fw \quad (11),$$

where
   Bf: back focus in air of entire system at wide angle end, and
   fw: focal length of entire system at wide angle end.

2. A variable magnification optical system for projection, as defined in claim 1, wherein the following formula (16) is satisfied:

$$1.8 < Bf/Im\phi \quad (16),$$

where
   Bf: back focus in air of entire system at wide angle end, and
   Imφ: diameter of a maximum effective image circle on the reduction side of the variable magnification optical system.

3. A variable magnification optical system for projection, as defined in claim 1, wherein the following formula (13) is satisfied:

$$fMK/fw < -3.5 \quad (13),$$

where
   fMK: focal length of a most-magnification-side lens group among a plurality of lens groups that move when magnification of the variable magnification optical system is changed, and
   fw: focal length of entire system at wide angle end.

4. A variable magnification optical system for projection, as defined in claim 1, wherein the following formula (14) is satisfied:

$$1.5 < fMS/fw < 10.0 \quad (14),$$

where
   fMS: focal length of a most-reduction-side lens group among a plurality of lens groups that move when magnification of the variable magnification optical system is changed, and
   fw: focal length of entire system at wide angle end.

5. A variable magnification optical system for projection, as defined in claim 1, wherein the following formula (15) is satisfied:

$$1.0 < fE/fw < 5.0 \quad (15),$$

where
   fE: focal length of the lens group having positive refractive power that is arranged on the most reduction side in the entire system of the variable magnification optical system, and which is fixed when magnification of the variable magnification optical system is changed, and
   fw: focal length of entire system at wide angle end.

6. A variable magnification optical system for projection, as defined in claim 1, wherein the variable magnification optical system is a zoom lens.

7. A variable magnification optical system for projection, as defined in claim 6, wherein at least one reduction-side lens in the first lens group is movable in the direction of an optical axis in focusing when a projection distance has changed.

8. A projection-type display apparatus comprising:
   a light source;
   a light valve; and
   a variable magnification optical system for projection, as defined in claim 1,
   wherein an optical image formed by light modulated by the light valve is projected onto a screen by the variable magnification optical system for projection.

9. A variable magnification optical system for projection comprising:
- a first lens group having negative refractive power, and which is fixed when magnification of the variable magnification optical system is changed;
- a second lens group having negative refractive power, and which moves when magnification of the variable magnification optical system is changed;
- a third lens group having positive refractive power, and which moves when magnification of the variable magnification optical system is changed; and
- a fourth lens group having positive refractive power, and which is fixed when magnification of the variable magnification optical system is changed, the first lens group, the second lens group, the third lens group and the fourth lens group being arranged from the magnification side of the variable magnification optical system in the order mentioned above, wherein the reduction side of the variable magnification optical system is telecentric, and wherein the following formula (12) is satisfied:

$$-10.0 < f1/fw < 0.0 \qquad (12),$$

where
- f1: focal length of the first lens group, and
- fw: focal length of entire system at wide angle end.

10. A variable magnification optical system for projection, as defined in claim 9, wherein the following formula (16) is satisfied:

$$1.8 < Bf/Im\phi \qquad (16),$$

where
- Bf: back focus in air of entire system at wide angle end, and
- Imφ: diameter of a maximum effective image circle on the reduction side of the variable magnification optical system.

11. A variable magnification optical system for projection, as defined in claim 9, wherein the following formula (13) is satisfied:

$$fMK/fw < -3.5 \qquad (13),$$

where
- fMK: focal length of a most-magnification-side lens group among a plurality of lens groups that move when magnification of the variable magnification optical system is changed, and
- fw: focal length of entire system at wide angle end.

12. A variable magnification optical system for projection, as defined in claim 9, wherein the following formula (14) is satisfied:

$$1.5 < fMS/fw < 10.0 \qquad (14),$$

where
- fMS: focal length of a most-reduction-side lens group among a plurality of lens groups that move when magnification of the variable magnification optical system is changed, and
- fw: focal length of entire system at wide angle end.

13. A variable magnification optical system for projection, as defined in claim 9, wherein the following formula (15) is satisfied:

$$1.0 < fE/fw < 5.0 \qquad (15),$$

where
- fE: focal length of the lens group having positive refractive power that is arranged on the most reduction side in the entire system of the variable magnification optical system, and which is fixed when magnification of the variable magnification optical system is changed, and
- fw: focal length of entire system at wide angle end.

14. A variable magnification optical system for projection, as defined in claim 9, wherein the variable magnification optical system is a zoom lens.

15. A variable magnification optical system for projection, as defined in claim 14, wherein at least one reduction-side lens in the first lens group is movable in the direction of an optical axis in focusing when a projection distance has changed.

16. A projection-type display apparatus comprising:
- a light source;
- a light valve; and
- a variable magnification optical system for projection, as defined in claim 9, wherein an optical image formed by light modulated by the light valve is projected onto a screen by the variable magnification optical system for projection.

17. A variable magnification optical system for projection comprising:
- a first lens group having negative refractive power, and which is arranged on the most magnification side of the variable magnification optical system, and which is fixed when magnification of the variable magnification optical system is changed;
- a final lens group having positive refractive power, and which is arranged on the most reduction side of the variable magnification optical system, and which is fixed when magnification of the variable magnification optical system is changed; and
- a plurality of lens groups that are arranged between the first lens group and the final lens group, and which move when magnification of the variable magnification optical system is changed, wherein a most-magnification-side lens group among the plurality of lens groups that move when magnification of the variable magnification optical system is changed has negative refractive power, and wherein a most-reduction-side lens group among the plurality of lens groups that move when magnification of the variable magnification optical system is changed has positive refractive power, and wherein the reduction side of the variable magnification optical system is telecentric, and wherein the following formulas (11) and (12') are satisfied:

$$1.5 < Bf/fw \qquad (11);$$

and $$-10.0 < f1/fw < -2.0 \qquad (12'),$$

where
- Bf: back focus in air of entire system at wide angle end,
- fw: focal length of entire system at wide angle end, and
- f1: focal length of the first lens group.

18. A variable magnification optical system for projection, as defined in claim 17, wherein the following formula (16) is satisfied:

$$1.8 < Bf/Im\phi \qquad (16),$$

where
- Bf: back focus in air of entire system at wide angle end, and
- Imφ: diameter of a maximum effective image circle on the reduction side of the variable magnification optical system.

19. A variable magnification optical system for projection, as defined in claim 17, wherein the following formula (13) is satisfied:

$$fMK/fw < -3.5 \tag{13}$$

where
- fMK: focal length of a most-magnification-side lens group among a plurality of lens groups that move when magnification of the variable magnification optical system is changed, and
- fw: focal length of entire system at wide angle end.

20. A variable magnification optical system for projection, as defined in claim 17, wherein the following formula (14) is satisfied:

$$1.5 < fMS/fw < 10.0 \tag{14}$$

where
- fMS: focal length of a most-reduction-side lens group among a plurality of lens groups that move when magnification of the variable magnification optical system is changed, and
- fw: focal length of entire system at wide angle end.

21. A variable magnification optical system for projection, as defined in claim 17, wherein the following formula (15) is satisfied:

$$1.0 < fE/fw < 5.0 \tag{15}$$

where
- fE: focal length of the lens group having positive refractive power that is arranged on the most reduction side in the entire system of the variable magnification optical system, and which is fixed when magnification of the variable magnification optical system is changed, and
- fw: focal length of entire system at wide angle end.

22. A variable magnification optical system for projection, as defined in claim 17, wherein the plurality of lens groups that move when magnification of the variable magnification optical system is changed are three lens groups, and
  wherein a second lens group from the magnification side among the three lens groups has positive refractive power, and
  wherein the following formula (17) is satisfied:

$$5.0 < fMm/fw \tag{17}$$

where
- fMm: focal length of the second lens group from the magnification side among the three lens groups, and
- fw: focal length of entire system at wide angle end.

23. A projection-type display apparatus comprising:
  a light source;
  a light valve; and
  a variable magnification optical system for projection, as defined in claim 17,
  wherein an optical image formed by light modulated by the light valve is projected onto a screen by the variable magnification optical system for projection.

24. A variable magnification optical system for projection comprising:
  a first lens group having negative refractive power, and which is arranged on the most magnification side of the variable magnification optical system, and which is fixed when magnification of the variable magnification optical system is changed;
  a final lens group having positive refractive power, and which is arranged on the most reduction side of the variable magnification optical system, and which is fixed when magnification of the variable magnification optical system is changed; and
  a plurality of lens groups that are arranged between the first lens group and the final lens group, and which move when magnification of the variable magnification optical system is changed,
  wherein a most-magnification-side lens group among the plurality of lens groups that move when magnification of the variable magnification optical system is changed has negative refractive power, and
  wherein a most-reduction-side lens group among the plurality of lens groups that move when magnification of the variable magnification optical system is changed has positive refractive power, and
  wherein the reduction side of the variable magnification optical system is telecentric, and
  wherein a stop is arranged in the final lens group, thereby setting the numerical aperture of the variable magnification optical system constant through the entire range of variable magnification.

25. A variable magnification optical system for projection, as defined in claim 24, wherein the following formula (16) is satisfied:

$$1.8 < Bf/Im\phi \tag{16}$$

where
- Bf: back focus in air of entire system at wide angle end, and
- Imφ: diameter of a maximum effective image circle on the reduction side of the variable magnification optical system.

26. A variable magnification optical system for projection, as defined in claim 24, wherein the following formula (13) is satisfied:

$$fMK/fw < -3.5 \tag{13}$$

where
- fMK: focal length of a most-magnification-side lens group among a plurality of lens groups that move when magnification of the variable magnification optical system is changed, and
- fw: focal length of entire system at wide angle end.

27. A variable magnification optical system for projection, as defined in claim 24, wherein the following formula (14) is satisfied:

$$1.5 < fMS/fw < 10.0 \tag{14}$$

where
- fMS: focal length of a most-reduction-side lens group among a plurality of lens groups that move when magnification of the variable magnification optical system is changed, and
- fw: focal length of entire system at wide angle end.

28. A variable magnification optical system for projection, as defined in claim 24, wherein the following formula (15) is satisfied:

$$1.0 < fE/fw < 5.0 \tag{15}$$

where
- fE: focal length of the lens group having positive refractive power that is arranged on the most reduction side in the entire system of the variable magnification optical system, and which is fixed when magnification of the variable magnification optical system is changed, and
- fw: focal length of entire system at wide angle end.

29. A variable magnification optical system for projection, as defined in claim 24, wherein the plurality of lens groups that move when magnification of the variable magnification optical system is changed are three lens groups, and wherein a second lens group from the magnification side among the three lens groups has positive refractive power, and wherein the following formula (17) is satisfied:

$$5.0 < fMm/fw \qquad (17),$$

where fMm: focal length of the second lens group from the magnification side among the three lens groups, and fw: focal length of entire system at wide angle end.

30. A variable magnification optical system for projection, as defined in claim 24, wherein the variable magnification optical system functions as a zoom lens by changing at least one distance between said lens groups.

31. A projection-type display apparatus comprising:
a light source;
a light valve; and
a variable magnification optical system for projection, as defined in claim 24,
wherein an optical image formed by light modulated by the light valve is projected onto a screen by the variable magnification optical system for projection.

32. A variable magnification optical system for projection comprising:
a first lens group having negative refractive power, and which is arranged on the most magnification side of the variable magnification optical system, and which is fixed when magnification of the variable magnification optical system is changed;
a final lens group having positive refractive power, and which is arranged on the most reduction side of the variable magnification optical system, and which is fixed when magnification of the variable magnification optical system is changed; and
a plurality of lens groups that are arranged between the first lens group and the final lens group, and which move when magnification of the variable magnification optical system is changed, and the number of the plurality of lens groups being less than or equal to three,
wherein the reduction side of the variable magnification optical system is telecentric, and
wherein a stop is arranged in the final lens group, thereby setting the numerical aperture of the variable magnification optical system constant through the entire range of variable magnification, and wherein the following formulas (18) and (19) are satisfied:

$$5.0 < Bf \times Zr2/Im\phi \qquad (18),$$

and $$L/Im\phi < 12.5 \qquad (19),$$

where

Bf: back focus in air of entire system at wide angle end,

Zr: ratio of magnification at telephoto end to magnification at wide angle end,

Imφ: diameter of a maximum effective image circle on the reduction side of the variable magnification optical system, and L: total lens thickness when projection distance is infinity.

33. A variable magnification optical system for projection, as defined in claim 32, wherein a most-magnification-side lens group among the plurality of lens groups that move when magnification of the variable magnification optical system is changed, the number of the plurality of lens groups being less than or equal to three, has negative refractive power.

34. A variable magnification optical system for projection, as defined in claim 32, wherein the following formula (11) is satisfied:

$$1.5 < Bf/fw \qquad (11),$$

where

Bf: back focus in air of entire system at wide angle end, and fw: focal length of entire system at wide angle end.

35. A variable magnification optical system for projection, as defined in claim 32, wherein the variable magnification optical system functions as a zoom lens by changing at least one distance between said lens groups.

36. A variable magnification optical system for projection, as defined in claim 32, wherein the following formula (20) is satisfied:

$$1.4 < Zr \qquad (20),$$

where

Zr: ratio of magnification at telephoto end to magnification at wide angle end.

37. A projection-type display apparatus comprising:
a light source;
a light valve; and
a variable magnification optical system for projection, as defined in claim 32,
wherein an optical image formed by light modulated by the light valve is projected onto a screen by the variable magnification optical system for projection.

* * * * *